United States Patent
Ueno et al.

(10) Patent No.: US 8,395,700 B2
(45) Date of Patent: Mar. 12, 2013

(54) IMAGE DISPLAYING DEVICE AND METHOD, AND IMAGE PROCESSING DEVICE AND METHOD

(75) Inventors: Masafumi Ueno, Osaka (JP); Kenichiroh Yamamoto, Osaka (JP); Takashi Yoshii, Osaka (JP); Hiroyuki Furukawa, Osaka (JP); Yasuhiro Yoshida, Osaka (JP)

(73) Assignee: Sharp Kabushiki Kaisha, Osaka-Shi (JP)

(*) Notice: Subject to any disclaimer, the term of this patent is extended or adjusted under 35 U.S.C. 154(b) by 465 days.

(21) Appl. No.: 12/312,909

(22) PCT Filed: May 18, 2007

(86) PCT No.: PCT/JP2007/060196
§ 371 (c)(1),
(2), (4) Date: Jun. 1, 2009

(87) PCT Pub. No.: WO2008/081611
PCT Pub. Date: Jul. 10, 2008

(65) Prior Publication Data
US 2010/0002133 A1    Jan. 7, 2010

(30) Foreign Application Priority Data

Dec. 27, 2006  (JP) ................................. 2006-351783

(51) Int. Cl.
*H04N 7/01* (2006.01)

(52) U.S. Cl. ........................................ 348/441; 348/452

(58) Field of Classification Search ............. 375/240.16; 348/441, 451, 452, 443, 458, 459, 446, 448, 348/699; *H04N 7/01, 11/20*
See application file for complete search history.

(56) References Cited

U.S. PATENT DOCUMENTS 5,365,280 A * 11/1994 De Haan et al. .............. 348/699
5,508,744 A * 4/1996 Savatier ................... 375/240.16
(Continued)

FOREIGN PATENT DOCUMENTS

| JP | 06-098256 | 4/1994 |
| JP | 6-98256 A | 4/1994 |

(Continued)

OTHER PUBLICATIONS

Tatsuro Yamauchi, "TV Standards Conversion", Journal of the Institute of Television Engineers of Japan, vol. 45, No. 12, pp. 1534-1543.

(Continued)

*Primary Examiner* — Sherrie Hsia
(74) *Attorney, Agent, or Firm* — Birch, Stewart, Kolasch & Birch, LLP

(57) ABSTRACT

The quality of moving picture image with a large moving amount is prevented from deterioration due to moving compensation type frame rate conversion (FRC) processing. The image display device is comprised of an FRC unit (10) that interpolates an image signal subjected to moving compensation processing between frames so as to convert the number of frames of the input image signal, a moving amount judging unit (14) that judges whether a moving amount of the input image signal between the frames is larger than a predetermined value or not, and a control unit (15). The FRC unit (10) is provided with a moving vector detecting unit (11e) that detects a moving vector between the frames of the input image signal, an interpolation vector evaluating unit (11f) that allocates an interpolation vector between the frames on the basis of the moving vector information and an interpolation frame generating unit (12d) that generates an interpolation frame from the interpolation vector. In the case where the moving amount between the frames of the input image signal is larger than the predetermined value, the control unit (15) sets the moving vector detected by the moving vector detecting unit (11e) to be zero-vector, and it invalidates the moving compensation processing of the FRC unit (10).

33 Claims, 29 Drawing Sheets

U.S. PATENT DOCUMENTS

| | | | |
|---|---|---|---|
| 7,408,986 B2* | 8/2008 | Winder | 375/240.12 |
| 2001/0015768 A1* | 8/2001 | Shin et al. | 348/452 |
| 2002/0171759 A1* | 11/2002 | Handjojo et al. | 348/452 |
| 2003/0202593 A1* | 10/2003 | Briand et al. | 375/240.16 |
| 2003/0206591 A1* | 11/2003 | Yang et al. | 375/240.16 |
| 2004/0017507 A1* | 1/2004 | Clayton | 348/407.1 |
| 2004/0085480 A1* | 5/2004 | Salzer et al. | 348/584 |
| 2005/0073607 A1* | 4/2005 | Ji et al. | 348/448 |
| 2005/0134735 A1* | 6/2005 | Swartz | 348/554 |
| 2005/0243216 A1* | 11/2005 | Salzer et al. | 348/701 |
| 2005/0243932 A1* | 11/2005 | Landsiedel et al. | 375/240.16 |
| 2005/0243933 A1 | 11/2005 | Landsiedel et al. | |
| 2006/0146187 A1* | 7/2006 | Handjojo et al. | 348/448 |
| 2006/0159180 A1* | 7/2006 | Sekiguchi et al. | 375/240.17 |

FOREIGN PATENT DOCUMENTS

| | | |
|---|---|---|
| JP | 6-217263 A | 8/1994 |
| JP | 2000-259146 A | 9/2000 |
| JP | 3295437 B2 | 6/2002 |
| JP | 2004-120757 A | 4/2004 |
| JP | 2005-167887 A | 6/2005 |
| JP | 2005-208613 A | 8/2005 |
| JP | 2005-318612 A | 11/2005 |
| JP | 2005-318622 A | 11/2005 |
| JP | 2006-279917 | 10/2006 |
| JP | 2006-279917 A | 10/2006 |

OTHER PUBLICATIONS

Hidekazu Ishiguro et al., "Consideration on Motion Picture Quality of the Hold Quality of the Hold Type Display with an octuple-rate CRT", Technical Report of IEICE, Institute of Electronics, Information and Communication Engineers, EID96-4 (Jun. 1996), pp. 19-26.

* cited by examiner

FIG. 4
CONVENTIONAL ART
(A)
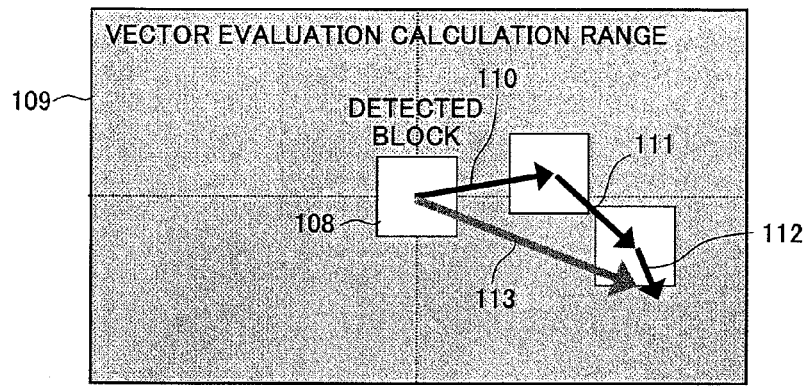
(B)
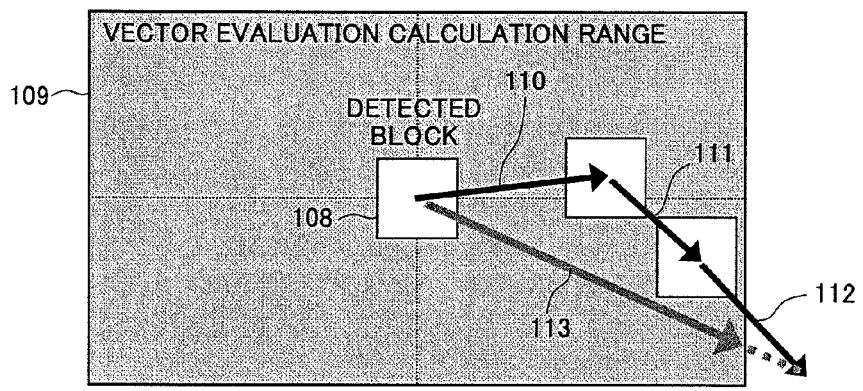
(C)
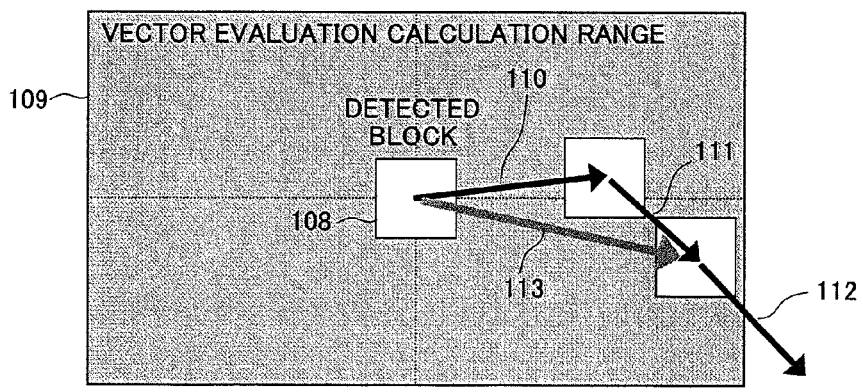

IMAGE DISPLAYING DEVICE AND METHOD, AND IMAGE PROCESSING DEVICE AND METHOD

TECHNICAL FIELD

The present invention relates to an image displaying device and method and an image processing device and method, having a function of converting a frame rate or a field rate, and more particularly, to an image displaying device and an image displaying method performed by the device, and an image processing device and an image processing method performed by the device, that prevent deterioration of the image quality of a moving image including an area in which a movement amount between frames or fields is larger than a predetermined value caused by a motion-compensated rate conversion processing.

BACKGROUND OF THE INVENTION

As compared to conventional cathode-ray tubes (CRTs) primarily used for realizing moving images, LCDs (Liquid Crystal Displays) have a drawback, so-called motion blur, which is the blurring of outline of a moving portion perceived by a viewer when displaying a moving image. It is pointed out that this motion blur arises from the LCD display mode itself (see, e.g., Specification of Japanese Patent No. 3295437; "Ishiguro Hidekazu and Kurita Taiichiro, "Consideration on Motion Picture Quality of the Hold Type Display with an octuple-rate CRT", IEICE Technical Report, Institute of Electronics, Information and Communication Engineers, EID96-4 (1996-06), p. 19-26").

Since fluorescent material is scanned by an electron beam to cause emission of light for display in CRTs, the light emission of pixels is basically impulse-like although slight afterglow of the fluorescent material exists. This is called an impulse display mode. On the other hand, in the case of LCDs, an electric charge is accumulated by applying an electric field to liquid crystal and is retained at a relatively high rate until the next time the electric field is applied. Especially, in the case of the TFT mode, since a TFT switch is provided for each dot composing a pixel and each pixel normally has an auxiliary capacity, the ability to retain the accumulated charge is extremely high. Therefore, the light emission is continued until the pixels are rewritten by the application of the electric field based on the image information of the next frame or field (hereinafter, represented by the frame). This is called a hold display mode.

Since the impulse response of the image displaying light has a temporal spread in the above hold display mode, spatial frequency characteristics deteriorate along with temporal frequency characteristics, resulting in the motion blur. Since the human eye can smoothly follow a moving object, if the light emission time is long as in the case of the hold type, the movement of image seems jerky and unnatural due to the time integration effect.

To improve the motion blur in the above hold display mode, a frame rate (the number of frames) is converted by interpolating an image between frames in a known technology. This technology is called. FRC (Frame Rate Converter) and is put to practical use in liquid crystal displaying devices, etc.

Conventionally known methods of converting the frame rate include various techniques such as simply repeating readout of the same frame for a plurality of times and frame interpolation using linear interpolation between frames (see, e.g., Yamauchi Tatsuro, "TV Standards Conversion", Journal of the Institute of Television Engineers of Japan, Vol. 45, No. 12, pp. 1534-1543 (1991)). However, in the case of the frame interpolation processing using the linear interpolation, unnaturalness of motion (jerkiness, judder) is generated due to the frame rate conversion, and the motion blur disturbance due to the above hold display mode cannot sufficiently be improved, resulting in inadequate image quality.

To eliminate effects of the jerkiness, etc., and improve quality of moving images, a motion-compensated frame interpolation (motion compensation) processing using motion vectors is proposed. Since a moving image itself is captured to compensate the image movement in this motion compensation processing, highly natural moving images may be acquired without deteriorating the resolution and generating the jerkiness. Since interpolation image signals are generated with motion compensation, the motion blur disturbance due to the above hold display mode may sufficiently be improved.

Above Specification of Japanese Patent No. 3295437 discloses a technology of motion-adaptively generating interpolation frames to increase a frame frequency of a display image for improving deterioration of spatial frequency characteristics causing the motion blur. In this case, at least one interpolation image signal interpolated between frames of a display image is motion-adaptively created from the previous and subsequent frames, and the created interpolation image signals are interpolated between the frames and are sequentially displayed.

FIG. 1 is a block diagram of a schematic configuration of an FRC drive display circuit in a conventional liquid crystal displaying device and, in FIG. 1, the FRC drive display circuit includes an FRC portion 100 that converts the number of frames of the input image signal by interpolating the image signals to which the motion compensation processing has been given between frames of the input video signal, an active-matrix liquid crystal display panel 104 having a liquid crystal layer and an electrode for applying the scan signal and the data signal to the liquid crystal layer, and an electrode driving portion 103 for driving a scan electrode and a data electrode of the liquid crystal display panel 104 based on the image signal subjected to the frame rate conversion by the FRC portion 100.

The FRC portion 100 includes a motion vector detecting portion 101 that detects motion vector information from the input image signal and an interpolation frame generating portion 102 that generates interpolation frames based on the motion vector information acquired by the motion vector detecting portion 101.

In the above configuration, for example, the motion vector detecting portion 101 may obtain the motion vector information with the use of a block matching method and a gradient method described later or if the motion vector information is included in the input image signal in some form, this information may be utilized. For example, the image data compression-encoded with the use of the MPEG format includes motion vector information of a moving image calculated at the time of encoding, and this motion vector information may be acquired.

FIG. 2 is a diagram for explaining a frame rate conversion processing by the conventional FRC drive display circuit shown in FIG. 1. The FRC portion 100 generates interpolation frames (gray-colored images in FIG. 2) between frames with the motion compensation using the motion vector information output from the motion vector detecting portion 101 and sequentially outputs the generated interpolation signals along with the input frame signals to perform processing of converting the frame rate of the input image signal from 60 frames per second (60 Hz) to 120 frames per second (120 Hz).

FIG. 3 is a diagram for explaining an interpolation frame generation processing of the motion vector detecting portion 101 and the interpolation frame generating portion 102. The motion vector detecting portion 101 uses the gradient method to detect a motion vector 105 from, for example, a frame #1 and a frame #2 shown in FIG. 3. The motion vector detecting portion 101 obtains the motion vector 105 by measuring a direction and an amount of movement in $1/60$ of a second between the frame #1 and the frame #2. The interpolation frame generating portion 102 then uses the obtained motion vector 105 to allocate an interpolation vector 106 between the frame #1 and the frame #2. An interpolation frame 107 is generated by moving an object (in this case, an automobile) from a position of the frame #1 to a position after $1/120$ of a second based on the interpolation vector 106.

By performing the motion-compensated frame interpolation processing with the use of the motion vector information to increase a display frame frequency in this way, the display state of the LCD (the hold display mode) can be made closer to the display state of the CRT (the impulse display mode) and the image quality deterioration can be improved which is due to the motion blur generated when displaying a moving image.

In the motion-compensated frame interpolation processing, it is essential to detect the motion vectors for performing the motion compensation. For example, the block matching method and the gradient method are proposed as representative techniques for the motion vector detection. In these methods, the motion vector is detected for each pixel or small block between two consecutive frames and this motion vector is used to interpolate each pixel or small block of the interpolation frame between two frames. An image at an arbitrary position between two frames is interpolated at an accurately compensated position to convert the number of frames.

Since the frames are highly correlated in moving images and has continuity in the time axis direction, a pixel or a small block moving in one frame tends to move with the same movement amount in the subsequent frame or the previous frame. For example, in the case of a moving image of a ball rolling from right to left on a screen, the ball area moves with similar movement amounts in every frame. Consecutive frames tend to have the continuity of motion vectors.

Therefore, the motion vector in the next frame may more easily or more accurately be detected by reference to a motion vector detection result of preceding frames. For example, in the iterative gradient method, which is an improved gradient method, a motion vector of a neighboring block already detected in the previous frame or the current frame is defined as an initial deflection vector, which is used as a starting point to repeat calculations of the gradient method for a detected block. With this method, a substantially accurate movement amount can be acquired by repeating the gradient method about two times.

That is, in the iterative gradient method, as shown in FIG. 4(A), the sum of an initial deflection vector 110 of an already detected motion vector of a neighboring block 108 of a detected block, a first motion vector 111 acquired by a first gradient method, and a second motion vector 112 acquired by a second gradient method, is a motion vector 113 that is finally output.

Incidentally, when the FRC is considered to be realized by a real-time processing of a hardware or a simulation processing of a computer, etc., the calculation range for evaluating motion vectors needs to be limited in real use because of limitation to the circuit configuration or memory region of the hardware, or limitation to computer processing speed, etc.

For example, in an interpolation vector evaluating portion provided in the interpolation frame generating portion 102, the accuracy of the motion vector acquired by the calculations of the gradient method is evaluated by calculating the Displaced Field Difference (DFD) between the image information of the detected block and the image information of the block indicated by the motion vector from the detected block, and the vector evaluation calculation range needs to be limited since there is the restriction of the memory region saved for the image information in the evaluation region as well.

Note that, the DFD is an index that shows the degree of accuracy of a candidate vector, and the smaller a value of the DFD is, the better the matching is of a detected block and a block indicated by a motion vector from the detected block, and the more suitable a corresponding candidate vector is.

However, when the movement amount between frames is large, the vector acquired by the calculations of the gradient method may exceed the limited vector evaluation calculation range 109 in the above gradient method. That is, a vector is obtained by arithmetical calculations based on the gradient difference between the image information of previous and subsequent frames in the calculations of the gradient method, and therefore a vector exceeding the limited vector evaluation calculation range may be calculated.

When a vector exceeding the vector evaluation calculation range is calculated in this way in the motion vector calculation, the motion vector needs to be limited at an output stage of a motion vector detecting portion because of limitation to the memory for the image information in the following evaluation of an interpolation vector.

For example, FIG. 4(B) and FIG. 4(C) show the case where the second motion vector 112 acquired by the second gradient method exceeds the vector evaluation calculation range 109. In this case, there are considered various methods as to what kind of motion vector is finally output.

For an example thereof, as shown in FIG. 4(B), a vector acquired by the sum of the initial deflection vector 110, the first motion vector 111, and the second motion vector 112 is clipped at a maximum value within the vector evaluation calculation range 109 and output for the final motion vector 113.

Another method is that, as shown in FIG. 4(C), since the second motion vector 112 exceeds the vector evaluation calculation range 109, up to the first motion vector 111 are defined as effective vectors and the sum with the initial deflection vector 110 is output for the final motion vector 113.

In this manner, when a vector acquired by the calculations of the gradient method exceeds the vector evaluation calculation range, a specific processing is applied and a certain vector is output, however, the output vector is not faithfully reflecting the result of the calculations of the gradient method, etc., and is not an accurate motion vector. Therefore, when the motion-compensated frame interpolation processing is performed using the motion vector to which the specific processing has been given, a failure may occur in an interpolation image.

Even if the vector evaluation calculation range is set to be sufficiently enlarged, the specific processing is unnecessary, however, as the vector evaluation calculation range is enlarged, there is a higher possibility that an identical pattern (image information) with a detected block exists in other plurality of blocks within a screen or the calculation range and motion vector candidates increase, and therefore, it becomes difficult to detect an accurate motion vector.

Not only when using the iterative gradient method but also when using the block matching method as the method for detecting a motion vector, for example, the vector search range, etc., needs to be limited and it is difficult to output an accurate motion vector when the movement amount between frames is large as above.

DISCLOSURE OF THE INVENTION

Problems to be Solved by the Invention

As a source of a video image signal, there exist video images shot by an ordinary television video camera. Some of these video images may include a video image that scrolls (or moves) at very high speed in a screen, for example, such as a video image shot by panning a shooting camera at high speed or a video image in which automobiles and trains, etc., run across in a screen at high speed.

Since the movement amount between each of the frames is excessive in such moving images, it is difficult to output an accurate motion vector. That is, the larger the movement amount of an object is, the more difficult to generate an accurate interpolation image in the FRC.

If there is a moving object in a screen, humans are to watch and follow the moving object with the eyes, and when there are errors of the motion vector detection in the FRC and a failed video image appears in the moving object, the image quality deterioration is likely to be conspicuous, in particular.

However, a subject shot by a camera whose movement amount is large generally includes a blur (camera blur) caused by a light accumulation time of the camera. Since the motion blur caused by the hold display mode is unlikely to be conspicuous in such an image originally including the blur, the image quality improving effect by the FRC is small.

Therefore, when the FRC is performed, if errors occur in the motion vector detection due to the large movement amount between frames and there is a possibility that a failure is generated in an interpolation image, it is better not to perform the motion-compensated frame interpolation processing using the motion vectors.

Further, as another source of a video image signal, there also exist video images by a computer graphics (CG). Some of these video images may include a video image that scrolls at high speed or objects (including characters) that move at very high speed. Since the above camera blur generated in the camera shooting does not exist in the CG video images, the image quality improving effect is obtained more effectively than the video images shot by the camera when the FRC is performed.

However, when errors occur in the motion vector detection and a failure is generated in an interpolation image due to the large movement amount between the frames in the CG video images, the image quality deterioration is likely to be more conspicuous, in particular, than the video images shot by the camera. Therefore, when such image quality deterioration is particularly noticeable, it is better not to perform the motion-compensated frame interpolation processing using the motion vectors.

The present invention was conceived in view of the above circumstances and the object thereof is to provide an image displaying device and method, and an image processing device and method, capable of preventing the image quality deterioration of a moving image in which a movement amount between frames or fields is larger than a predetermined value caused by the motion-compensated frame rate conversion (FRC) processing.

Means for Solving the Problems

A first invention of the present application is an image displaying device having a rate converting means that interpolates an interpolation image signal between frames or fields of an input image signal to convert the number of frames or fields of the input image signal, wherein the image displaying device includes a determining means that determines whether or not a movement amount between frames or fields of the input image signal is larger than a predetermined value for each frame or field, the rate converting means includes an interpolation image generating portion that applies a motion compensation processing to the input image signal to generate an interpolation image signal based on motion vector information between frames or fields of the input image signal, and interpolation of the image signal generated by applying the motion compensation processing is not performed for an area including all pixels in a frame or field determined by the determining means as having a larger movement amount between frames or fields of the input image signal than the predetermined value.

A second invention of the present application is the image displaying device, wherein the rate converting means interpolates an image signal generated by making the motion compensation processing in the interpolation image generating portion ineffective between frames or fields of the input image signal for an area including all pixels in a frame or field determined as having a larger movement amount between frames or fields of the input image signal than the predetermined value.

A third invention of the present application is the image displaying device, wherein the interpolation image generating portion includes a motion vector detecting portion that detects motion vector information between consecutive frames or fields included in the input image signal and an interpolation vector allocating portion that allocates an interpolation vector between the frames or the fields based on the detected motion vector information.

A fourth invention of the present application is the image displaying device, wherein the interpolation image generating portion sets the motion vector detected by the motion vector detecting portion to zero-vector to make the motion compensation processing ineffective for an area including all pixels in a frame or field determined as having a larger movement amount between frames or fields of the input image signal than the predetermined value.

A fifth invention of the present application is the image displaying device, wherein the interpolation image generating portion sets the interpolation vector allocated by the interpolation vector allocating portion to zero-vector to make the motion compensation processing ineffective for an area including all pixels in a frame or field determined as having a larger movement amount between frames or fields of the input image signal than the predetermined value.

A sixth invention of the present application is the image displaying device, wherein when the movement amount between frames or fields of the input image signal is larger than the predetermined value, the image displaying device does not insert the interpolation image signal generated by applying the motion compensation processing between frames or fields of the input image signal and does not convert the number of frames or fields of the input image signal.

A seventh invention of the present application is the image displaying device, wherein the drive frequency of the display panel displaying the image signals is variable and when the movement amount between frames or fields of the input image signal is larger than the predetermined value, a means for varying the drive frequency of the display panel from the frame frequency or the field frequency converted by the rate converting means to the frame frequency or the field frequency of the input image signal is included.

An eighth invention of the present application is the image displaying device, wherein the rate converting means inserts an image signal to which the motion compensation processing has not been given between frames or fields of the input image signal to convert the number of frames or fields of the input image signal for an area including all pixels in a frame or field determined as having a larger movement amount between frames or fields of the input image signal than the predetermined value.

A ninth invention of the present application is the image displaying device, wherein the rate converting means inserts between frames or fields of the input image signal an image signal of the frames or fields to convert the number of frames or fields of the input image signal.

A tenth invention of the present application is the image displaying device, wherein the rate converting means interpolates between frames or fields of the input image signal an image signal obtained by applying a linear interpolation processing to an image signal of the frames or fields to convert the number of frames or fields of the input image signal.

An eleventh invention of the present application is the image displaying device wherein the rate converting means inserts a predetermined monochromatic image signal between frames or fields of the input image signal to convert the number of frames or fields of the input image signal.

A twelfth invention of the present application is the image displaying device, wherein the determining means determines whether or not the movement amount between frames or fields of the input image signal is larger than the predetermined value based on a vector calculated by performing a predetermined calculation for the input image signal.

A thirteenth invention of the present application is the image displaying device, wherein the determining means determines whether or not the movement amount between frames or fields of the input image signal is larger than the predetermined value by applying flag information to a block in which the calculated vector exceeds a predetermined range and comparing a counted value for each frame of the flag information and a predetermined threshold.

A fourteenth invention of the present application is the image displaying device, wherein the determining means determines whether or not the movement amount between frames or fields of the input image signal is larger than the predetermined value based on motion vector information included in the input image signal A fifteenth invention of the present application is the image displaying device, wherein the determining means varies a predetermined value for determining whether or not the movement amount between frames or fields of the input image signal is larger than the predetermined value in a current frame or field in accordance with a result of determination of the movement amount between the frames or the fields to prevent that a frame or field determined as having a large movement amount and a frame or field determined as having a small movement amount are switched over frequently.

A sixteenth invention of the present application is the image displaying device, wherein when the determining means determines that the movement amount between frames or fields of the input image signal is larger than the predetermined value, the determining means continuously outputs the result of determination for a subsequent several-frame period.

A seventeenth invention of the present application is an image displaying method having a rate converting step of interpolating an interpolation image signal between frames or fields of an input image signal to convert the number of frames or fields of the input image signal, wherein a determining step of determining whether or not a movement amount between frames or fields of the input image signal is larger than a predetermined value for each frame or field is included, the rate converting step includes an interpolation image generating step of applying a motion compensation processing to the input image signal to generate an interpolation image signal based on motion vector information between frames or fields of the input image signal, and interpolation of the image signal generated by applying the motion compensation processing is not performed for an area including all pixels in a frame or field determined as having a larger movement amount between frames or fields of the input image signal than the predetermined value.

An eighteenth invention of the present application is the image displaying method, wherein the rate converting step interpolates an image signal generated by making the motion compensation processing in the interpolation image generating step ineffective between frames or fields of the input image signal for an area including all pixels in a frame or field determined as having a larger movement amount between frames or fields of the input image signal than the predetermined value.

A nineteenth invention of the present application is the image displaying method, wherein the movement amount between frames or fields of the input image signal is larger than the predetermined value, a step of varying the drive frequency of a display panel from the frame frequency or the field frequency converted by the rate converting step to the frame frequency or the field frequency of the input image signal is included.

A twentieth invention of the present application is the image displaying method, wherein for an area including all pixels in a frame or field determined as having a larger movement amount between frames or fields of the input image signal than the predetermined value, the rate converting step inserts an image signal of the frames or fields between frames or fields of the input image signal to convert the number of frames or fields of the input image signal.

A twenty-first invention of the present application is the image displaying method, wherein the rate converting step interpolates an image signal obtained by applying a linear interpolation processing to the input image signal between frames or fields of the input image signal to convert the number of frames or fields of the input image signal for an area including all pixels in a frame or field determined as having a larger movement amount between frames or fields of the input image signal than the predetermined value.

A twenty-second invention of the present application is the image displaying method, wherein the rate converting step inserts a predetermined monochromatic image signal between frames or fields of the input image signal to convert the number of frames or fields of the input image signal for an area including all pixels in a frame or field determined as having a larger movement amount between frames or fields of the input image signal than the predetermined value.

A twenty-third invention of the present application is an image processing device having a rate converting means that interpolates an interpolation image signal between frames or fields of an input image signal to convert the number of frames or fields of the input image signal, wherein a determining means that determines whether or not a movement amount between frames or fields of the input image signal is larger than a predetermined value for each frame or field is included, the rate converting means includes an interpolation image generating portion that applies a motion compensation processing to the input image signal to generate an interpolation image signal based on motion vector information between frames or fields of the input image signal, and interpolation of the image signal generated by applying the motion compensation processing is not performed for an area including all pixels in a frame or field determined by the determining means as having a larger movement amount between frames or fields of the input image signal than the predetermined value.

A twenty-fourth invention of the present application is the image processing device, wherein the rate converting means interpolates an image signal generated by making the motion compensation processing in the interpolation image generating portion ineffective between frames or fields of the input image signal for an area including all pixels in a frame or field determined as having a larger movement amount between frames or fields of the input image signal than the predetermined value.

A twenty-fifth invention of the present application is the image processing device, wherein the rate converting means inserts an image signal to which the motion compensation processing has not been given between frames or fields of the input image signal to convert the number of frames or fields of the input image signal for an area including all pixels in a frame or field determined as having a larger movement amount between frames or fields of the input image signal than the predetermined value.

A twenty-sixth invention of the present application is the image processing device, wherein the rate converting means inserts between frames or fields of the input image signal an image signal of the frames or fields to convert the number of frames or fields of the input image signal.

A twenty-seventh invention of the present application is the image processing device, wherein the rate converting means interpolates between frames or fields of the input image signal an image signal obtained by applying a linear interpolation processing to an image signal of the frames or fields to convert the number of frames or fields of the input image signal.

A twenty-eighth invention of the present application is the image processing device, wherein the rate converting means inserts a predetermined monochromatic image signal between frames or fields of the input image signal to convert the number of frames or fields of the input image signal.

A twenty-ninth invention of the present application is an image processing method having a rate converting step of interpolating an interpolation image signal between frames or fields of an input image signal to convert the number of frames or fields of the input image signal, wherein a determining step of determining whether or not a movement amount between frames or fields of the input image signal is larger than a predetermined value for each frame or field is included, the rate converting step includes an interpolation image generating step of applying a motion compensation processing to the input image signal to generate an interpolation image signal based on motion vector information between frames or fields of the input image signal, and interpolation of the image signal generated by applying the motion compensation processing is not performed for an area including all pixels in a frame or field determined as having a larger movement amount between frames or fields of the input image signal than the predetermined value.

A thirtieth invention of the present application is the image processing method, wherein the rate converting step interpolates an image signal generated by making the motion compensation processing in the interpolation image generating step ineffective between frames or fields of the input image signal for an area including all pixels in a frame or field determined as having a larger movement amount between frames or fields of the input image signal than the predetermined value.

A thirty-first invention of the present application is the image processing method, Wherein for an area including all pixels in a frame or field determined as having a larger movement amount between frames or fields of the input image signal than the predetermined value, the rate converting step inserts an image signal of the frames or fields between frames or fields of the input image signal to convert the number of frames or fields of the input image signal.

A thirty-second invention of the present application is the image processing method, wherein the rate converting step interpolates an image signal obtained by applying a linear interpolation processing to the input image signal between frames or fields of the input image signal to convert the number of frames or fields of the input image signal for an area including all pixels in a frame or field determined as having a larger movement amount between frames or fields of the input image signal than the predetermined value.

A thirty-third invention of the present application is the image processing method, wherein the rate converting step inserts a predetermined monochromatic image signal between frames or fields of the input image signal to convert the number of frames or fields of the input image signal for an area including all pixels in a frame or field determined as having a larger movement amount between frames or fields of the input image signal than the predetermined value.

A thirty-fourth invention of the present application is an image displaying device having a rate converting means that interpolates an interpolation image signal between frames or fields of an input image signal to convert the number of frames or fields of the input image signal, wherein the image displaying device includes a determining means that determines whether or not a movement amount between frames or fields of the input image signal is larger than a predetermined value for each frame or field, the rate converting means includes an interpolation image generating portion that applies a motion compensation processing to the input image signal to generate an interpolation image signal based on motion vector information between frames or fields of the input image signal, and an interpolation image signal generated by reducing the compensation intensity of the motion compensation processing is interpolated between frames or fields of the input image signal for an area including all pixels in a frame or field determined by the determining means as having a larger movement amount between frames or fields of the input image signal than the predetermined value.

A thirty-fifth invention of the present application is the image displaying device, wherein the interpolation image generating portion performs weighted addition of the image signal to which the motion compensation processing has been given and an image signal to which the motion compensation processing has not been given at a predetermined rate to generate an interpolation image signal and the weighted addition rate of the image signal to which the motion compensation processing has been given is reduced for an area including all pixels in a frame or field determined as having a larger movement amount between frames or fields of the input image signal than the predetermined value.

A thirty-sixth invention of the present application is the image displaying device, wherein the interpolation image generating portion defines the image signal to which the motion compensation processing has not been given as the interpolation image signal for an area including all pixels in a frame or field determined as having a larger movement amount between frames or fields of the input image signal than the predetermined value, and wherein the interpolation image generating portion defines the image signal to which the motion compensation processing has been given as the interpolation image signal for an area including all pixels in a frame or field determined as having a smaller movement amount between frames or fields of the input image signal than the predetermined value.

A thirty-seventh invention of the present application is the image displaying device, wherein the determining means varies a predetermined value for determining whether or not the movement amount between frames or fields of the input image signal is large than the predetermined value in a current frame or field in accordance with a result of determination of the movement amount between the frames or the fields to prevent that a frame or field determined as having a large movement amount and a frame or field determined as having a small movement amount are switched over frequently.

A thirty-eighth invention of the present application is the image displaying device, wherein when the determining means determines that the movement amount between frames or fields of the input image signal is larger than the predetermined value, the determining means continuously outputs the result of determination for a subsequent several-frame period.

A thirty-ninth invention of the present application is an image displaying method having a rate converting step of interpolating an interpolation image signal between frames or fields of an input image signal to convert the number of frames or fields of the input image signal, wherein a determining step of determining whether or not a movement amount between frames or fields of the input image signal is larger than a predetermined value for each frame or field is included, the rate converting step includes an interpolation image generating step of applying a motion compensation processing to the input image signal to generate an interpolation image signal based on motion vector information between frames or fields of the input image signal, and an interpolation image signal generated by reducing the compensation intensity of the motion compensation processing is interpolated between frames or fields of the input image signal for an area including all pixels in a frame or field determined as having a larger movement amount between frames or fields of the input image signal than the predetermined value.

A fortieth invention of the present application is an image processing device having a rate converting means that interpolates an interpolation image signal between frames or fields of an input image signal to convert the number of frames or fields of the input image signal, wherein a determining means that determines whether or not a movement amount between frames or fields of the input image signal is larger than a predetermined value for each frame or field is included, the rate converting means includes an interpolation image generating portion that applies a motion compensation processing to the input image signal to generate an interpolation image signal based on motion vector information between frames or fields of the input image signal, and an interpolation image signal generated by reducing the compensation intensity of the motion compensation processing is interpolated between frames or fields of the input image signal for an area including all pixels in a frame or field determined by the determining means as having a larger movement amount between frames or fields of the input image signal than the predetermined value.

A forty-first invention of the present application is an image processing method having a rate converting step of interpolating an interpolation image signal between frames or fields of an input image signal to convert the number of frames or fields of the input image signal, wherein a determining step of determining whether or not a movement amount between frames or fields of the input image signal is larger than a predetermined value for each frame or field is included, the rate converting step includes an interpolation image generating step of applying a motion compensation processing to the input image signal to generate an interpolation image signal based on motion vector information between frames or fields of the input image signal, and an interpolation image signal generated by reducing the compensation intensity of the motion compensation processing is interpolated between frames or fields of the input image signal for an area including all pixels in a frame or field determined as having a larger movement amount between frames or fields of the input image signal than the predetermined value.

Effects of the Invention

According to the present invention, the image quality deterioration of displayed images may effectively be prevented by not executing the interpolation processing through motion compensation when an image signal in which a movement amount between frames or fields is larger than a predetermined value is input.

BRIEF DESCRIPTION OF DRAWINGS

FIG. 4 is a diagram for explaining an example of a processing of limiting the output of the motion vector detecting portion within a vector evaluation calculation range.

Figure 1:
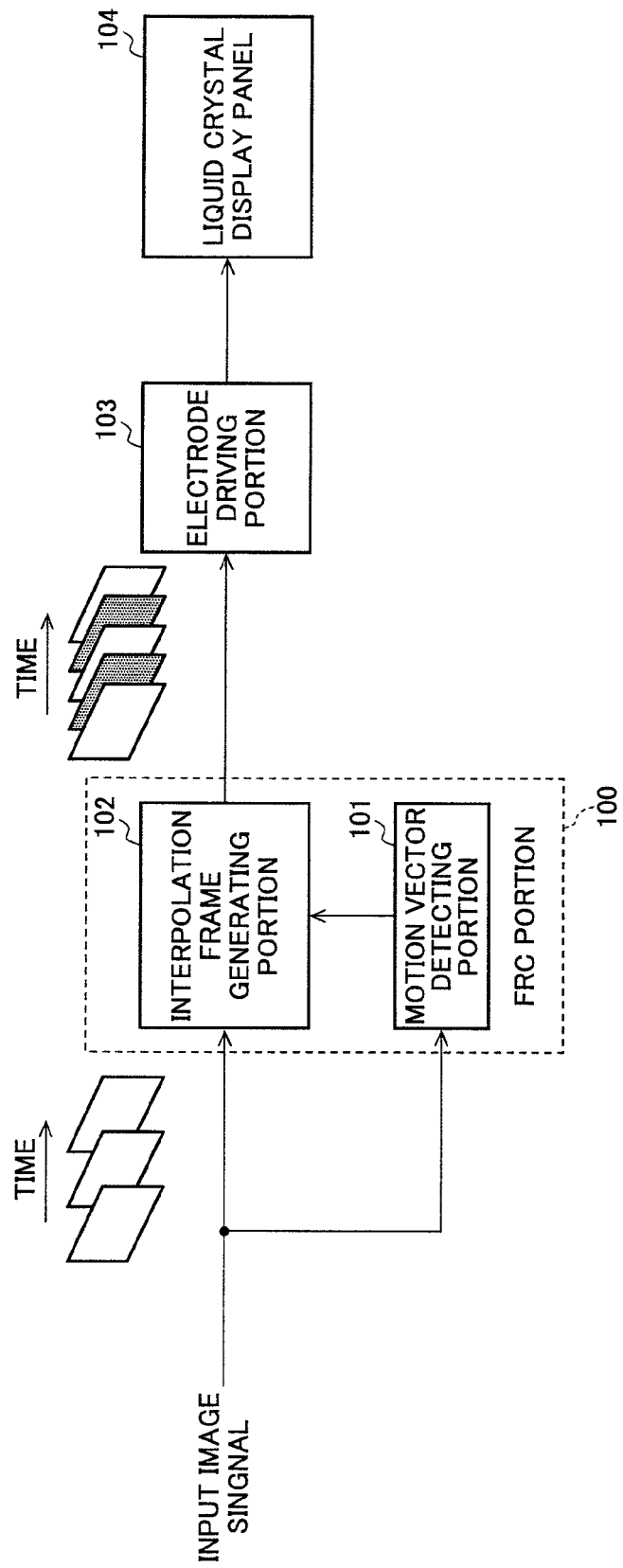
FIG. 1 is a block diagram of a schematic configuration of an FRC drive display circuit in a conventional liquid crystal displaying device.
Figure 2:
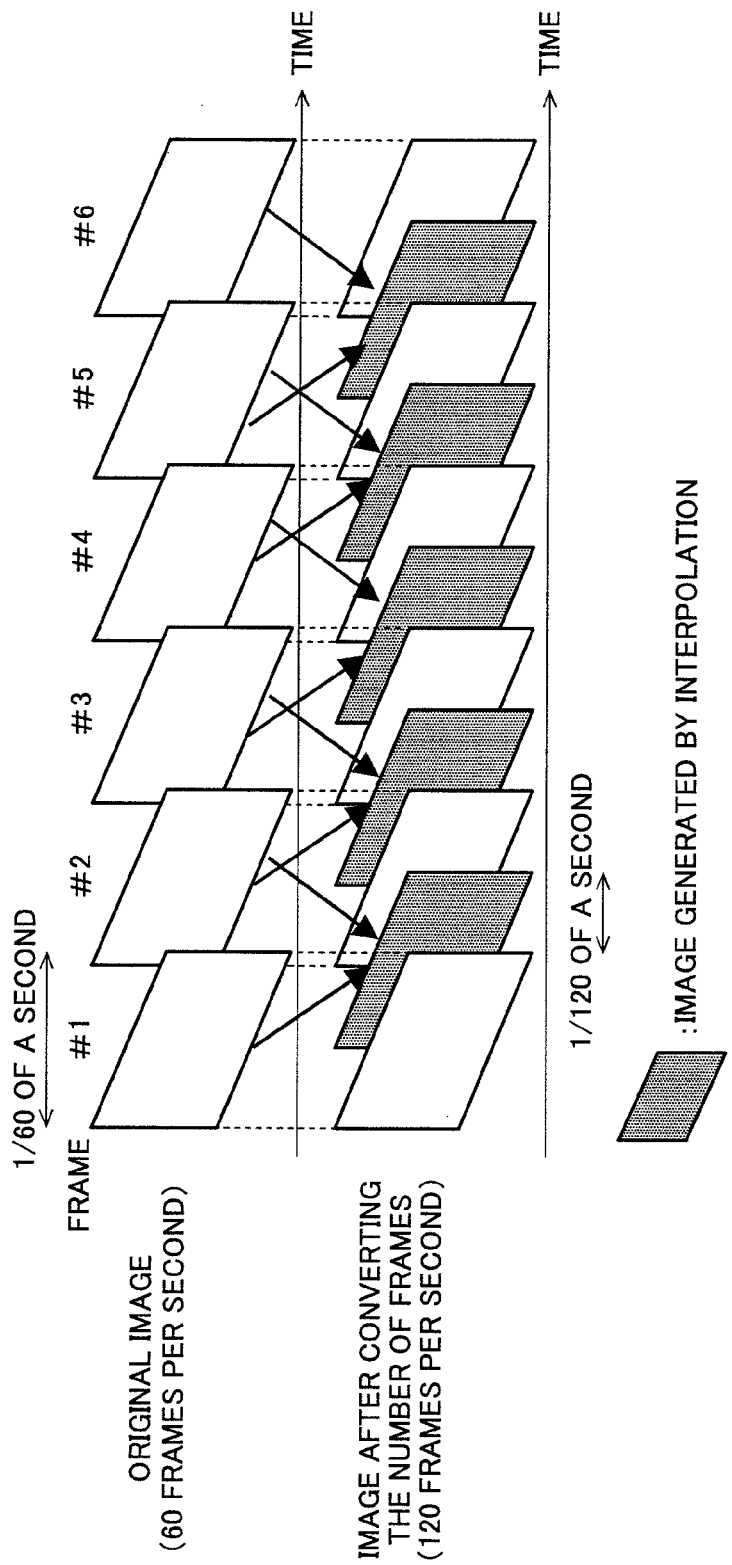
FIG. 2 is a diagram for explaining a frame rate conversion processing by the conventional FRC drive display circuit shown in FIG. 1.
Figure 3:
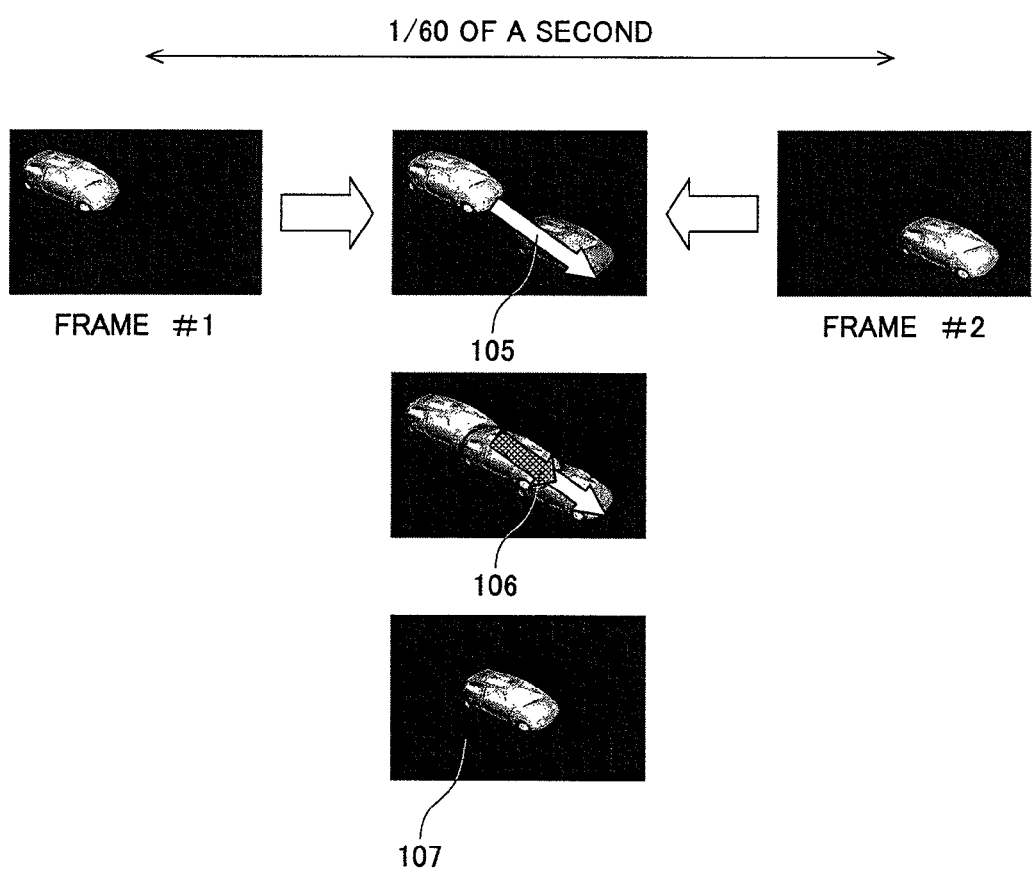
FIG. 3 is a diagram for explaining an interpolation frame generating processing of a motion vector detecting portion and an interpolation frame generating portion.

EXPLANATIONS OF REFERENCE NUMERALS 10, 100 . . . frame rate converting (FRC) portion; 11 . . . vector detecting portion; 11a . . . luminance signal extracting portion; 11b . . . preprocessing filter; 11c . . . motion detection frame memory; 11d . . . initial vector memory; 11e, 101 . . . motion vector detecting portion; 11f . . . interpolation vector evaluating portion; 12 . . . frame generating portion; 12a . . . interpolation frame memory; 12b, 102 . . . interpolation frame generating portion; 12c . . . time base conversion frame memory; 12d . . . time base converting portion; 12e, 12g . . . compensation intensity varying portion; 12f . . . interpolation vector memory; 14 . . . movement amount determining portion; 15 . . . controlling portion; 16, 25 . . . switching portion; 17 . . . zero-vector; 18, 103 . . . electrode driving portion; 19, 104 . . . liquid crystal display panel; 20, 26 . . . path; 21 . . . decoder; 22, 28 . . . memory; 23, 27 . . . linear interpolation processing portion; 24 black-level signal insertion processing portion; 105 . . . motion vector; 106 . . . interpolation vector; and 107 . . . interpolation frame.

PREFERRED EMBODIMENTS OF THE INVENTION

A preferred embodiment of an image displaying device of the present invention will now be described referring to the accompanying drawings. Although the present invention is applicable to either field signals and interpolation field signals or frame signals and interpolation frame signals, the frame signals and the interpolation frame signals will be described as a representative example since both (field and frame) are in a similar relationship with each other.

Figure 5:
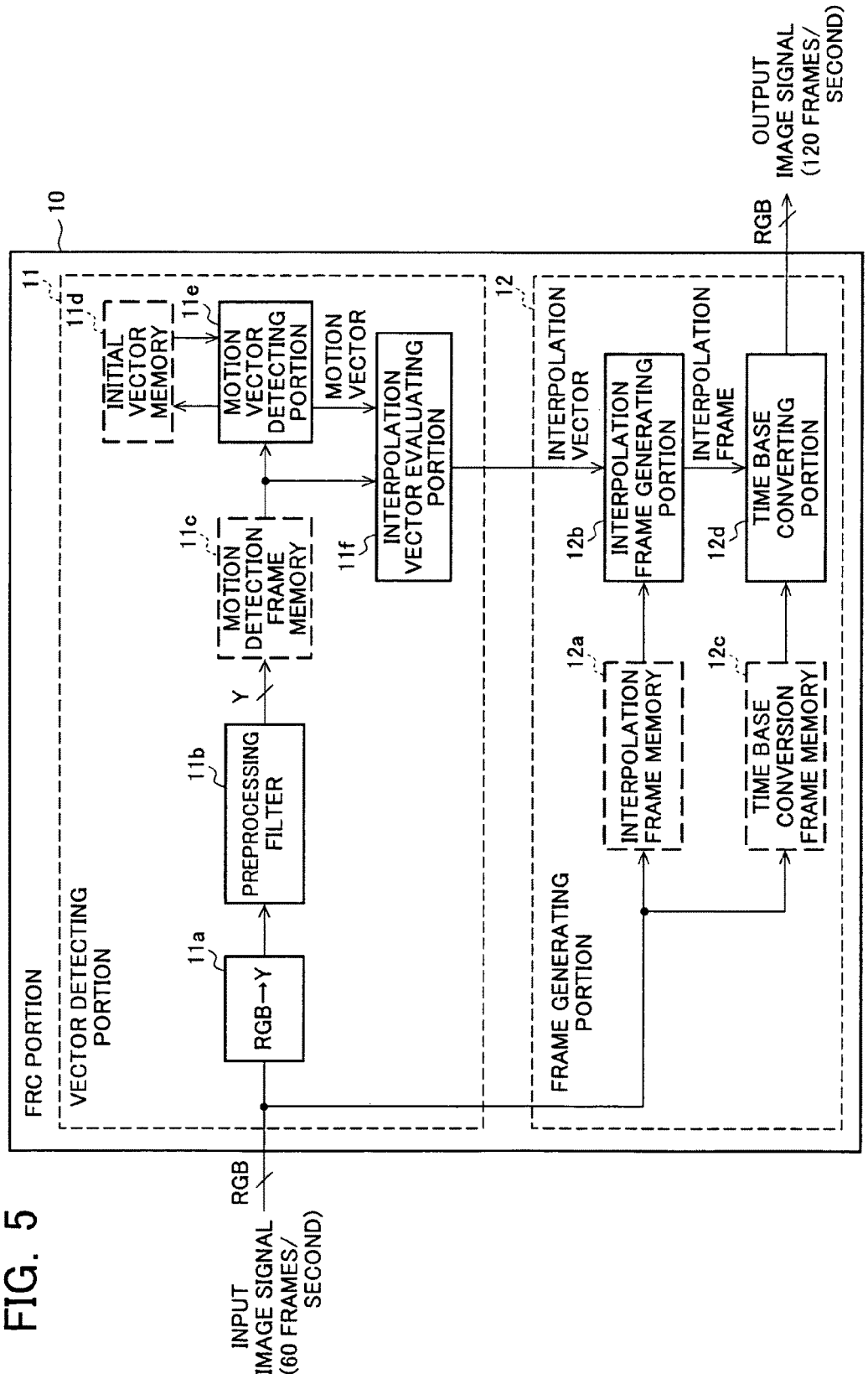
FIG. 5 is a block diagram of an exemplary configuration of a frame rate converting portion included in an image displaying device of the present invention.

FIG. 5 is a block diagram of an exemplary configuration of a motion-compensated frame rate converting portion included in the image displaying device of the present invention, in FIG. 5, reference numeral 10 denotes a frame rate converting portion (hereinafter, FRC portion), and the FRC portion 10 corresponds to a rate converting means of the present invention and is comprised of a vector detecting portion 11 that detects a motion vector between two consecutive frames included in an input image signal and a frame generating portion 12 that generates an interpolation frame (interpolation image) based on the detected motion vector. Although the iterative gradient method is used for the motion vector detection in the description of the vector detecting portion 11, the method is not limited to the iterative gradient method and may be the block matching method.

In FIG. 5, the vector detecting portion 11 includes a luminance signal extracting portion 11a that extracts a luminance signal (Y signal) from an input image signal (RGB signal), a preprocessing filter 11b that limits a high bandwidth by applying LPF to the extracted Y signal, a motion detection frame memory 11c, an initial vector memory 11d that accumulates initial vector candidates, a motion vector detecting portion 11e that detects motion vectors between frames with the use of the iterative gradient method, and an interpolation vector evaluating portion 11f that allocates an interpolation vector between the frames based on the detected motion vectors.

The FRC portion 10 corresponds to the rate converting means of the present invention; the motion vector detecting portion 11e corresponds to a motion vector detecting portion of the present invention; and the interpolation vector evaluating portion 11f corresponds to an interpolation vector allocating portion of the present invention.

Since a differential component of a pixel is used for the calculations of the above iterative gradient method, the method is easily affected by noises and calculation errors are increased if large gradient variations exist in a detected block and, therefore, the LPF is applied by the preprocessing filter 11b to limit the high bandwidth. In the initial vector memory 11d, motion vectors (initial vector candidates) already detected in a frame immediately before the previous frame are accumulated as initial vector candidates.

The motion vector detecting portion 11e selects a motion vector closest to the motion vector of the detected block for an initial vector from the initial vector candidates accumulated in the initial vector memory 11d. The initial vector is selected by the block matching method from the already detected motion vectors (initial vector candidates) in neighboring blocks of the detected block. The motion vector detecting portion 11e uses the selected initial vector as a starting point to detect a motion vector between a previous frame and a current frame through the calculations of the gradient method.

The interpolation vector evaluating portion 11f evaluates the motion vectors detected by the motion vector detecting portion 11e, allocates an optimum interpolation vector to an interpolation block between frames based on the evaluation result, and outputs the vector to the frame generating portion 12.

The frame generating portion 12 includes an interpolation frame memory 12a that accumulates two input frames (previous frame and current frame), an interpolation frame generating portion 12b that generates an interpolation frame based on the two input frames from the interpolation frame memory 12a and the interpolation vector from the interpolation vector evaluating portion 11f, a time base conversion frame memory 12c for accumulating the input frames (previous frame and current frame), and a time base converting portion 12d that inserts the interpolation frame from the interpolation frame generating portion 12b into the input frames from the time base conversion frame memory 12c to generate an output image signal (RGB signal).

The interpolation frame generating portion 12b corresponds to an interpolation image generating portion of the present invention and the time base converting portion 12d corresponds to an image interpolating portion of the present invention.

Figure 6:
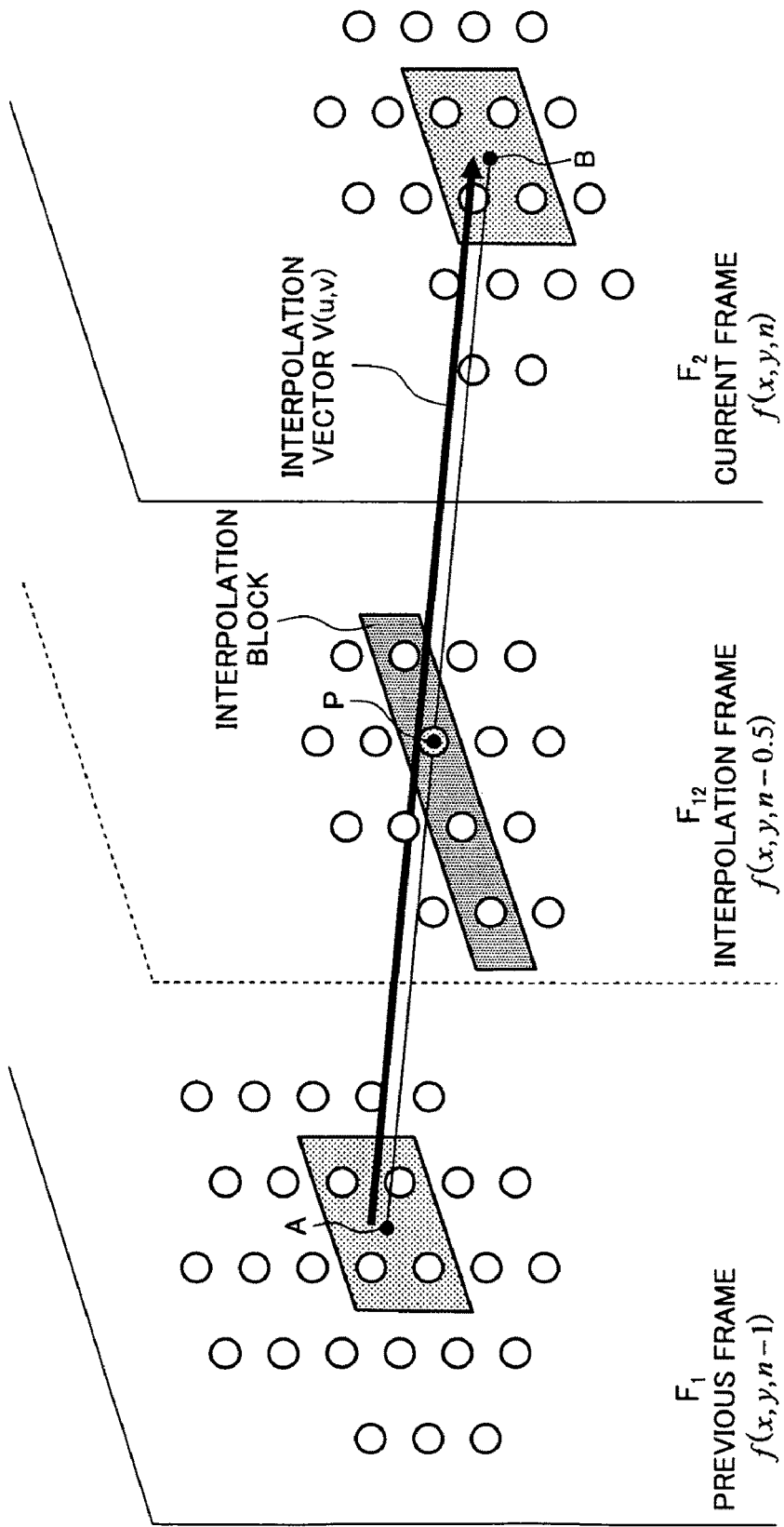
FIG. 6 is a diagram for explaining an example of an interpolation frame generating processing of a frame generating portion.

FIG. 6 is a diagram for explaining an example of the interpolation frame generating processing of the frame generating portion 12. The interpolation frame generating portion 12b stretches an interpolation vector V allocated to the interpolation block into the previous frame and the current frame and uses pixels located adjacent to the intersecting points with the frames to interpolate the pixels in the interpolation block. For example, in the previous frame $F_1$, the luminance of a point A is calculated from three adjacent points. In the current frame $F_2$, the luminance of a point B is calculated from three adjacent points. In the interpolation frame $F_u$, the luminance of a point P is interpolated using the luminance of the points A and B. The luminance of the point P may be an average of the luminance of the point A and the luminance of the point B, for example.

The interpolation frame $F_{12}$ generated as above is sent to the time base converting portion 12d. The time base converting portion 12d sandwiches the interpolation frame $F_{12}$ between the previous frame $F_1$ and the current frame $F_2$ to perform a processing of converting a frame rate. In this way, the FRC portion 10 may convert the input image signal (60 frames/sec) into a motion-compensated output image signal (120 frames/sec), which may be output to a display panel to reduce the motion blur and improve the moving image quality. Although the 60-frame/sec input image signal is converted into the 120-frame/sec (double) output image signal in the frame rate conversion of this description, this is obviously applicable to the case of acquiring 90-frame/sec (1.5 times) and 180-frame/sec (three times) output image signals, for example.

The image displaying device of the present invention includes the FRC portion 10 shown in FIG. 5 and the main object thereof is to uses a means for making the motion compensation processing of the FRC portion 10 ineffective to prevent the image quality deterioration due to the FRC processing when a movement amount between frames of the input image signal is large. Although the present invention is applicable to general image displaying devices having the hold-type display characteristics such as liquid crystal displays, organic EL displays, and electrophoretic displays, a representative example described in the following embodiments will be the case of applying the present invention to a liquid crystal displaying device using a liquid crystal display panel for a display panel.

In a first embodiment of the present invention, when the movement amount between the frames of the input image signal is larger than a predetermined value, the output of the motion vector detecting portion 11e is forced to be zero-vector to make the motion compensation processing of the FRC portion 10 ineffective.

Figure 7:
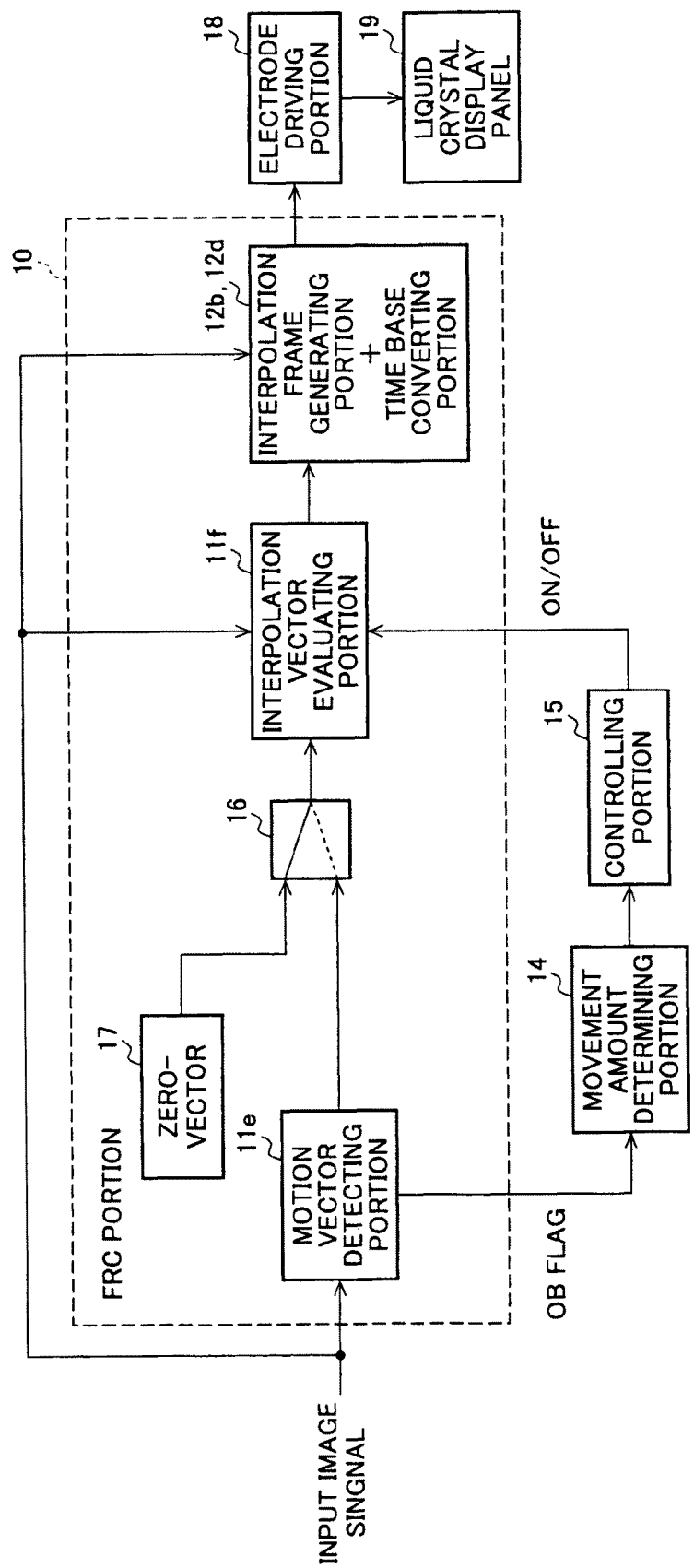
FIG. 7 is a block diagram of an exemplary main configuration of a liquid crystal displaying device according to a first embodiment of the present invention.

FIG. 7 is a block diagram of an exemplary main configuration of a liquid crystal displaying device according to the first embodiment of the present invention, and the liquid crystal displaying device includes the FRC portion 10, a movement amount determining portion 14, a controlling portion 15, a switching portion 16, a zero-vector portion 17, an electrode driving portion 18, and a liquid crystal display panel 19. The switching portion 16 is disposed between the motion vector detecting portion 11e and the interpolation vector evaluating portion 11f within the FRC portion 10 and switches over the motion vector from the motion vector detecting portion 11e to the zero-vector 17 in accordance with the instruction from the controlling portion 15.

The motion vector detecting portion 11e outputs motion vectors detected by a predetermined calculation and outputs an OB flag "1" to a block to which a certain specific processing described above with FIGS. 4 (B) and (C) has been given because a vector calculated during the calculation for motion vector detection exceeds the predetermined vector evaluation calculation range that is set by the interpolation vector evaluating portion 11f at the same time. An OB flag "0" is output to a block to which a specific processing is not given because no vector exceeding the predetermined vector evaluation calculation range is calculated during the calculation for motion vector detection.

The movement amount determining portion 14 counts the number of OB flags "1" that means exceeding the predetermined vector evaluation calculation range during the calculation for motion vector detection by the motion vector detecting portion lie and determines whether or not the counted value is larger than a predetermined threshold for each frame, to thereby determine whether or not the movement amount between the frames of the input image signal is larger than a predetermined value.

In this manner, the movement amount determining portion 14 of this embodiment compares the number of blocks in a screen in which the motion vector calculated by the motion vector detecting portion lie exceeds the predetermined vector calculation evaluation range with a predetermined value to thereby determine whether or not the movement amount between the frames of the input image signal exceeds a predetermined range, but is obviously not limited to the above configuration.

The controlling portion 15 includes a CPU for controlling each of the portions, and, when the movement amount determining portion 14 determines that the input image signal is an image signal that has the movement amount larger than a predetermined value, the controlling portion 15 controls to make the motion compensation processing in the FRC portion 10 ineffective. That is, the liquid crystal displaying device of this embodiment determines whether or not the movement amount between the frames of the input image signal is larger than a predetermined value, and controls the motion compensation processing of the FRC portion 10 according to the result of the determination.

The liquid crystal display panel 19 is an active-matrix liquid crystal display that has a liquid crystal layer and electrodes for applying scan signals and data signals to the liquid crystal layer. The electrode driving portion 18 is a display driver for driving the scan electrodes and the data electrodes of the liquid crystal display panel 19 based on the image signal to which the frame rate conversion by the FRC portion 10 has been given.

The drive frequency of the liquid crystal display panel 19 is a frame frequency converted by the FRC portion 10. Therefore, if an image signal input with a frame frequency of 60 Hz is converted by the FRC portion 10 into a frame frequency of 120 Hz, the drive frequency of the liquid crystal display panel 19 is 120 Hz. However, if the frame frequency conversion of the FRC processing is not performed and the input image signal is directly displayed and output, the drive frequency of the liquid crystal display panel 19 is the frame frequency of the input image signal.

When the movement amount determining portion 14 determines that the movement amount between the frames of the input image signal is larger than a predetermined value, the controlling portion 15 switches the switching portion 16 to the zero-vector 17 to forcibly replace the motion vector detected and calculated by the motion vector detecting portion 11e with the zero-vector.

When the movement amount determining portion 14 determines as an image signal in which the movement amount between the frames of the input image signal is smaller than a predetermined value, the switching portion 16 is switched to the motion vector detecting portion 11e to input the motion vector detected and calculated by the motion vector detecting portion 11e to the interpolation vector evaluating portion 11f.

In this manner, when an ordinary moving image is displayed, the moving image quality may be improved by the motion-compensated FRC processing, and when an image signal in which the movement amount between the frames is larger than a predetermined value is input, the detection errors, the motion compensation errors, etc., of the motion vector due to the large movement amount between the frames are eliminated and the image quality may effectively be prevented from deteriorating due to the motion-compensated FRC processing by making the motion compensation processing ineffective with the motion vector set to zero-vector.

In a second embodiment of the present invention, when the movement amount between the frames of the input image signal is larger than a predetermined value, the interpolation vector from the interpolation vector evaluating portion 11f is set to zero-vector to make the motion compensation processing of the FRC portion 10 ineffective so that no interpolation can occur between pixels located at different positions.

Figure 8:
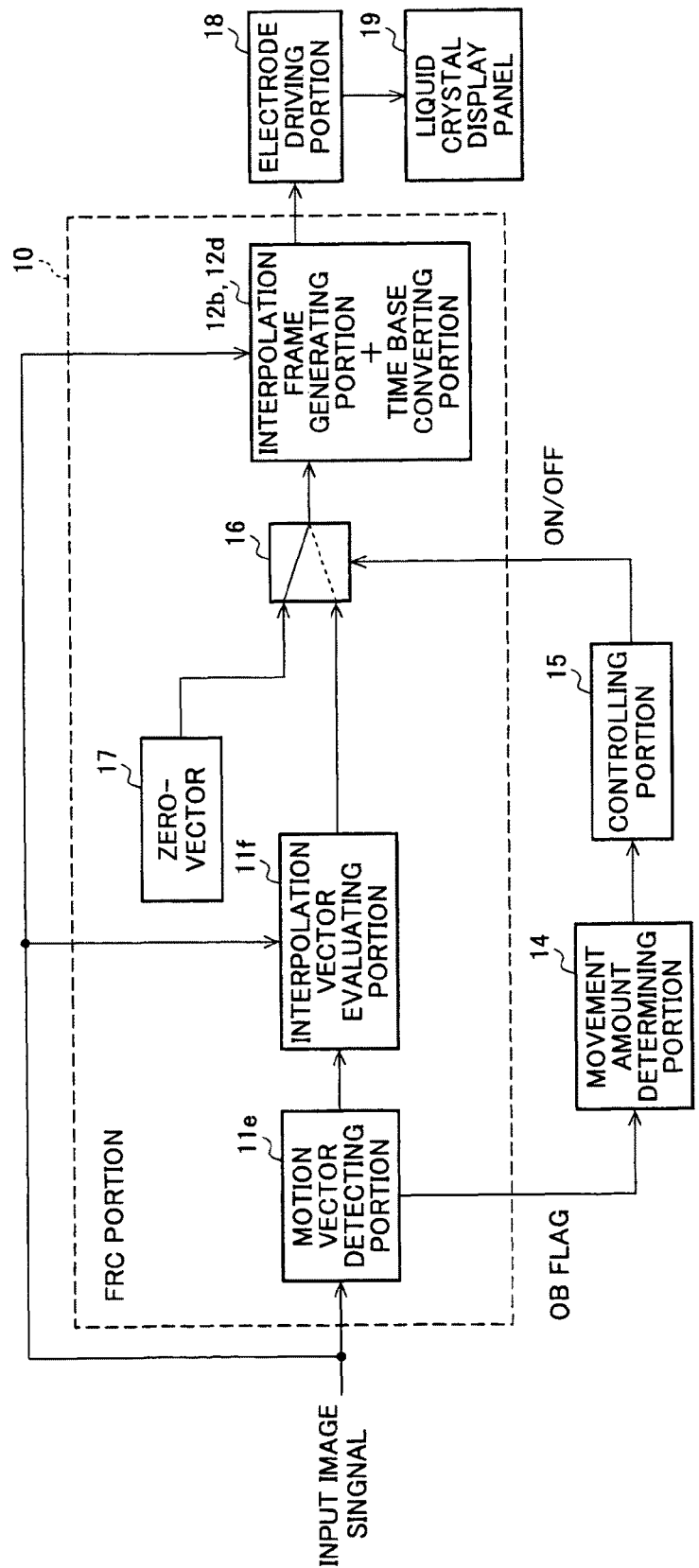
FIG. 8 is a block diagram of an exemplary main configuration of a liquid crystal displaying device according to a second embodiment of the present invention.

FIG. 8 is a block diagram of an exemplary main configuration of a liquid crystal displaying device according to the second embodiment of the present invention, and the liquid crystal displaying device includes the FRC portion 10, the movement amount determining portion 14, the controlling portion 15, the switching portion 16, the zero-vector portion 17, the electrode driving portion 18, and the liquid crystal display panel 19. The switching portion 16 is disposed between the interpolation vector evaluating portion 11f and the interpolation frame generating portion 12b within the FRC portion 10 and switches the interpolation vector from the interpolation vector evaluating portion 11f to the zero-vector 17 in accordance with the instruction from the controlling portion 15.

The motion vector detecting portion 11e outputs motion vectors detected by a predetermined calculation to the interpolation vector evaluating portion 11f and outputs the OB flag information for each block that shows whether or not the vector calculated during the calculation for motion vector detection exceeds the predetermined vector evaluation calculation range that is set by the interpolation vector evaluating portion 11f to the movement amount determining portion 14 at the same time.

The movement amount determining portion 14 determines whether or not the movement amount between the frames of the input image signal is larger than a predetermined value based on the OB flag information output from the motion vector detecting portion 11e and outputs the result of the determination to the controlling portion 15.

When the movement amount determining portion 14 determines that the movement amount between the frames of the input image signal is larger than a predetermined value, the controlling portion 15 switches the switching portion 16 to the zero-vector 17 to set the interpolation vector allocated by the interpolation vector evaluating portion 11f to zero-vector. When the movement amount determining portion 14 determines that the movement amount between the frames of the input image signal is smaller than a predetermined value, the switching portion 16 is switched to the interpolation vector evaluating portion 11f to input the interpolation vector allocated by the interpolation vector evaluating portion 11f to the interpolation frame generating portion 12b.

In this manner, when an ordinary moving image is displayed, the moving image quality may be improved by the motion-compensated FRC processing, and when an image signal in which the movement amount between the frames is larger than a predetermined value is input, the detection errors, the motion compensation errors, etc., of the motion vector due to the large movement amount between the frames are eliminated and the image quality may effectively be prevented from deteriorating due to the motion-compensated FRC processing by making the motion compensation processing ineffective with the interpolation vector set to zero-vector forcibly, similarly to the first embodiment.

In a third embodiment of the present invention, when the movement amount between the frames of the input image signal is larger than a predetermined value, the interpolation vector from the interpolation vector evaluating portion 11f is set to zero-vector to make the motion compensation processing of the FRC portion 10 ineffective so that no interpolation can occur between pixels located at different positions.

Figure 9:
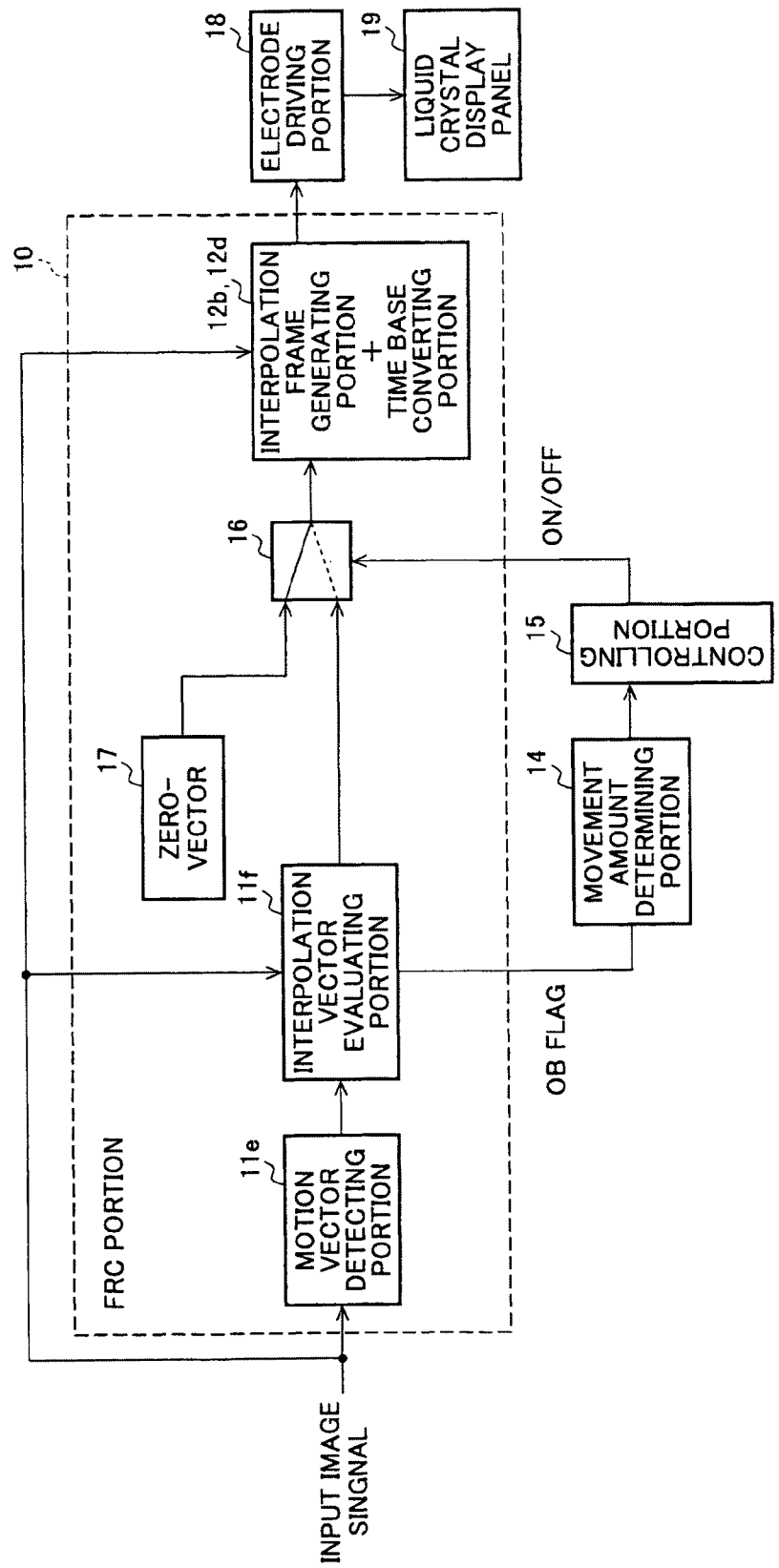
FIG. 9 is a block diagram of an exemplary main configuration of a liquid crystal displaying device according to a third embodiment of the present invention.

FIG. 9 is a block diagram of an exemplary main configuration of a liquid crystal displaying device according to the third embodiment of the present invention and the liquid crystal displaying device includes the FRC portion 10, the movement amount determining portion 14, the controlling portion 15, the switching portion 16, the zero-vector portion 17, the electrode driving portion 18, and the liquid crystal display panel 19. The switching portion 16 is disposed between the interpolation vector evaluating portion 11f and the interpolation frame generating portion 12b within the FRC portion 10 and switches the interpolation vector from the interpolation vector evaluating portion 11f to the zero-vector 17 in accordance with the instruction from the controlling portion 15.

The motion vector detecting portion 11e outputs the motion vectors detected by a predetermined calculation and the OB flag information for each block that shows whether or not a vector calculated during the calculation for motion vector detection exceeds the predetermined vector evaluation calculation range set by the interpolation vector evaluating portion 11*f*, to the interpolation vector evaluating portion 11*f*.

The interpolation vector evaluating portion 11*f* evaluates motion vectors output by the motion vector detecting portion 11*e* and allocates an optimum interpolation vector for each interpolation block. Specifically, the equivalent motion vector is allocated to the interpolation block indicated by the motion vector from the detected block. However, the allocated interpolation block may be also indicated from a different detected block from the detected block. That is, a plurality of motion vectors may be allocated to one interpolation block. In such a case, the DFD is calculated for each of the plurality of motion vectors and a motion vector having the smallest DFD (that is, more accurate motion vector) is employed and allocated.

In this case, the OB flag information corresponding to the allocated motion vector is also allocated for each interpolation block. The OB flag information for each interpolation block is output to the movement amount determining portion 14.

The movement amount determining portion 14 uses the OB flag information that is applied for each interpolation block output by the interpolation vector evaluating portion 11*f* to determine whether or not the movement amount between the frames of the input image signal is larger than the predetermined vector evaluation calculation range. That is, the number of OB flags "1" that means exceeding the predetermined vector evaluation calculation range when the allocated motion vector is detected and calculated is counted and whether or not the counted value is larger than a predetermined threshold is determined for each frame, so that whether or not the movement amount between the frames of the input image signal is larger than a predetermined value is determined.

When the movement amount determining portion 14 determines that the movement amount between the frames of the input image signal is larger than a predetermined value, the controlling portion 15 switches the switching portion 16 to the zero-vector 17 to set the interpolation vector allocated by the interpolation vector evaluating portion 11*f* to zero-vector. When the movement amount determining portion 14 determines that the movement amount between the frames of the input image signal is smaller than a predetermined value, the switching portion 16 is switched to the interpolation vector evaluating portion 11*f* to input the interpolation vector allocated by the interpolation vector evaluating portion 11*f* to the interpolation frame generating portion 12*b*.

In this manner, when an ordinary moving image is displayed, the moving image quality may be improved by the motion-compensated FRC processing, and when an image signal in which the movement amount between the frames is larger than a predetermined value is input, the detection errors, the motion compensation errors, etc., of the motion vector due to the large movement amount between the frames are eliminated and the image quality may effectively be prevented from deteriorating due to the motion-compensated FRC processing by making the motion compensation processing ineffective with the interpolation vector set to zero-vector forcibly, similarly to the first embodiment.

In a fourth embodiment of the present invention, a path is provided to bypass the FRC portion 10 and, when the movement amount between the frames of the input image signal is larger than a predetermined value, the input image signal is input to the bypass to change the drive frequency of the liquid crystal display panel 19 in conformity with the frame frequency of the input image signal. When an image signal in which the movement amount between the frames is larger than a predetermined value is input, the switching is performed such that the input image signal is directly displayed and output to the liquid crystal display panel 19 without performing the frame rate conversion.

Figure 10:
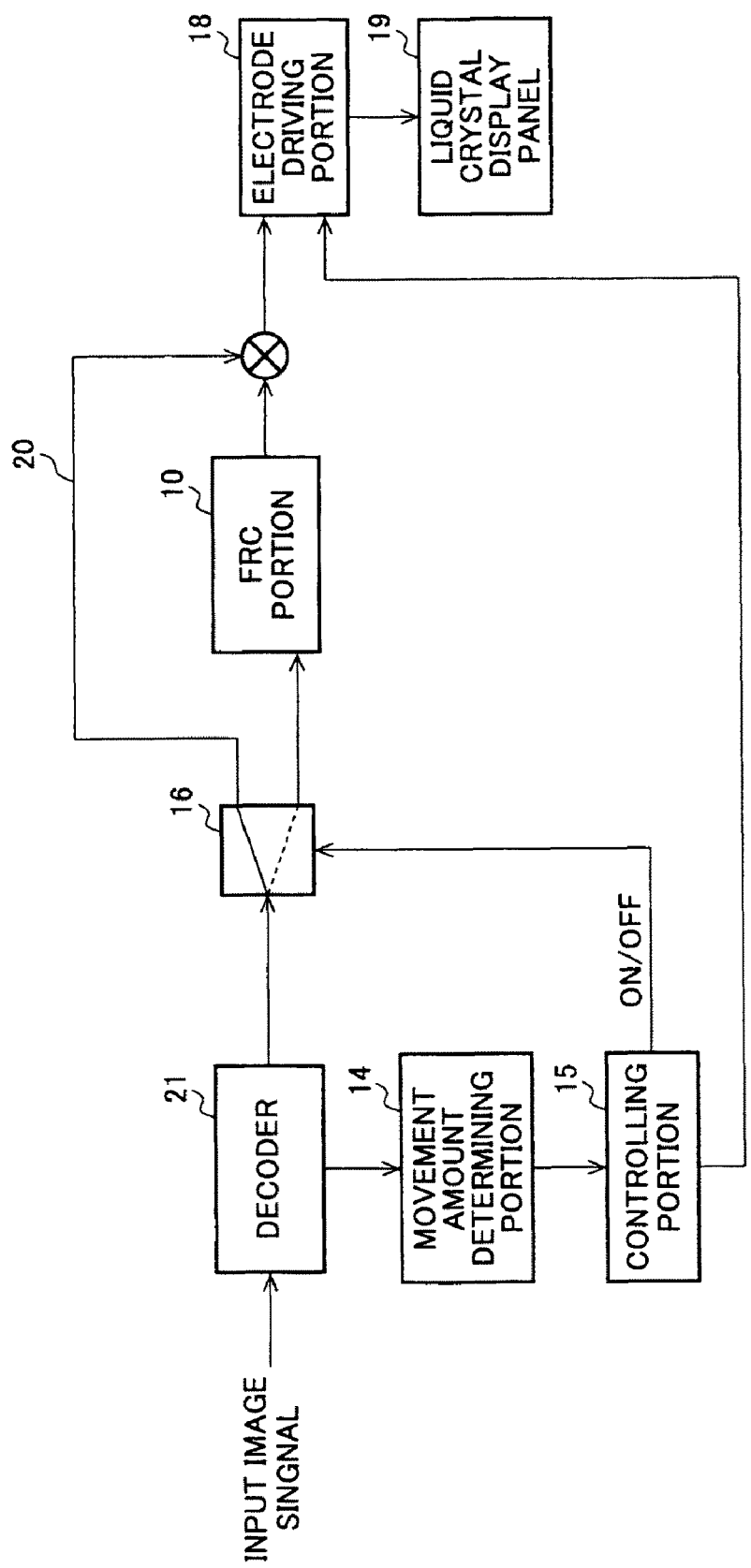
FIG. 10 is a block diagram of an exemplary main configuration of a liquid crystal displaying device according to a fourth embodiment of the present invention.

FIG. 10 is a block diagram of an exemplary main configuration of a liquid crystal displaying device according to the fourth embodiment of the present invention, and the liquid crystal displaying device includes the FRC portion 10, the decoder 21, the movement amount determining portion 14, the controlling portion 15, the switching portion 16, the electrode driving portion 18, the liquid crystal display panel 19, and a path 20 for bypassing the FRC portion 10. The switching portion 16 is disposed on the previous stage of the FRC portion 10 and switches the input image signal to input whether to the FRC portion 10 or to the path 20 in accordance with the instruction from the controlling portion 15.

When the input image signal is a compressed input signal (for example, MPEG and DivX, etc.,) that is compressed with the use of the motion vector information, etc., the compressed input signal is restored by the decoder 21 into the image signal and input to the FRC portion 10. When the input image signal is compressed with the use of the motion vector information in this case, the motion vector that is used for restoring may be extracted from the decoder 21. In this embodiment, the movement amount determining portion 14 determines whether or not the movement amount between the frames of the input image signal is larger than a predetermined value based on the extracted motion vector.

Specifically, the case where a total value or an average value of lengths of the motion vectors output from the decoder 21 for one frame is larger than a predetermined threshold, or the case where the motion vectors output from the decoder 21 that has lengths larger than a predetermined threshold are counted for each block and the counted value is larger than a predetermined value, is determined as an image signal in which the movement amount between the frames is larger than a predetermined value.

Although the movement amount between the frames of the input image signal is determined with the use of motion vectors extracted from the decoder 21, it is obvious that the movement amount determination processing as described above for the first to third embodiments may be employed without limiting to the above.

When the movement amount determining portion 14 determines that the movement amount between the frames of the input image signal is larger than a predetermined value, the controlling portion 15 shifts the switching portion 16 to the path 20 to bypass the FRC portion 10. When the movement amount determining portion 14 determines that the movement amount between the frames of the input image signal is smaller than a predetermined value, the switching portion 16 is shifted to the FRC portion 10 to perform the FRC processing (motion-compensated frame interpolation processing) for the input image signal. The switching portion 16 may be disposed on the subsequent stage of the FRC portion 10 such that the output signal of the FRC portion 10 and the output signal of the path 20 are switched over to output to the liquid crystal display panel 19.

In this embodiment, the controlling portion 15 may change the drive frequency of the liquid crystal display panel 19, and when the image signal in which the movement amount between the frames is larger than a predetermined value is input, the input image signal is input to the path 20 to change the drive frequency of the liquid crystal display panel 19 in conformity with the frame frequency of the input image signal.

Figure 11:
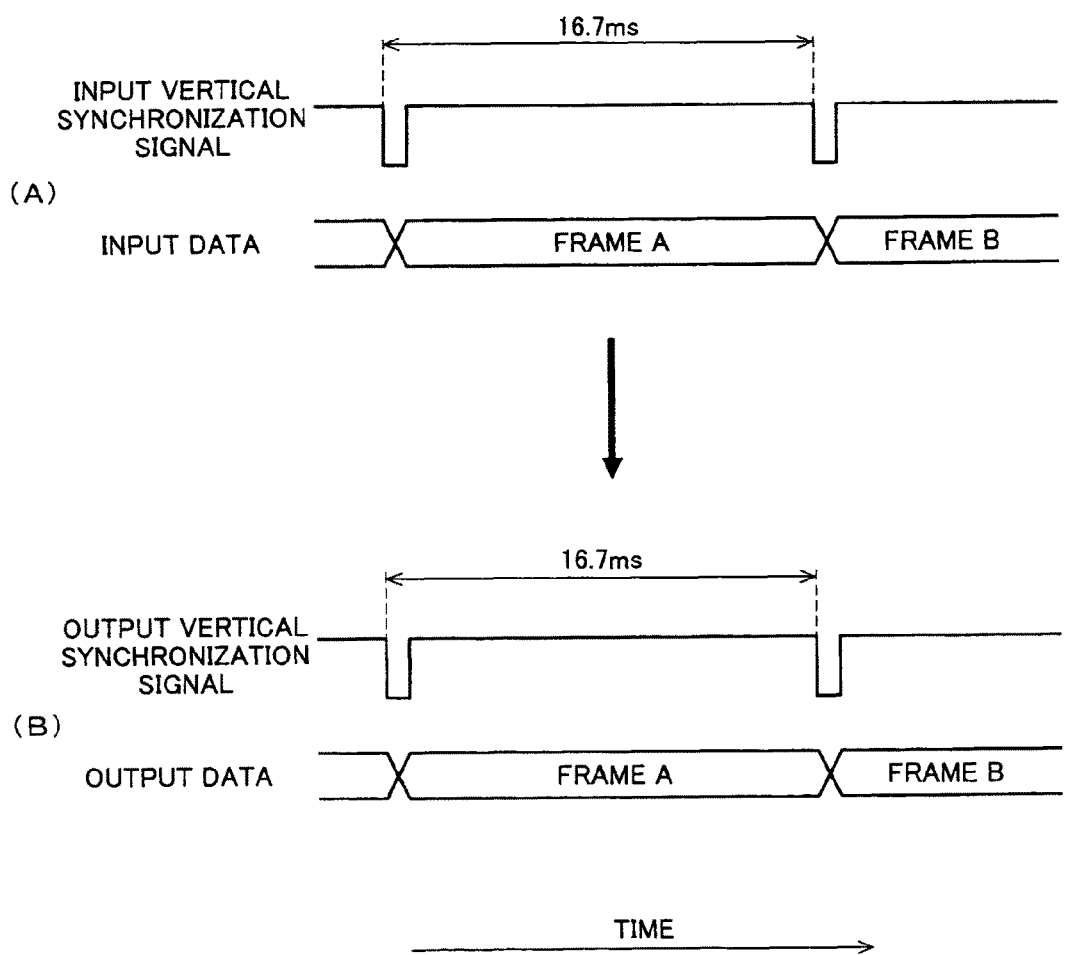
FIG. 11 is a diagram of a relationship between input data and output data according to the fourth embodiment of the present invention.

FIG. 11 is a diagram of a relationship between input data and output data according to the fourth embodiment of the present invention. FIG. 11(A) shows the input data to the path 20 and FIG. 11(B) shows the output data from the path 20. As shown in FIG. 11(A), if the input image signal (input data) is input to the path 20 with a frame frequency of 60 Hz, the display time per frame is about 16.7 ms. The controlling portion 15 controls the electrode driving portion 18, which is the display driver, to change the drive frequency of the liquid crystal display panel 19 from 120 Hz to 60 Hz and causes the input data to be output from the path 20 at 60 Hz without performing the frame rate conversion as shown in FIG. 11(B).

Since the liquid crystal display panel 19 displays the frame output from the path 20 without the frame rate conversion at the drive frequency of 60 Hz, the display time per frame is still about 16.7 ms in this case.

In this manner, when an ordinary moving image is displayed, the moving image quality may be improved by the motion-compensated FRC processing, and when an image signal in which the movement amount between the frames is larger than a predetermined value is input, the detection errors, the motion compensation errors, etc., of the motion vector due to the large movement amount between the frames are eliminated and the image quality may effectively be prevented from deteriorating due to the motion-compensated FRC processing by prohibiting the frame rate conversion itself with the FRC processing bypassed.

In a fifth embodiment of the present invention, a path is provided to bypass the FRC portion 10 and, when the movement amount between the frames of the input image signal is larger than a predetermined value, the input image signal is input to the bypass to accumulate the input image signal in a memory on the path and the frame rate is converted by rapidly and repeatedly reading the image signal of the same frame from the memory more than once. When an image signal in which the movement amount between the frames is larger than a predetermined value is input, the switching is performed such that the input image signal is rapidly and sequentially output to convert the frame rate and is displayed and output on the liquid crystal display panel 19 without performing the motion-compensated frame rate conversion.

Figure 12:
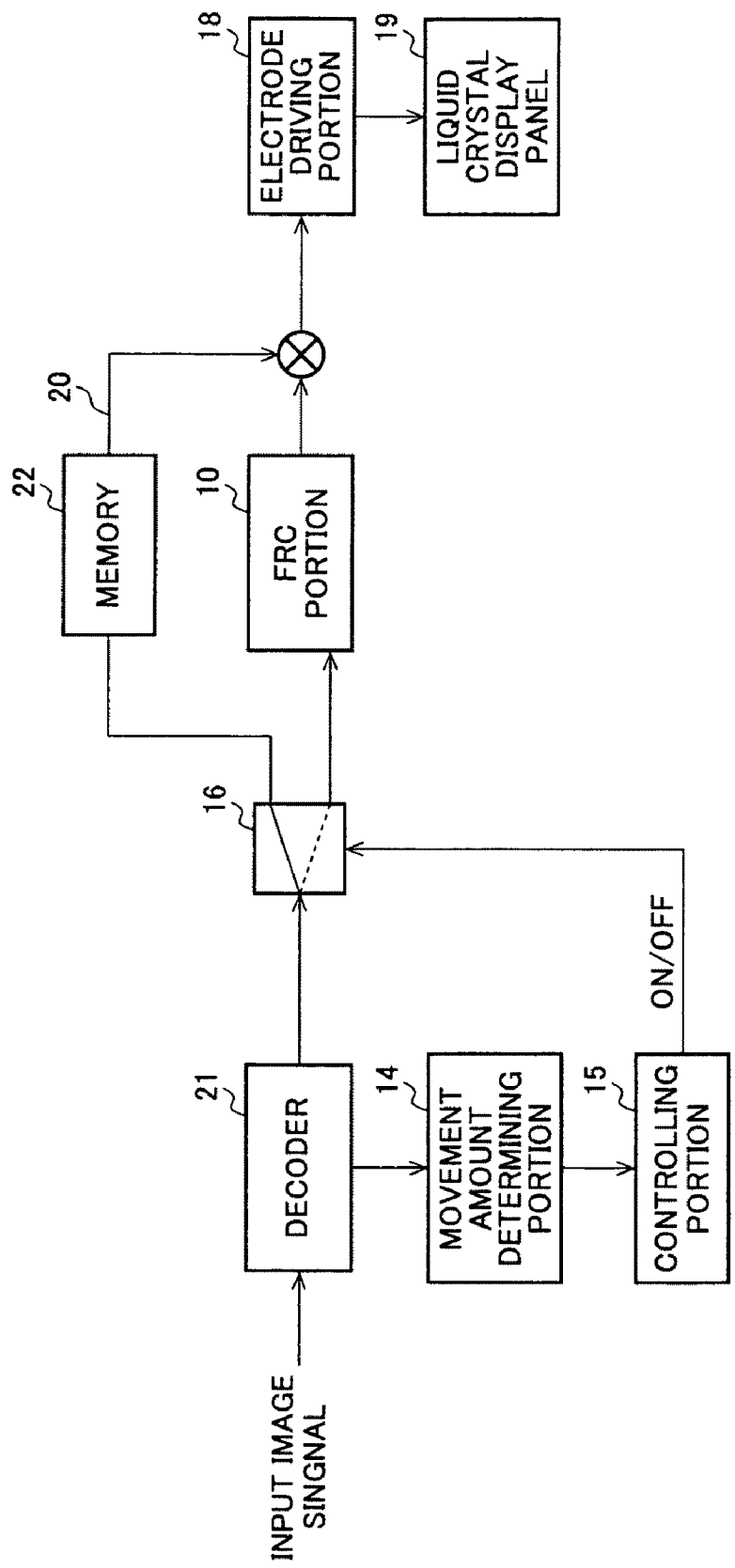
FIG. 12 is a block diagram of an exemplary main configuration of a liquid crystal displaying device according to a fifth embodiment of the present invention.

FIG. 12 is a block diagram of an exemplary main configuration of a liquid crystal displaying device according to the fifth embodiment of the present invention, and the liquid crystal displaying device includes the FRC portion 10, the decoder 21, the movement amount determining portion 14, the controlling portion 15, the switching portion 16, the electrode driving portion 18, the liquid crystal display panel 19, the path 20 for bypassing the FRC portion 10, and a memory 22 on the path 20. The switching portion 16 is disposed on the previous stage of the FRC portion 10 and switches the input image signal to input whether to the FRC portion 10 or to the path 20 in accordance with the instruction from the controlling portion 15.

The movement amount determining portion 14 uses the motion vector information output from the decoder 21 to determine whether or not the movement amount between the frames of the input image signal is larger than a predetermined value.

When the movement amount determining portion 14 determines that the movement amount between the frames of the input image signal is larger than a predetermined value, the controlling portion 15 shifts the switching portion 16 to the path 20 to bypass the processing of the FRC portion 10 and to accumulate the input image signal in the memory 22. The frame insert processing is subsequently performed by repeatedly reading the same frame from the memory 22 more than once.

When the movement amount determining portion 14 determines that the movement amount between the frames of the input image signal is smaller than a predetermined value, the switching portion 16 is switched to the FRC portion 10 to perform the FRC processing (motion-compensated frame interpolation processing) for the input image signal. The switching portion 16 may be disposed on the subsequent stage of the FRC portion 10 such that the output signal of the FRC portion 10 and the output signal of the memory 22 are switched over to output to the liquid crystal display panel 19.

In this embodiment, the drive frequency of the liquid crystal display panel 19 is not changed and is maintained at 120 Hz. When an image signal in which the movement amount between the frames is larger than a predetermined value is input, the controlling portion 15 and the memory 22 comprise a means for inserting an image signal of the previous or subsequent frame between the frames of the input image signal to convert the number of frames of the input image signal. The frame rate (the number of frames) of the display image signal input to the electrode driving portion 18 is always the same.

Figure 13:
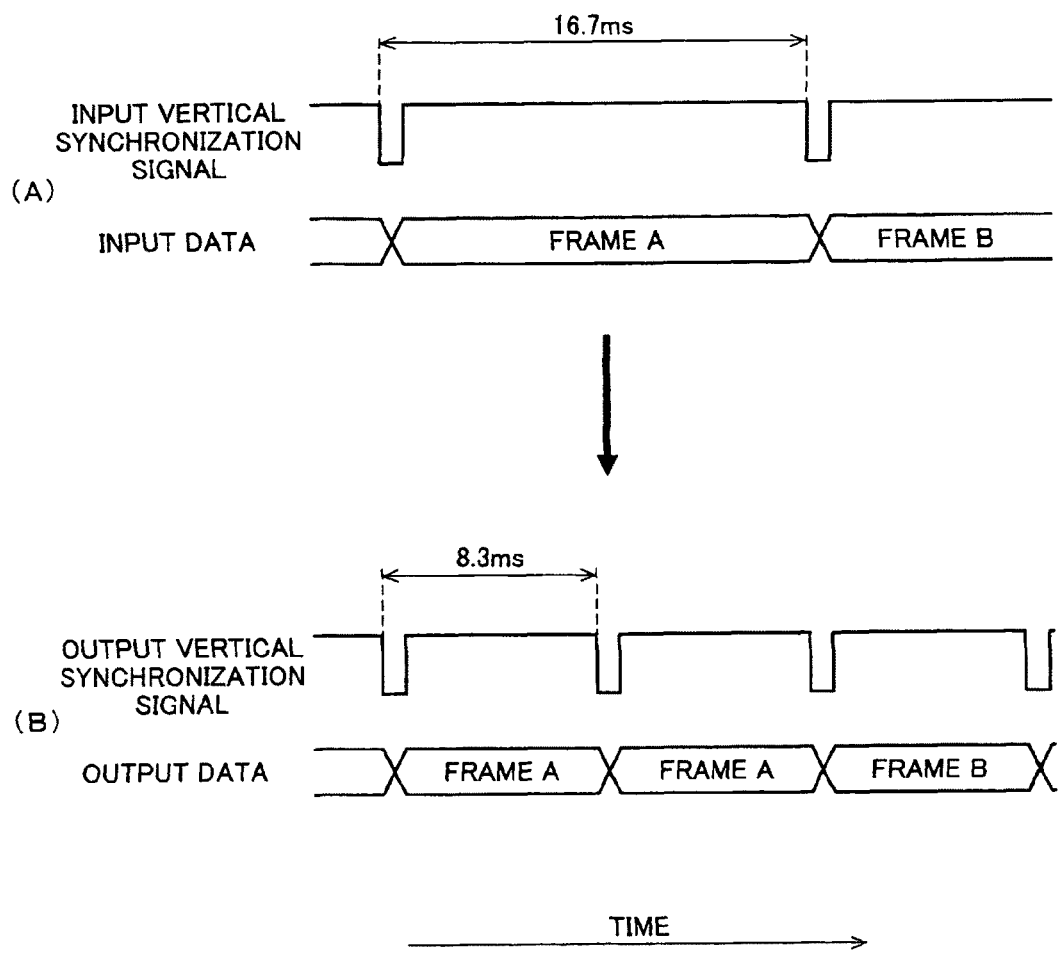
FIG. 13 is a diagram of a relationship between input data and output data according to the fifth embodiment of the present invention.

FIG. 13 is a diagram of a relationship between input data and output data according to the fifth embodiment of the present invention. FIG. 13(A) shows the input data to the path 20 and FIG. 13(B) shows the output data from the path 20. As shown in FIG. 13(A), if the input image signal (input data) is input to the path 20 with a frame frequency of 60 Hz, the display time per frame is about 16.7 ms. The input data are temporarily accumulated in the memory 22 on the path 20, and an image signal of the frame (frame A in FIG. 13(B)) is output which is repeatedly read from the memory 22 at double speed as shown in FIG. 13(B).

The liquid crystal display panel 19 displays the output data into which the image signal of the same frame has been inserted, at the drive frequency of 120 Hz. Since the number of frames is converted by repeatedly reading the same frame twice, the display time per frame is about 8.3 ms in this case.

In this manner, when an ordinary moving image is displayed, the moving image quality may be improved by the motion-compensated FRC processing, and when an image signal in which the movement amount between the frames is larger than a predetermined value is input, the detection errors, the motion compensation errors, etc., of the motion vector due to the large movement amount between the frames are eliminated and the image quality may effectively be prevented from deteriorating due to the motion-compensated FRC processing by not performing the interpolation processing through motion compensation for the input image signal. Since the frame rate is converted by repeatedly reading the same frame in this case, the drive frequency of the liquid crystal display panel 19 does not need to be changed.

In a sixth embodiment of the present invention, a path is provided to bypass the FRC portion 10 and, when the movement amount between the frames of the input image signal is larger than a predetermined value, the input image signal is input to the bypass and the input image signal is input to a linear interpolation processing portion on the path to interpolate an image signal to which the linear interpolation has been performed. That is, when an image signal in which the movement amount between the frames is larger than a predetermined value is input, the switching is performed such that the frame rate is converted by performing the linear interpolation processing rather than the interpolation processing through motion compensation.

Figure 14:
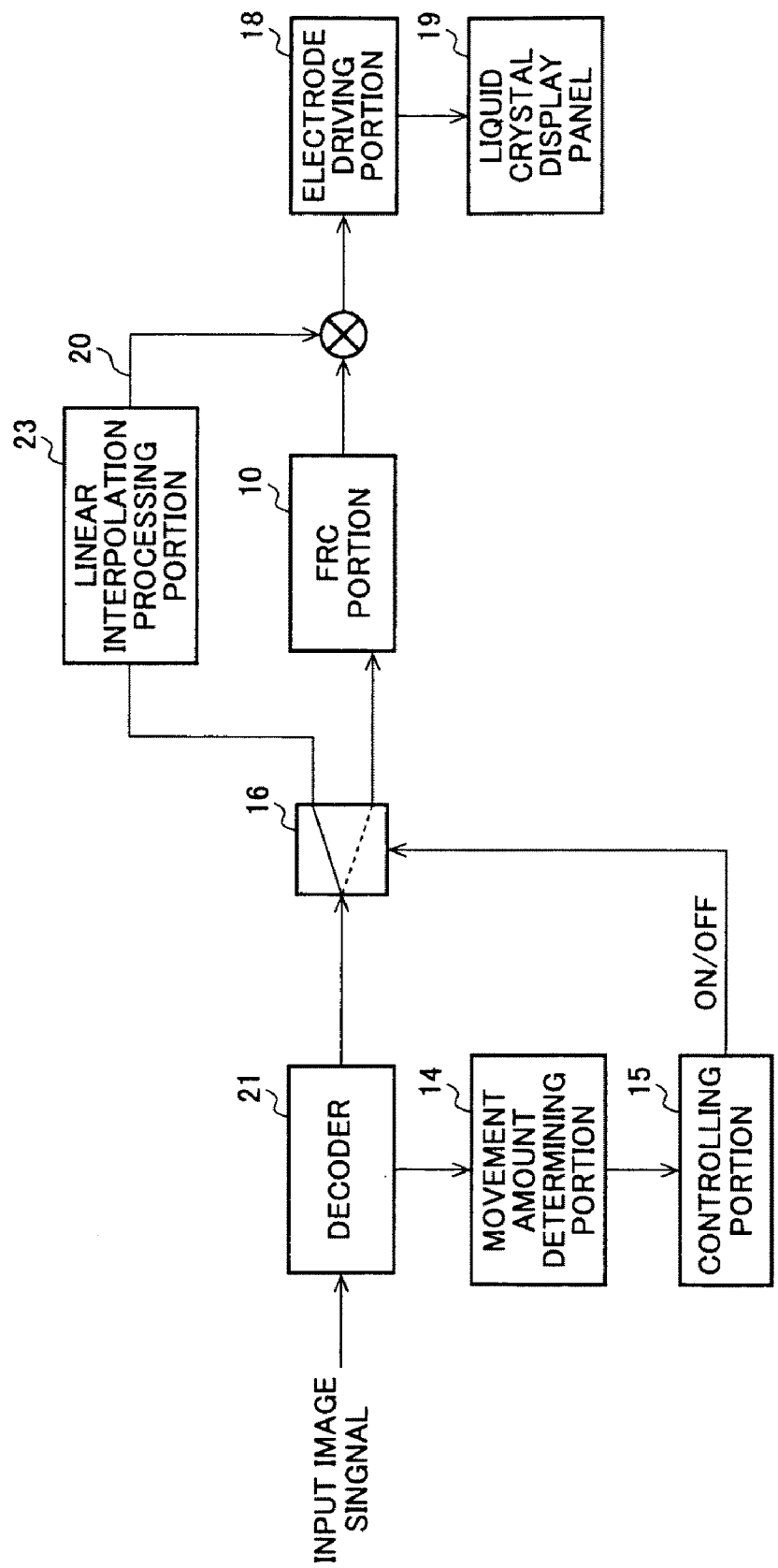
FIG. 14 is a block diagram of an exemplary main configuration of a liquid crystal displaying device according to a sixth embodiment of the present invention.

FIG. 14 is a block diagram of an exemplary main configuration of a liquid crystal displaying device according to the sixth embodiment of the present invention and the liquid crystal displaying device includes the FRC portion 10, the decoder 21, the movement amount determining portion 14, the controlling portion 15, the switching portion 16, the electrode driving portion 18, the liquid crystal display panel 19, the path 20 for bypassing the FRC portion 10, and a linear interpolation processing portion 23 on the path 20. The switching portion 16 is disposed on the previous stage of the FRC portion 10 and switches the input image signal to input whether to the FRC portion 10 or to the path 20 in accordance with the instruction from the controlling portion 15.

The movement amount determining portion 14 uses the motion vector information output from the decoder 21 to determine whether or not an image signal has the larger movement amount between the frames of the input image signal than a predetermined value.

When the movement amount determining portion 14 determines that the movement amount between the frames of the input image signal is larger than a predetermined value, the controlling portion 15 shifts the switching portion 16 to the path 20 to bypass the FRC portion 10 and the input image signal is input to the linear interpolation processing portion 23. The linear interpolation processing portion 23 inserts an interpolation frame to which the linear interpolation processing has been given between the frames.

When the movement amount determining portion 14 determines that the movement amount between the frames of the input image signal is smaller than a predetermined value, the switching portion 16 is switched to the FRC portion 10 to perform the FRC processing (motion-compensated frame interpolation processing) for the input image signal. The switching portion 16 may be disposed on the subsequent stage of the FRC portion 10 such that the output signal of the FRC portion 10 and the output signal of the linear interpolation processing portion 23 are switched over to output to the liquid crystal display panel 19.

In this embodiment, the drive frequency of the liquid crystal display panel 19 is not changed and is maintained at 120 Hz. The frame rate (the number of frames) of the display image signal input to the electrode driving portion 18 is always the same. When an image signal in which the movement amount between the frames is larger than a predetermined value is input, the linear interpolation processing portion 23 comprises a means for interpolating the image signal to which the linear interpolation processing has been given between the frames of the input image signal to convert the number of frames of the input image signal. In the linear interpolation processing, as described in the above document (Yamauchi Tatsuro, "TV Standards Conversion", Journal of the Institute of Television Engineers of Japan, Vol. 45, No. 12, pp. 1534-1543 (1991)), an interpolation frame is acquired through linear interpolation using a frame interpolation ratio $\alpha$ from the signal of the previous frame and the signal of the current frame.

Figure 15:
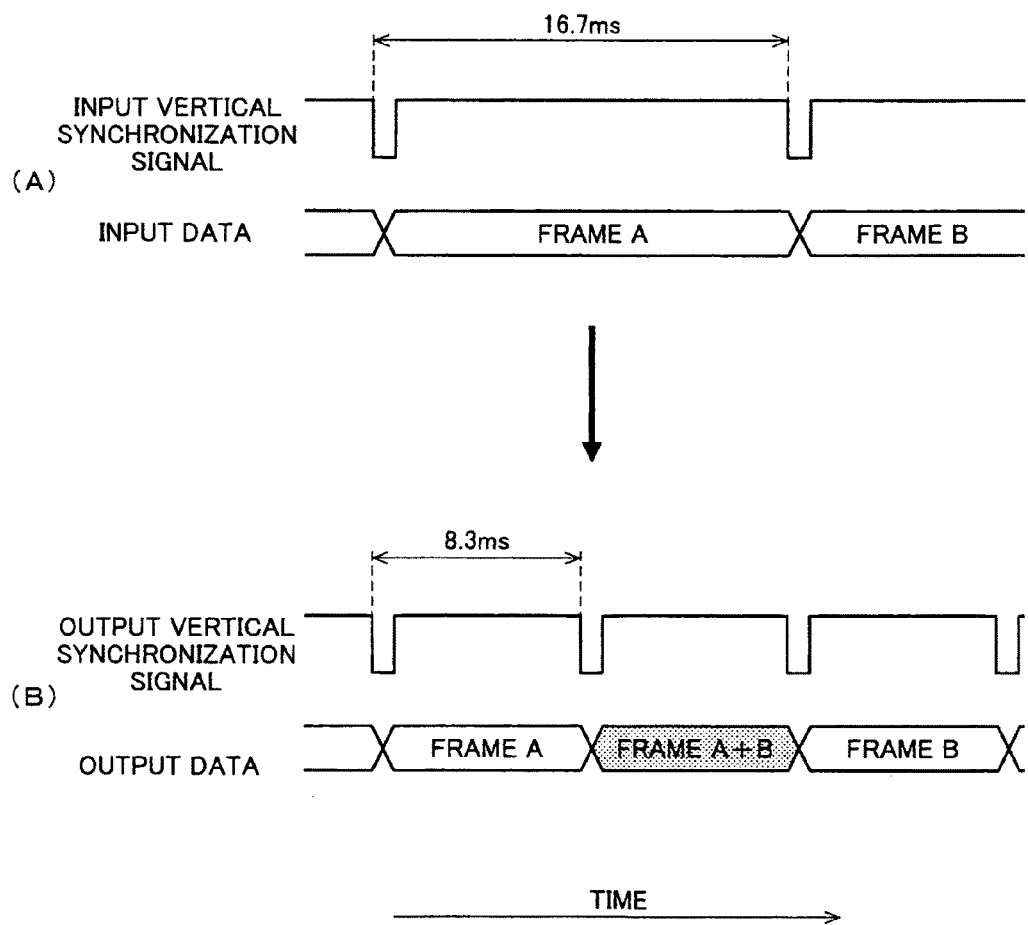
FIG. 15 is a diagram of a relationship between input data and output data according to the sixth embodiment of the present invention.

FIG. 15 is a diagram of a relationship between input data and output data according to the sixth embodiment of the present invention. FIG. 15(A) shows the input data to the path 20 and FIG. 15(B) shows the output data from the path 20. As shown in FIG. 15(A), if the input image signal (input data) is input to the path 20 with a frame frequency of 60 Hz, the display time per frame is about 16.7 ms. The input data are input to the linear interpolation processing portion 23, and the image signal to which the linear interpolation processing has been given (in FIG. 15, frame A+B) is interpolated and output between the frames (in this case, between frames A and B) as shown in FIG. 15(B).

The liquid crystal display panel 19 displays the output data into which the image signal to which the linear interpolation processing has been given, is interpolated at the drive frequency of 120 Hz. Since the number of frames is converted by interpolating the image signal to which the linear interpolation processing has been given, the display time per frame is about 8.3 ms in this case.

In this manner, when an ordinary moving image is displayed, the moving image quality may be improved by the motion-compensated FRC processing, and when an image signal in which the movement amount between the frames is larger than a predetermined value is input, the detection errors, the motion compensation errors, etc., of the motion vector due to the large movement amount between the frames are eliminated and the image quality may effectively be prevented from deteriorating due to the motion-compensated FRC processing by not performing the interpolation processing through motion compensation for the input image signal. Since the frame rate is converted by interpolating the image signal to which the linear interpolation processing has been given in this case, the drive frequency of the liquid crystal display panel 19 does not need to be changed.

In a seventh embodiment of the present invention, a path is provided to bypass the FRC portion 10 and, when the movement amount between the frames of the input image signal is larger than a predetermined value, the input image signal is input to the bypass and the input image signal is input to a black-level signal insertion processing portion on the path to insert a predetermined monochromatic image signal such as a black-level signal. That is, when an image signal in which the movement amount between the frames is larger than a predetermined value is input, the switching is performed such that the frame rate is converted by performing the monochromatic image insert processing rather than the interpolation processing through motion compensation.

Figure 16:
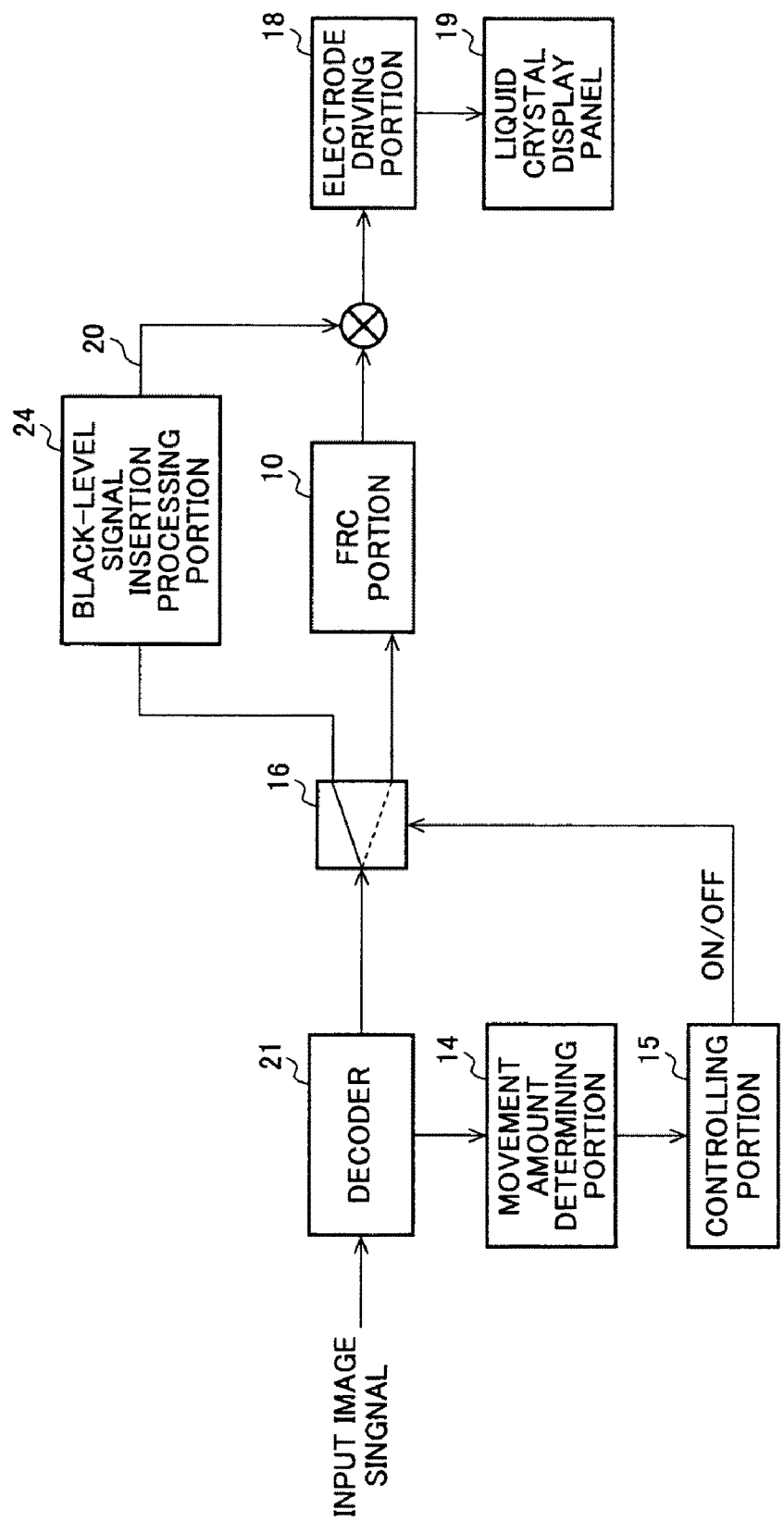
FIG. 16 is a block diagram of an exemplary main configuration of an FRC portion according to a seventh embodiment of the present invention.

FIG. 16 is a block diagram of an exemplary main configuration of a liquid crystal displaying device according to the seventh embodiment of the present invention, and the liquid crystal displaying device includes the FRC portion 10, the decoder 21, the movement amount determining portion 14, the controlling portion 15, the switching portion 16, the electrode driving portion 18, the liquid crystal display panel 19, the path 20 for bypassing the FRC portion 10, and a black-level signal insertion processing portion 24 on the path 20. The switching portion 16 is disposed on the previous stage of the FRC portion 10 and switches the input image signal to input whether to the FRC portion 10 or to the path 20 in accordance with the instruction from the controlling portion 15.

The movement amount determining portion 14 uses the motion vector information output from the decoder 21 to determine whether or not the movement amount between the frames of the input image signal is larger than a predetermined value.

When the movement amount determining portion 14 determines that the movement amount between the frames of the input image signal is larger than a predetermined value, the controlling portion 15 shifts the switching portion 16 to the path 20 to bypass the FRC portion 10 and the input image signal is input to the black-level signal insertion processing portion 24. The black-level signal insertion processing portion 24 performs the time scale compression (frame rate conversion) for the input image signal, for example, with the use of a memory to insert the predetermined monochromatic image signal such as a black-level signal between the input frames.

When the movement amount determining portion 14 determines that the movement amount between the frames of the input image signal is smaller than a predetermined value, the switching portion 16 is shifted to the FRC portion 10 to perform the FRC processing (motion-compensated frame interpolation processing) for the input image signal. The switching portion 16 may be disposed on the subsequent stage of the FRC portion 10 such that the output signal of the FRC portion 10 and the output signal of the black-level signal insertion processing portion 24 are switched over to output to the liquid crystal display panel 19.

In this embodiment, the drive frequency of the liquid crystal display panel 19 is not changed and is maintained at 120 Hz. The frame rate (the number of frames) of the display image signal input to the electrode driving portion 18 is always the same. When an image signal having the large movement amount is input, the black-level signal insertion processing portion 24 comprises a means for inserting the predetermined monochromatic image signal such as a black-level signal between the frames of the input image signal to convert the number of frames of the input image signal. Another embodiment of the black-level signal insertion processing may be configured such that the electrode driving portion 18 applies a voltage for writing black to the liquid crystal display panel 19 for a predetermined period (in the case of this example, 1/120 of a second).

Figure 17:
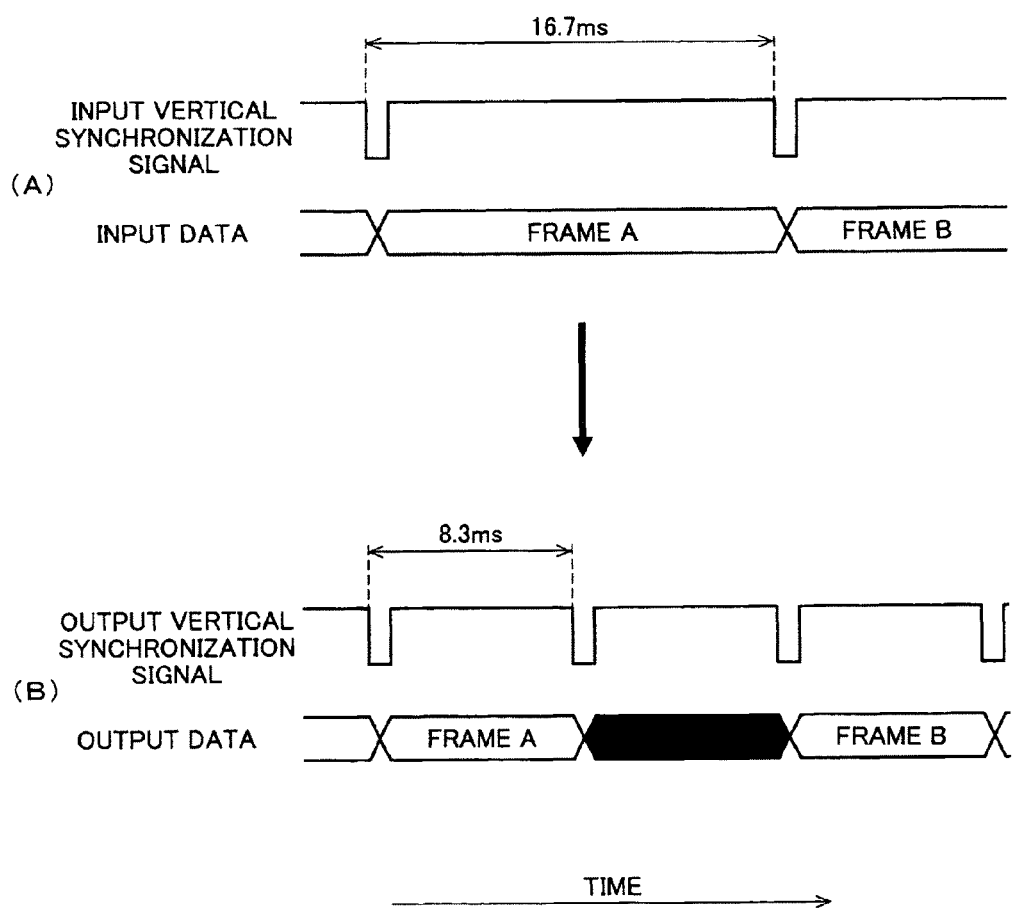
FIG. 17 is a diagram of a relationship between input data and output data according to the seventh embodiment of the present invention.

FIG. 17 is a diagram of a relationship between input data and output data according to the seventh embodiment of the present invention. FIG. 17(A) shows the input data to the path 20 and FIG. 17(B) shows the output data from the path 20. As shown in FIG. 17(A), if the input image signal (input data) is input to the path 20 with a frame frequency of 60 Hz, the display time per frame is about 16.7 ms. The input data are input to the black-level signal insertion processing portion 24, and a black-level signal (in FIG. 17, black-colored frame) is inserted and output between the frames (in this case, between the frames A and B) as shown in FIG. 17(B).

Although the image quality deterioration due to the motion blur is improved and the image quality deterioration due to the motion compensation error is not generated by inserting the black image signal between the frames of the input image signal in this way, the emission luminance must be increased in a backlight (not shown) disposed on the backside of the liquid crystal display panel 19 to compensate the reduction of the display luminance due to the shortening of the image display period.

The liquid crystal display panel 19 displays the output data, into which the black-level signal has been inserted, at the drive frequency of 120 Hz. Since the number of frames is converted by inserting the black-level signal, the display time per frame is about 8.3 ms in this case.

In this manner, when an ordinary moving image is displayed, the moving image quality may be improved by the motion-compensated FRC processing, and when an image signal in which the movement amount between the frames is larger than a predetermined value is input, the detection errors, the motion compensation errors, etc., of the motion vector due to the large movement amount between the frames are eliminated and the image quality may effectively be prevented from deteriorating due to the motion-compensated FRC processing by not performing the interpolation processing through motion compensation for the input image signal. Since the frame rate is converted by inserting the monochromatic image signal in this case, the drive frequency of the liquid crystal display panel 19 does not need to be changed. In addition, since it is possible to make closer to the impulse display mode by inserting the monochromatic image signal in this case, the moving image quality improving effect is able to be maintained.

Other than the above embodiment, when the movement amount between the frames of the input image signal is larger than a predetermined value, the image quality may be prevented from deteriorating due to the motion-compensated FRC processing and the moving image quality improving effect may be maintained at the same time by dividing the original image of the input frame into a plurality of frame images at a predetermined luminance ratio for the frame rate conversion.

In an eighth embodiment of the present invention, when the movement amount between the frames of the input image signal is larger than a predetermined value, the compensation intensity of the motion compensation processing may be varied in the interpolation frame generating portion. Specifically, the weighted addition rate may be varied when the image signal in which the movement amount between the frames is larger than a predetermined value is input by providing the interpolation frame generating portion that performs weighted addition of the image signal to which the motion compensation processing has been given and the image signal to which the linear interpolation processing has been given at a predetermined rate to generate an interpolation frame.

Figure 18:
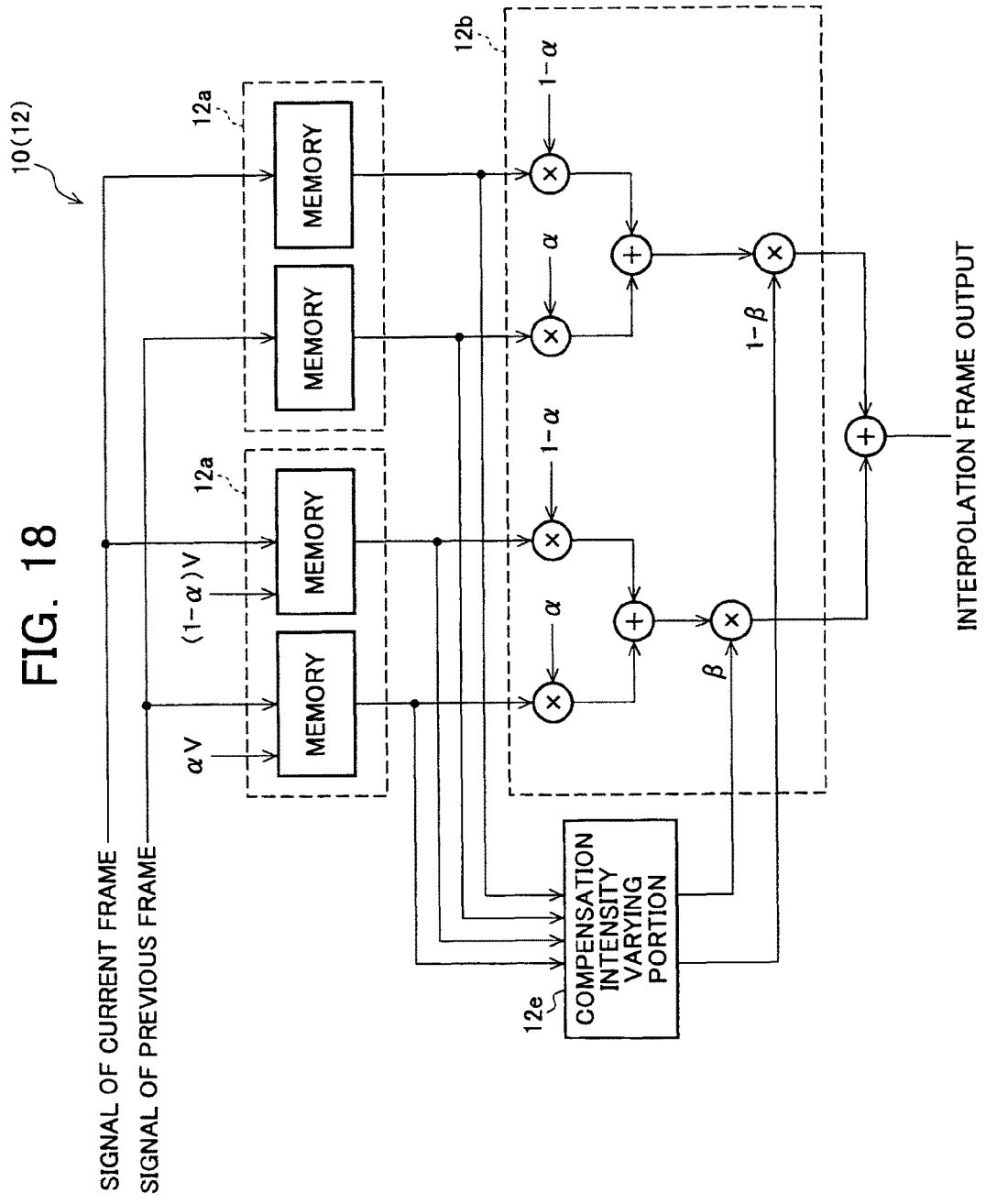
FIG. 18 is a block diagram of an exemplary main configuration of an FRC portion according to an eighth embodiment of the present invention.

FIG. 18 is a block diagram of an exemplary main configuration of the FRC portion 10 according to the eighth embodiment of the present invention, and the frame generating portion 12 of the FRC portion 10 includes the interpolation frame memory 12a, the interpolation frame generating portion 12b, and a compensation intensity varying portion 12e that may vary the compensation intensity of the motion compensation processing in the FRC portion 10. In FIG. 18, V denotes an interpolation vector; a denotes a frame interpolation ratio; and β denotes compensation intensity (weighted addition rate).

Generally, for example, the frame interpolation through the linear interpolation between two frames and the frame interpolation using motion vectors (motion-compensated interpolation) are known as methods of the frame interpolation processing. In the former case, an interpolation frame is acquired by the linear interpolation from the signal of the previous frame and the signal of the current frame at a frame interpolation ratio α. Therefore, using this linear interpolation may prevent the image quality deterioration due to the motion compensation errors in the FRC processing.

On the other hand, to acquire an interpolation frame from the previous frame and the current frame in the latter case, the interpolation vector V is detected from the motion vectors between the previous frame image and the current frame image, and the interpolation frame is acquired from the weighted addition of a signal of the previous frame image shifted by a degree of αV obtained by dividing the value (interpolation vector V) by the frame interpolation ratio α and a signal of the current frame image shifted by (1-α) V. Although good image quality may be acquired without deteriorating the resolution since a moving image itself is captured and compensated by using this motion-compensated interpolation processing, the image quality of a video image having the large movement amount between the frames due to this processing may be deteriorated.

Therefore, in this embodiment, the compensation intensity varying portion 12e is disposed in the frame generating portion 12. When the movement amount determining portion 14 determines that the movement amount between the frames of the input image signal is larger than a predetermined value, the compensation intensity varying portion 12e varies the weighted addition rate β. The weighted addition rate β is a rate for performing the weighted addition of the image signal to which the motion compensation processing has been given and the image signal to which the linear interpolation processing has been given. The interpolation frame generating portion 12b of this embodiment performs the weighted addition of the linear interpolation and the motion-compensated interpolation in accordance with the weighted addition rate β to generate the interpolation frame.

For example, when the movement amount between the frames of the input image signal is larger than a predetermined value, the compensation intensity varying portion 12e sets the weighted addition rate β=0 and defines the image signal to which the linear interpolation processing has been given as the interpolation frame to prevent the image quality deterioration due to the motion compensation errors. On the other hand, when the movement amount between the frames of the input image signal is smaller than a predetermined value, the weighted addition rate β=1 is set to define the image signal to which the motion compensation processing has been given as the interpolation frame to achieve better image quality for the moving image.

Since the weighted addition rate 13 may arbitrarily and variably be set, the rate may be set to a substantially intermediate value between zero and one. This enables to control the deterioration of the image quality due to the motion compensation errors and to perform the motion compensation in the interpolation frame image at the same time, and this may appropriately improve both the image quality deterioration due to the motion blur and the image quality deterioration due to the motion compensation errors.

Since the compensation intensity may be varied (weakened) in the motion compensation processing in the FRC when an image signal in which the movement amount between the frames is larger than a predetermined value is input, the image quality deterioration due to the motion-compensated FRC processing may effectively be controlled by reducing the effects of the detection errors, the motion compensation errors, etc., of the motion vector due to the large movement amount between the frames.

In each of the above embodiments, in order to prevent that the frame determined as having the large movement amount between the frames of the input image signal and the frame determined as having the small movement amount between the frames of the input image signal are switched over frequently, a predetermined value for determining whether or not the movement amount is large in the current frame may be varied based on the information on whether or not the determination is made that the movement amount is large in the previous frame.

For example, when it is determined that the movement amount between the frames of the input image signal is large in the previous frame, the predetermined value is set to be large, and when it is determined that the movement amount between the frames of the input image signal is small in the previous frame, the predetermined value is set to be small. That is, hysteresis may be applied to the determination of whether or not the movement amount between the frames of the input image signal is large.

When it is once determined that the movement amount between the frames of the input image signal is large, the processing may be performed defining as the frames in which the movement amount between the frames of the input image signal is large for a subsequent several-frame period by continuously outputting the result of the determination for a predetermined number of frame periods, to prevent that the frame determined as having the large movement amount between the frames of the input image signal and the frame determined as having the small movement amount between the frames of the input image signal are switched over frequently.

Figure 19:
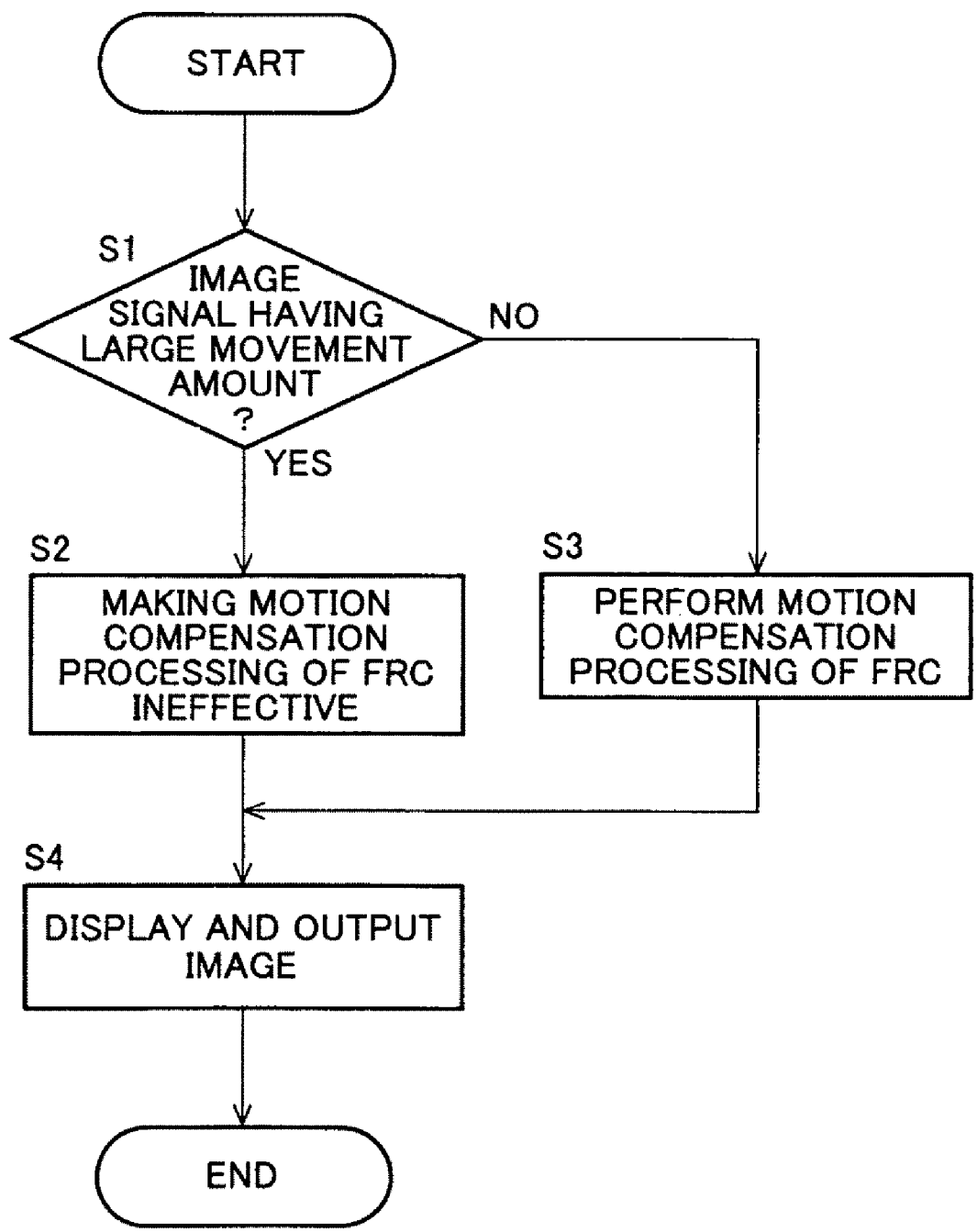
FIG. 19 is a flowchart for explaining another example of an image displaying method by the image displaying device of the present invention.

FIG. 19 is a flowchart for explaining an example of an image displaying method by the image displaying device of the present invention. An example of the image displaying method in the first to third embodiments will be described. First, the image displaying device determines whether or not the movement amount between the frames of the input image signal is larger than the predetermined value (step S1), and when it is determined as an image signal in which the movement amount between the frames is larger than the predetermined value (in the case of YES), the motion vector or the interpolation vector is set to zero-vector to make the motion compensation processing of the FRC portion 10 ineffective (step S2). When it is determined at step S1 as an image signal in which the movement amount between the frames is smaller than the predetermined value (in the case of NO), the motion compensation processing of the FRC portion 10 is performed as usual (step S3). The image signal with the frame frequency converted in this way is displayed and output from the liquid crystal display panel 19.

Figure 20:
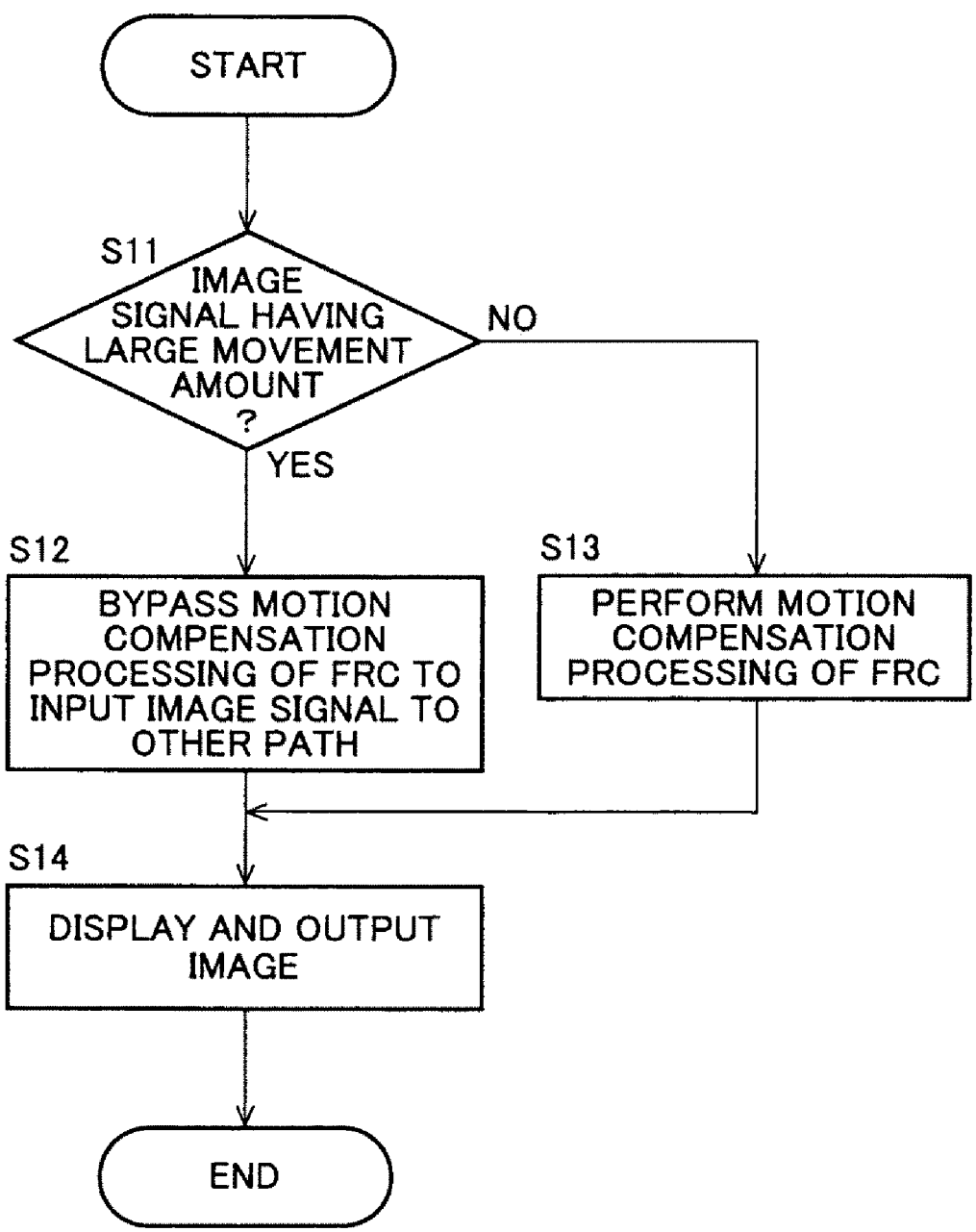
FIG. 20 is a flowchart for explaining another example of the image displaying method by the image displaying device of the present invention.

FIG. 20 is a flowchart for explaining another example of the image displaying method by the image displaying device of the present invention. An example of the image displaying method in the fourth to seventh embodiments will be described. First, the image displaying device determines whether or not the movement amount between the frames of the input image signal is larger than the predetermined value (step S11), and when it is determined as an image signal in which the movement amount between the frames is larger than the predetermined value (in the case of YES), the motion-compensated frame interpolation processing of the FRC portion 10 is bypassed and the input image signal is input to the other path 20 (step S12).

On the bypassing path 20, the image signal is output after the frame rate is converted by executing any one of the inter-frame interpolation of the image signal to which the linear interpolation processing has been given, the inter-frame interpolation of the image signal of the same frame, and the inter-frame interpolation of the predetermined monochromatic image signal such as a black-level signal, or the input image signal is directly output to execute a processing such as changing the drive frequency of the liquid crystal display panel 19.

When it is determined at step S11 as an image signal in which the movement amount between the frames is smaller than the predetermined value (in the case of "NO"), the image signal is output that is given the motion-compensated interpolation processing of the FRC portion 10 (step S13). Finally, the image is displayed and output from the liquid crystal display panel 19 (step S14).

Figure 21:
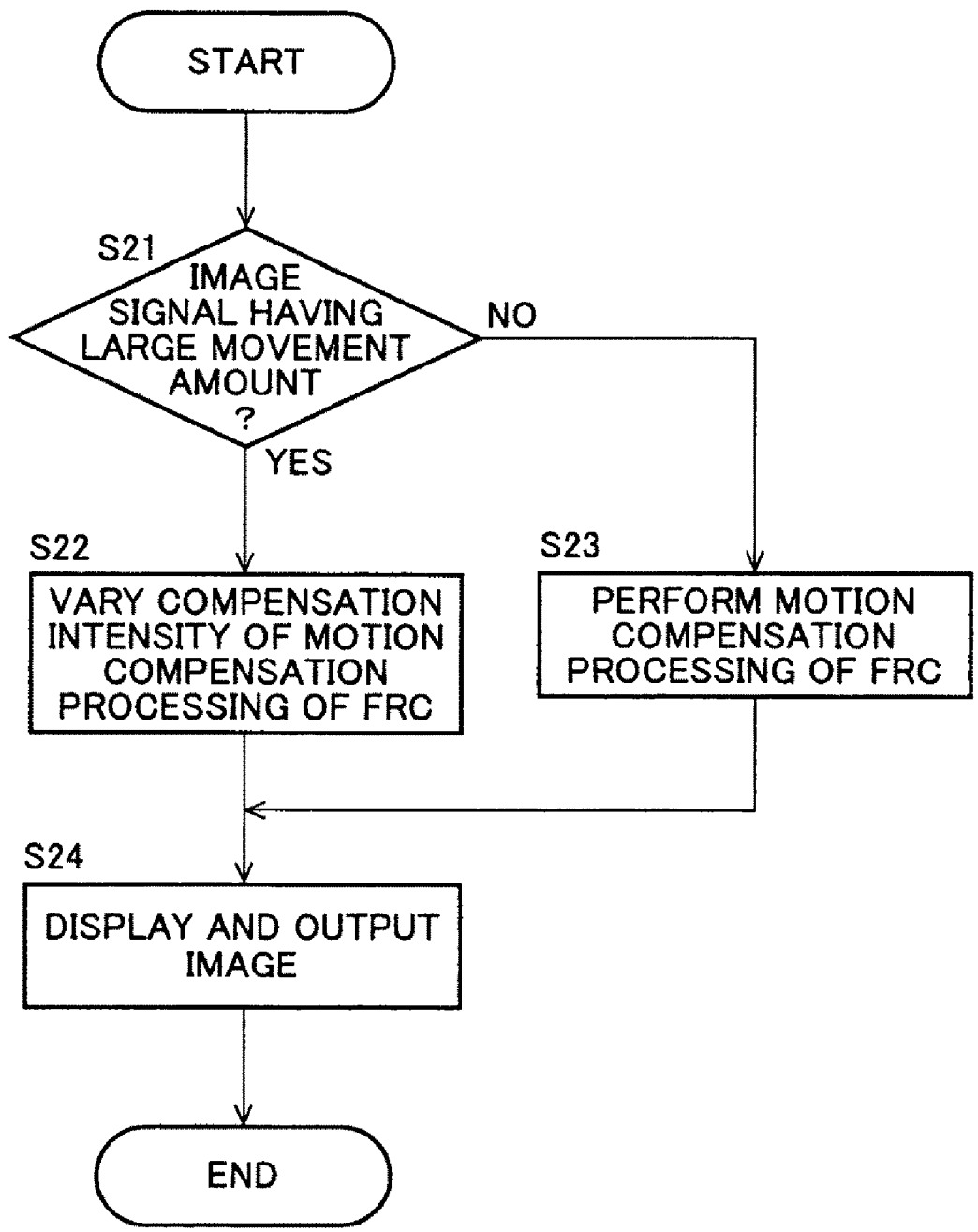
FIG. 21 is a flowchart for explaining another example of the image displaying method by the image displaying device of the present invention.

FIG. 21 is a flowchart for explaining another example of the image displaying method by the image displaying device of the present invention. An example of the image displaying method in the eighth embodiment will be described. First, the image displaying device determines whether or not an image signal has the larger movement amount between the frames of the input image signal than the predetermined value (step S21), and when it is determined as an image signal in which the movement amount between the frames is larger than the predetermined value (in the case of YES), the compensation intensity is varied (weakened) in the motion compensation processing of the FRC portion 10 (step S22). When it is determined at step S21 as an image signal in which the movement amount between the frames is smaller than the predetermined value (in the case of NO), the compensation intensity is increased as usual in the motion compensation processing of the FRC portion 10 (step S23). The image signal with the frame frequency converted in this way is displayed and output from the liquid crystal display panel 19 (step S24).

According to the present invention, when a movement amount between frames of an input image signal is larger than a predetermined value, display and output may be performed by making the motion compensation processing in the frame rate converting (FRC) portion for the entire screen area ineffective, and therefore, the image quality may effectively be prevented from deteriorating due to the motion compensation errors.

Next, still another embodiment of the image displaying device of the present invention will be described. In this embodiment, the main object is to prevent the image quality deterioration of an area having the large movement amount between the frames due to the FRC processing by using a means for making the motion compensation processing of the FRC portion 10 ineffective only for a pixel in which the movement amount between the frames of the input image signal is larger than a predetermined value or an area including the pixel.

In a ninth embodiment of the present invention, to make the motion compensation processing of the FRC portion 10 ineffective for a pixel in which the movement amount between the frames of the input image signal is larger than a predetermined value or an area including the pixel, the interpolation vector of the interpolation block in which the movement amount between the frames is larger than a predetermined value is set to zero-vector so that no interpolation is generated between pixels at different positions only in that part.

Figure 22:
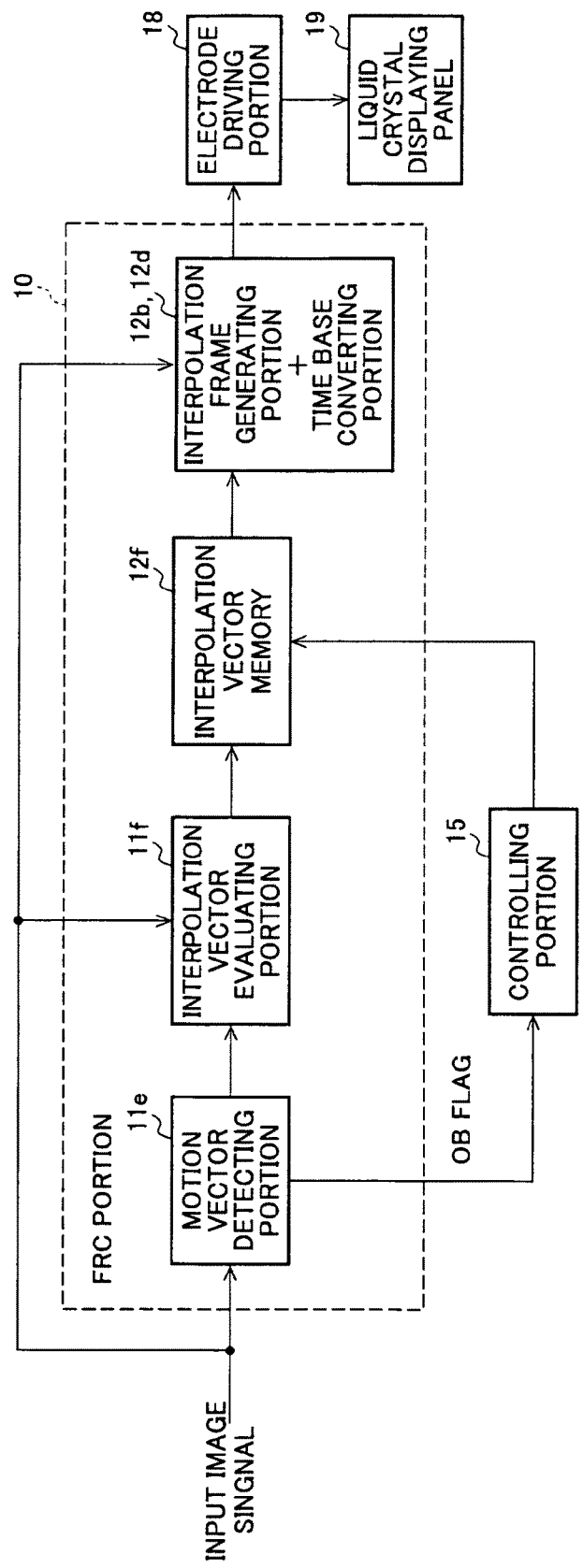
FIG. 22 is a block diagram of an exemplary main configuration of an FRC portion according to a ninth embodiment of the present invention.

FIG. 22 is a block diagram of an exemplary main configuration of a liquid crystal displaying device according to the ninth embodiment of the present invention, and the liquid crystal displaying device includes the FRC portion 10, the controlling portion 15, the electrode driving portion 18, and the liquid crystal display panel 19. The FRC portion 10 includes the motion vector detecting portion 11e, the interpolation vector evaluating portion 11f, the interpolation frame generating portion 12b, the time base converting portion 12d, and an interpolation vector memory 12f that accumulates the interpolation vector allocated by the interpolation vector evaluating portion 11f for each interpolation block.

The motion vector detecting portion 11e outputs motion vectors detected by a predetermined calculation and outputs the OB flag "1" to a block to which a certain specific processing described above with FIGS. 4 (B) and (C) has been given because a vector calculated during the calculation for the motion vector detection exceeds the predetermined vector evaluation calculation range that is set by the interpolation vector evaluating portion 11f at the same time.

The controlling portion 15 controls to make the motion compensation processing of the FRC portion 10 ineffective for a pixel to which the OB flag "1" that means exceeding the predetermined vector evaluation calculation range during the calculation for the motion vector calculation by the motion vector detecting portion 11e is applied or an area including the pixel. That is, the liquid crystal displaying device of this embodiment controls to make the motion compensation processing of the FRC portion 10 ineffective for a pixel in which the movement amount between the frames of the input image signal is larger than a predetermined value or an area including the pixel based on the OB flag information output from the motion vector detecting portion 11e.

As described above, the liquid crystal display panel 19 is an active-matrix liquid crystal display that has a liquid crystal layer and electrodes for applying scan signals and data signals to the liquid crystal layer. The electrode driving portion 18 is a display driver for driving the scan electrodes and the data electrodes of the liquid crystal display panel 19 based on the image signal to which the frame rate conversion by the FRC portion 10 has been given.

The drive frequency of the liquid crystal display panel 19 is a frame frequency converted by the FRC portion 10. Therefore, if an image signal input with a frame frequency of 60 Hz is converted by the FRC portion 10 into a frame frequency of 120 Hz, the drive frequency of the liquid crystal display panel 19 is 120 Hz.

In FIG. 22, the interpolation vector memory 12f accumulates the interpolation vector allocated by the interpolation vector evaluating portion 11f for each interpolation block. When there is the OB flag "1" meaning that a vector calculated during the calculation for the motion vector detection exceeds the predetermined vector evaluation calculation range, the controlling portion 15 accesses the interpolation vector memory 12f and sets the interpolation vector of the interpolation block corresponding to a pixel area in which a vector calculated during the calculation for the motion vector detection exceeds the predetermined vector evaluation calculation range to zero-vector. For the interpolation block corresponding to a pixel area in which a vector calculated during the calculation for the motion vector detection falls within the predetermined vector evaluation calculation range, the interpolation vector of the interpolation vector memory 12f is directly input to the interpolation frame generating portion 12b.

That is, when accessing the interpolation vector memory 12f, the controlling portion 15 applies the flag information to the interpolation block corresponding to a pixel in which the movement amount between the frames is larger than a predetermined value or an area including the pixel. The flag information is a flag for not allowing the use of the interpolation vector of the interpolation block and the interpolation block to which the flag information is applied is controlled to set the output of the interpolation vector to zero. By setting the interpolation vector of the interpolation vector memory 12f to zero in this way, the motion-compensated interpolation may not be performed.

In this manner, when an ordinary moving image is displayed, the moving image quality may be improved by the motion-compensated FRC processing, and when a pixel area in which the movement amount between the frames is larger than a predetermined value is included in the input image signal, the detection errors, the motion compensation errors, etc., of the motion vector due to the large movement amount between the frames are eliminated and the image quality may effectively be prevented from deteriorating due to the motion-compensated FRC processing by making the motion compensation processing for the pixel area ineffective.

In a tenth embodiment of the present invention, to make the motion compensation processing of the FRC portion 10 ineffective for a pixel in which the movement amount between the frames of the input image signal is larger than a predetermined value or an area including the pixel, the interpolation vector of the interpolation block in which the movement amount between the frames is larger than a predetermined value is set to zero-vector so that no interpolation is generated between pixels at different positions only in that part.

Figure 23:
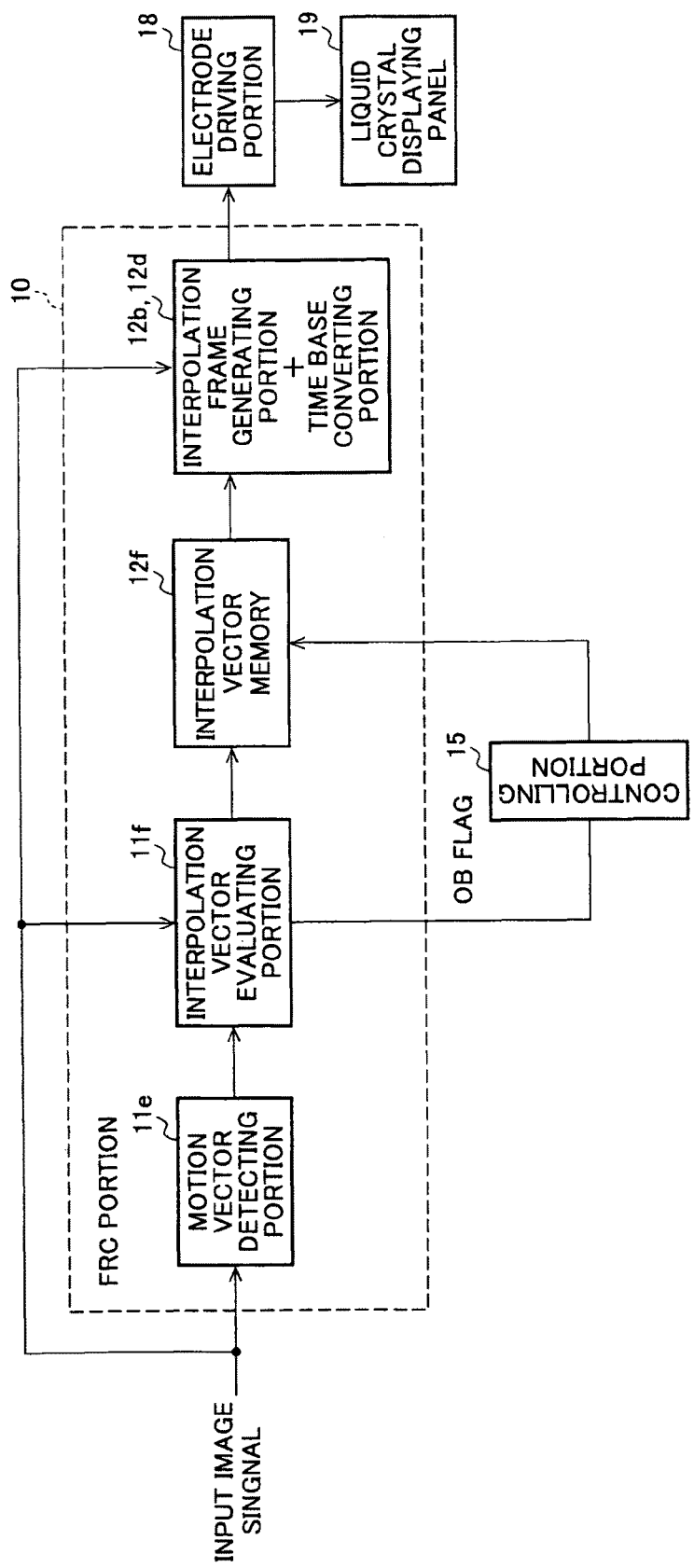
FIG. 23 is a block diagram of an exemplary main configuration of an FRC portion according to a tenth embodiment of the present invention.

FIG. 23 is a block diagram of an exemplary main configuration of a liquid crystal displaying device according to the tenth embodiment of the present invention, and the liquid crystal displaying device includes the FRC portion 10, the controlling portion 15, the electrode driving portion 18, and the liquid crystal display panel 19. The FRC portion 10 includes the motion vector detecting portion 11e, the interpolation vector evaluating portion 11f, the interpolation frame generating portion 12b, the time base converting portion 12d, and the interpolation vector memory 12f that accumulates the interpolation vector allocated by the interpolation vector evaluating portion 11f for each interpolation block.

The motion vector detecting portion 11e outputs motion vectors detected by a predetermined calculation and the OB flag information, for each block that shows whether or not a vector calculated during the calculation for the motion vector detection exceeds the predetermined vector evaluation calculation range that is set by the interpolation vector evaluating portion 11f, to the interpolation vector evaluating portion 11f.

The controlling portion 15 controls to make the motion compensation processing of the FRC portion 10 ineffective for a pixel to which the OB flag "1" is applied or an area including the pixel based on the OB flag information for each interpolation block output by the interpolation vector evaluating portion 11f. That is, the liquid crystal displaying device of this embodiment controls to make the motion compensation processing of the FRC portion 10 ineffective for a pixel in which the movement amount between the frames of the input image signal is larger than a predetermined value or an area including the pixel.

The interpolation vector evaluating portion 11f evaluates the motion vectors output by the motion vector detecting portion 11e and allocates an optimum interpolation vector for each interpolation block. Specifically, the equivalent motion vector is allocated to the interpolation block indicated by the motion vector from the detected block. However, the allocated interpolation block may be also indicated from a different detected block from the detected block. That is, a plurality of motion vectors may be allocated to one interpolation block. In such a case, the au is calculated for each of the plurality of motion vectors and a motion vector having the smallest DFD (that is, more accurate motion vector) is employed and allocated.

In this case, the OB flag information corresponding to the allocated motion vector is also allocated for each interpolation block.

In FIG. 23, the interpolation vector memory 12f accumulates the interpolation vector allocated by the interpolation vector evaluating portion 11f for each interpolation block. When there is the OB flag "1", the controlling portion 15 access the interpolation vector memory 12f and sets the interpolation vector of the interpolation block to zero-vector based on the OB flag information applied for each interpolation block output by the interpolation vector evaluating portion 11f. For the interpolation block to which the OB flag "0" is allocated, the interpolation vector of the interpolation vector memory 12f is directly input to the interpolation frame generating portion 12b.

That is, when accessing the interpolation vector memory 12f, the controlling portion 15 controls to set the output of the interpolation vector to zero for the interpolation block corresponding to a pixel in which the movement amount between the frames is larger than a predetermined value or an area including the pixel. By setting the interpolation vector of the interpolation vector memory 12f to zero in this way, the motion-compensated interpolation may not be performed.

In this manner, when an ordinary moving image is displayed, the moving image quality may be improved by the motion-compensated FRC processing, and when an image area in which the movement amount between the frames is larger than a predetermined value is included in the input image signal, the detection errors, the motion compensation errors, etc., of the motion vector due to the large movement amount between the frames are eliminated and the image quality may effectively be prevented from deteriorating due to the motion-compensated FRC processing by making the motion compensation processing for the image area ineffective.

In an eleventh embodiment of the present invention, to make the motion compensation processing of the FRC portion 10 ineffective for a pixel in which the movement amount between the frames of the input image signal is larger than a predetermined value or an area including the pixel, the interpolation vector of the interpolation block in which the movement amount between the frames is larger than a predetermined value is set to zero-vector so that no interpolation is generated between pixels at different positions only in that part.

Figure 24:
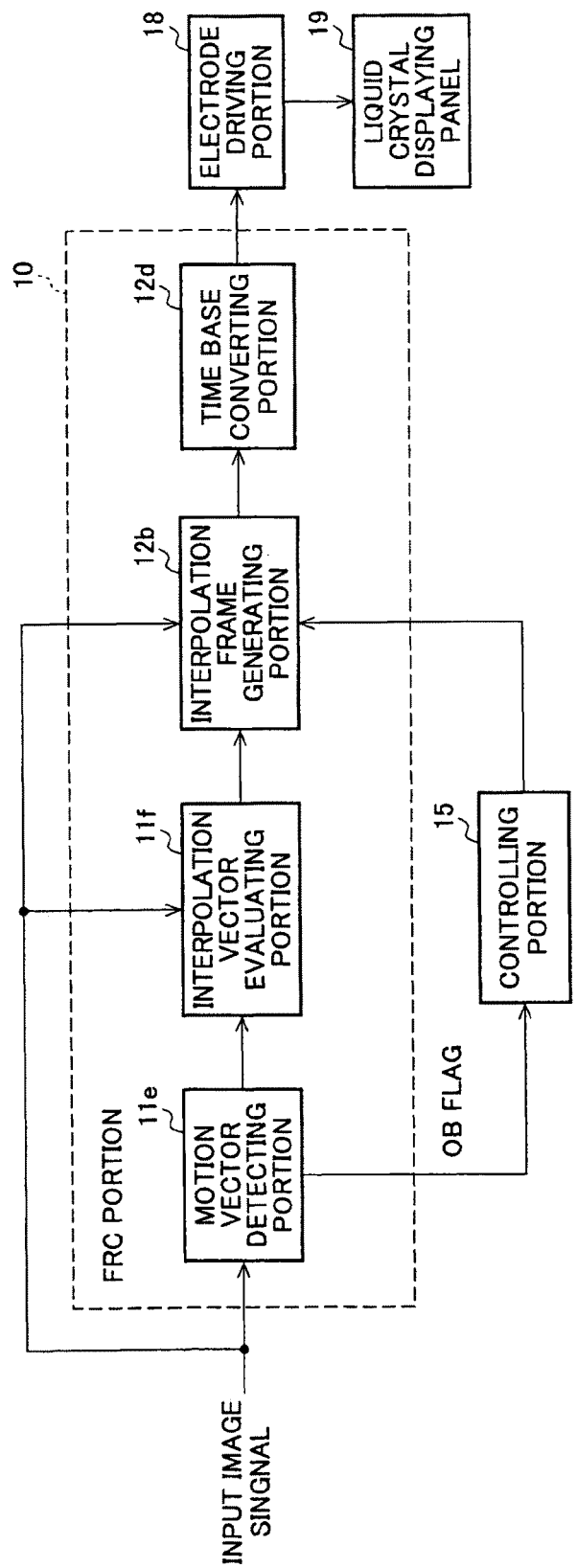
FIG. 24 is a block diagram of an exemplary main configuration of an FRC portion according to an eleventh embodiment of the present invention.

FIG. 24 is a block diagram of an exemplary main configuration of a liquid crystal displaying device according to the eleventh embodiment of the present invention, and the liquid crystal displaying device includes the FRC portion 10, the controlling portion 15, the electrode driving portion 18, and the liquid crystal display panel 19. The FRC portion 10 includes the motion vector detecting portion 11e, the interpolation vector evaluating portion 11f, the interpolation frame generating portion 12b, and the time base converting portion 12d.

The motion vector detecting portion lie outputs the motion vectors detected by a predetermined calculation and outputs the OB flag "1" to a block to which a certain specific processing described above with FIGS. 4 (B) and (C) has been given because a vector calculated during the calculation for the motion vector detection exceeds the predetermined vector evaluation calculation range that is set by the interpolation vector evaluating portion 11f at the same time.

The controlling portion 15 controls to make the motion compensation processing of the FRC portion 10 ineffective for a pixel to which the OB flag "1" is applied or an area including the pixel based on the OB flag information output by the motion vector detecting portion lie. That is, the liquid crystal displaying device of this embodiment controls to make the motion compensation processing of the FRC portion 10 ineffective for a pixel in which the movement amount between the frames of the input image signal is larger than a predetermined value or an area including the pixel.

In FIG. 24, the interpolation frame generating portion 12b generates the interpolation frame from the interpolation vector allocated by the interpolation vector evaluating portion 11f. When there is the OB flag "1" meaning that a vector calculated during the calculation for the motion vector detection exceeds the predetermined vector evaluation calculation range, the controlling portion 15 access the interpolation frame generating portion 12b and sets the interpolation vector of the interpolation block corresponding to a pixel area in which a vector calculated during the calculation for the motion vector detection exceeds the predetermined vector evaluation calculation range to zero-vector.

For of the interpolation block corresponding to a pixel area in which a vector calculated during the calculation for the motion vector detection falls within the predetermined vector evaluation calculation range, the interpolation frame generating portion 12b generates the interpolation frame from the interpolation vector.

That is, the controlling portion 15 provides the interpolation frame generating portion 12b with the information (such as coordinate positions and area information) showing that which interpolation block (or which pixel) has the movement amount larger than a predetermined value and sets the interpolation vector of the corresponding pixel or the interpolation block including the pixel to zero-vector in accordance with the instruction from the controlling portion 15.

In this manner, when an ordinary moving image is displayed, the moving image quality may be improved by the motion-compensated FRC processing, and the detection errors, the motion compensation errors, etc., of the motion vector due to the large movement amount between the frames are eliminated and the image quality may effectively be prevented from deteriorating due to the motion-compensated FRC processing by making the motion compensation processing ineffective for a pixel in which the movement amount between the frames is larger than a predetermined value or an area including the pixel.

In a twelfth embodiment of the present invention, to make the motion compensation processing of the FRC portion 10 ineffective for a pixel in which the movement amount between the frames of the input image signal is larger than a predetermined value or an area including the pixel, the interpolation vector of the interpolation block in which the movement amount between the frames is larger than a predetermined value is set to zero-vector so that no interpolation is generated between pixels at different positions only in that part.

Figure 25:
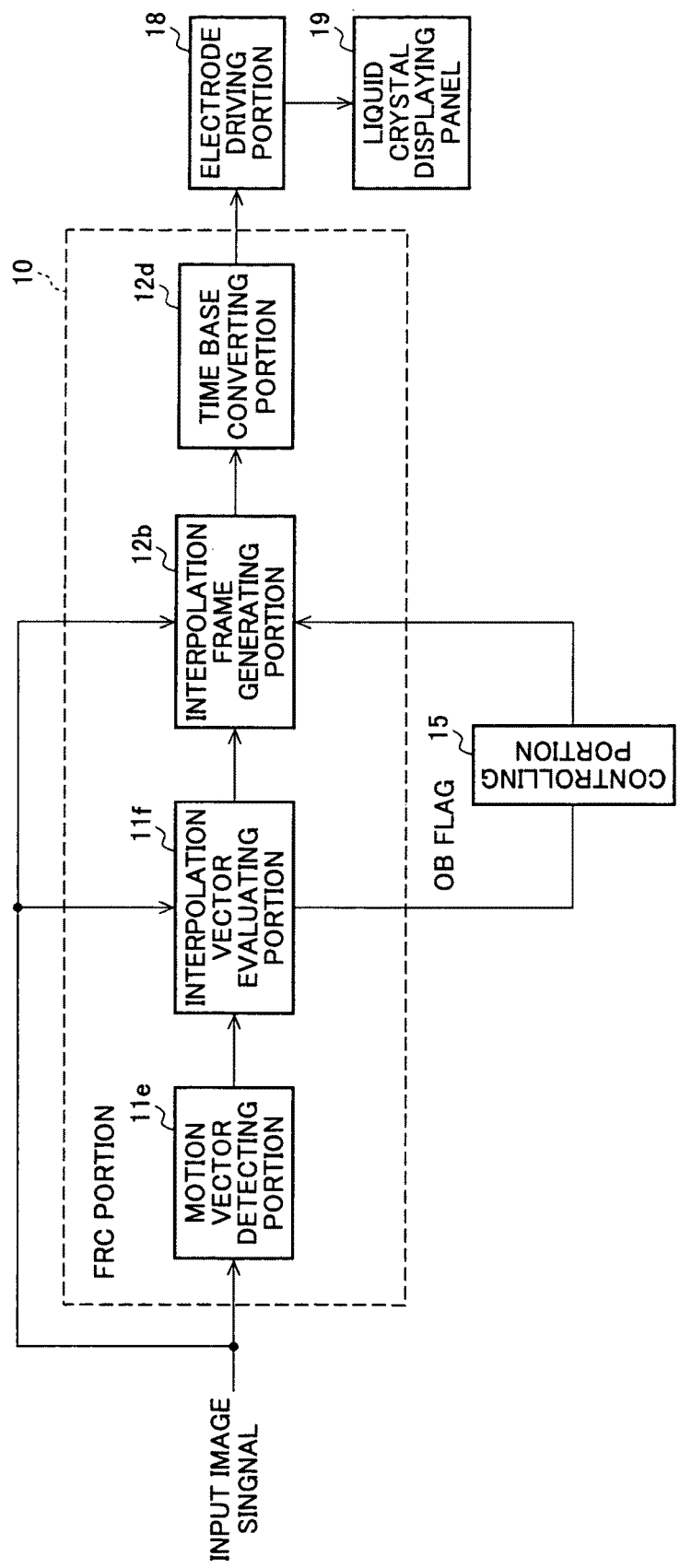
FIG. 25 is a block diagram of an exemplary main configuration of an FRC portion according to a twelfth embodiment of the present invention.

FIG. 25 is a block diagram of an exemplary main configuration of a liquid crystal displaying device according to the twelfth embodiment of the present invention, and the liquid crystal displaying device includes the FRC portion 10, the controlling portion 15, the electrode driving portion 18, and the liquid crystal display panel 19. The FRC portion 10 includes the motion vector detecting portion 11e, the interpolation vector evaluating portion 11f, the interpolation frame generating portion 12b, and the time base converting portion 12d.

The motion vector detecting portion 11e outputs motion vectors detected by a predetermined calculation and the OB flag information for each block that shows whether or not a vector calculated during the calculation for the motion vector detection exceeds the predetermined vector evaluation calculation range, to the interpolation vector evaluating portion 11f.

The controlling portion 15 controls to make the motion compensation processing of the FRC portion 10 ineffective for a pixel to which the OB flag "1" is applied or an area including the pixel based on the OB flag information for each interpolation block output by the interpolation vector evaluating portion 11f. That is, the liquid crystal displaying device of this embodiment controls to make the motion compensation processing of the FRC portion 10 ineffective for a pixel in which the movement amount between the frames of the input image signal is larger than a predetermined value or an area including the pixel.

The interpolation vector evaluating portion 11f evaluates the motion vectors output by the motion vector detecting portion 11e and allocates an optimum interpolation vector for each interpolation block. Specifically, the equivalent motion vector is allocated to the interpolation block indicated by the motion vector from the detected block. However, the allocated interpolation block may be also indicated from a different detected block from the detected block. That is, a plurality of motion vectors may be allocated to one interpolation block. In such a case, the DFD is calculated for each of the plurality of motion vectors and a motion vector having the smallest DFD (that is, more accurate motion vector) is employed and allocated.

In this case, the OB flag information corresponding to the allocated motion vector is also allocated for each interpolation block.

In FIG. 25, the interpolation frame generating portion 12b generates the interpolation frame from the interpolation vector allocated by the interpolation vector evaluating portion 11f. When there is the OB flag "1", the controlling portion 15 access the interpolation frame generating portion 12b and sets the interpolation vector of the interpolation block to zero-vector based on the OB flag information applied for each interpolation block output by the interpolation vector evaluating portion 11f. For the interpolation block to which the OB flag "0" is allocated, the interpolation frame generating portion 12b generates the interpolation frame from the interpolation vector.

That is, the controlling portion 15 provides the interpolation frame generating portion 12b with the information (such as coordinate positions and area information) showing that which interpolation block (or which pixel) has the movement amount larger than a predetermined value and sets the interpolation vector of the corresponding pixel or the interpolation block including the pixel to zero-vector in accordance with the instruction from the controlling portion 15.

In this manner, when an ordinary moving image is displayed, the moving image quality may be improved by the motion-compensated FRC processing, and the detection errors, the motion compensation errors, etc., of the motion vector due to the large movement amount between the frames are eliminated and the image quality may effectively be prevented from deteriorating due to the motion-compensated FRC processing by making the motion compensation processing ineffective for a pixel in which the movement amount between the frames is larger than a predetermined value or an area including the pixel.

In the ninth to twelfth embodiments, when the motion vector or the interpolation vector is set to zero-vector to make the motion compensation processing of the FRC portion 10 ineffective for a pixel in which the movement amount between the frames of the input image signal is large or an area including the pixel, a rapid change of the vector occurs in a boundary part between the area in which the motion compensation processing is made ineffective and the area in which it has been determined that the movement amount between the frames of the input image is small and the motion compensation processing has been given, and therefore, existence or non-existence of the motion compensation processing may clearly appear in the image to be conspicuous.

In order to improve the adverse effect, it is desirable to continuously change the intensity of the motion compensation processing by giving a filter processing such as applying a low pass filter to the boundary part between a pixel in which the movement amount between the frames of the input image signal is large or an area including the pixel and a pixel having the small movement amount or an area including the pixel.

By continuously changing the intensity of the motion compensation processing in this way, the interpolation images in the boundary part between the area having the large movement amount and the area having the small movement amount may be made smoothly consecutive images, thus making it possible to suppress the boundary from being conspicuous. Also in the following embodiments, it is desirable to continuously change the intensity of the motion compensation processing by giving the filter processing to the boundary part between the area having the large movement amount and other areas.

In a thirteenth embodiment of the present invention, a linear interpolation processing portion is disposed on the path other than the input path to the FRC portion 10 and a pixel in which the movement amount between the frames of the input image signal is larger than a predetermined value or an area including the pixel is shifted to the linear interpolation processing portion to interpolate the image signal to which the linear interpolation has been given only to a part in which the movement amount between the frames is larger than a predetermined value. That is, the switching is performed such that the frame rate conversion is performed by giving the linear interpolation processing without performing the motion-compensated interpolation processing to a pixel in which the movement amount between the frames is larger than a predetermined value or an area including the pixel.

Figure 26:
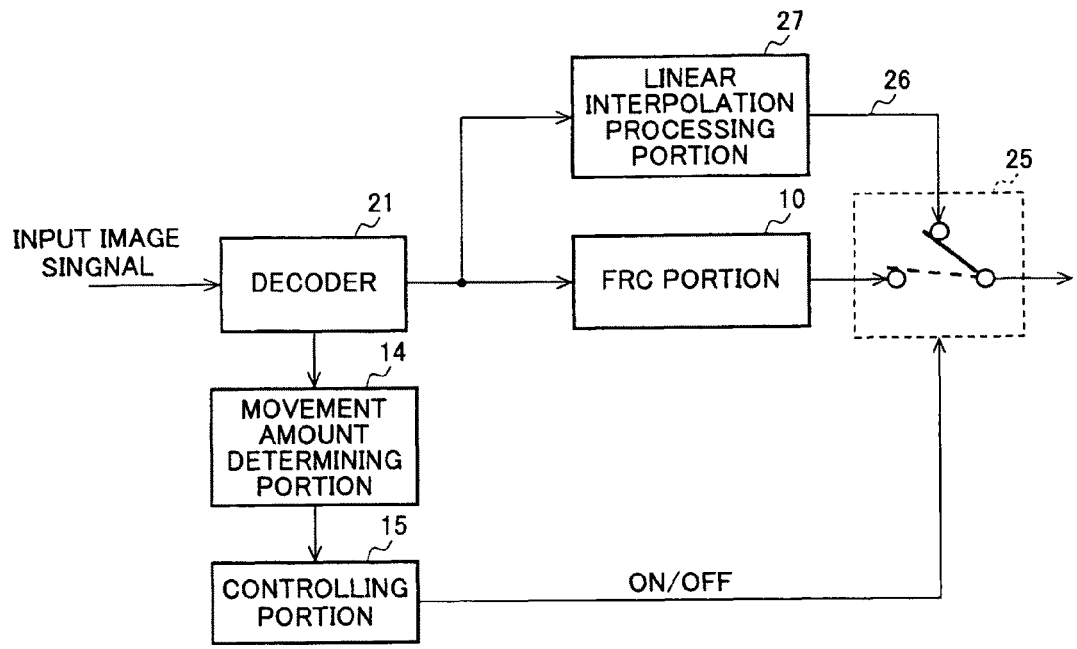
FIG. 26 is a block diagram of an exemplary main configuration of an FRC portion according to a thirteenth embodiment of the present invention.

FIG. 26 is a block diagram of an exemplary main configuration of a liquid crystal displaying device according to the thirteenth embodiment of the present invention, and the liquid crystal displaying device includes the FRC portion 10, the decoder 21, the movement amount determining portion 14, the controlling portion 15, a switching portion 25, a path 26 disposed separately from the input path to the FRC portion 10, and a linear interpolation processing portion 27 on the path 26. Descriptions for the electrode driving portion 18 and the liquid crystal display panel 19 will be omitted. The switching portion 25 is disposed on the subsequent stage of the FRC portion 10 such that whether the image signal (motion-compensated image) from the FRC portion 10 is output or the image signal (linear interpolation image) from the linear interpolation processing portion 27 is output is switched in accordance with the instruction from the controlling portion 15.

When the input image signal is a compressed input signal (for example, MPEG and DivX, etc.,) that is compressed with the use of the motion vector information, etc., the compressed input signal is restored by the decoder 21 into the image signal and input to the FRC portion 10. When the input image signal is compressed with the use of the motion vector information in this case, the motion vector that is used for restoring may be extracted from the decoder 21. In this embodiment, the movement amount determining portion 14 determines a pixel in which the movement amount between the frames of the input image signal is larger than a predetermined value or an area including the pixel based on the extracted motion vector.

The movement amount determining portion 14 determines a pixel in which the length of the motion vector output by the decoder 21 is larger than a predetermined threshold or an area including the pixel. The controlling portion 15 shifts the switching portion 25 to the path 26 (linear interpolation processing portion 27) to interpolate the image signal to which the linear interpolation processing has been given between the frames of the input image signal and outputs the generated display image signal to the liquid crystal display panel for a pixel determined by the movement amount determining portion 14 as having the movement amount between the frames of the input image signal larger than a predetermined value or an area including the pixel.

The linear interpolation processing portion 27 performs the processing of inserting the interpolation frame to which the linear interpolation processing has been given between the frames of the input image signal.

For a pixel in which the movement amount between the frames of the input image signal is larger than a predetermined value or an area not including the pixel, the switching portion 25 is shifted to the FRC portion 10 to output the display image signal to which the FRC processing (motion-compensated frame interpolation processing) has been given between the frames of the input image signal to the liquid crystal display panel.

In the linear interpolation processing, as described in the above document (Yamauchi Tatsuro, "TV Standards Conversion", Journal of the Institute of Television Engineers of Japan, Vol. 45, No. 12, pp. 1534-1543 (1991)), an interpolation frame is acquired through linear interpolation using a frame interpolation ratio $\alpha$ from the signal of the previous frame and the signal of the current frame.

In this manner, when an ordinary moving image is displayed, the moving image quality may be improved by the motion-compensated FRC processing, and the detection errors, the motion compensation errors, etc., of the motion vector due to the large movement amount between the frames are eliminated and the image quality may effectively be prevented from deteriorating due to the motion-compensated FRC processing by making the motion compensation processing ineffective for a pixel in which the movement amount between the frames of the input image signal is larger than a predetermined value or an area including the pixel.

In a fourteenth embodiment of the present invention, a memory is disposed on the path other than the input path to the FRC portion 10 and a pixel in which the movement amount between the frames of the input image signal is larger than a predetermined value or an area including the pixel is shifted to the memory so that the frame rate is converted by rapidly and repeatedly reading the image signal of the same frame from the memory more than once only in a part in which the movement amount between the frames is larger than a predetermined value. That is, the switching is performed such that the frame rate conversion is performed by rapidly and repeatedly outputting the input image signal without performing the motion-compensated interpolation processing for a pixel in which the movement amount between the frames is larger than a predetermined value or an area including the pixel.

Figure 27:
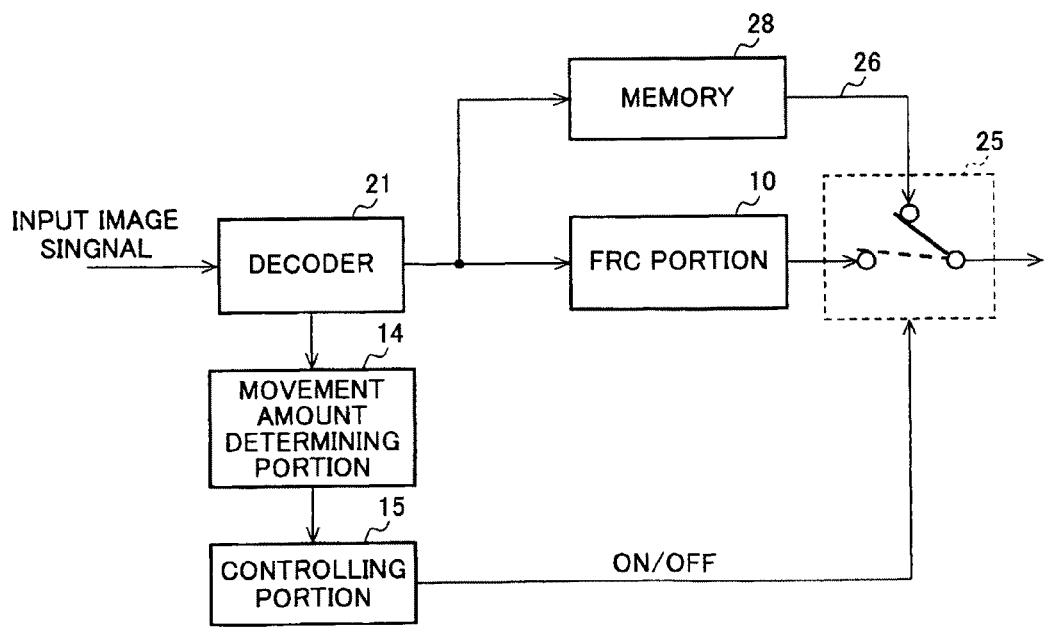
FIG. 27 is a block diagram of an exemplary main configuration of an FRC portion according to a fourteenth embodiment of the present invention.

FIG. 27 is a block diagram of an exemplary main configuration of a liquid crystal displaying device according to the fourteenth embodiment of the present invention, and the liquid crystal displaying device includes the FRC portion 10, the decoder 21, the movement amount determining portion 14, the controlling portion 15, the switching portion 25, the path 26 disposed separately from the input path to the FRC portion 10, and a memory 28 on the path 26. Descriptions for the electrode driving portion 18 and the liquid crystal display panel 19 will be omitted. The switching portion 25 is disposed on the subsequent stage of the FRC portion 10 such that whether the image signal (motion-compensated image) from the FRC portion 10 is output or the image signal of the previous frame or the subsequent frame from the memory 28 is output is switched in accordance with the instruction from the controlling portion 15.

The movement amount determining portion 14 determines a pixel in which the length of the motion vector output by the decoder 21 is larger than a predetermined threshold or an area including the pixel.

The controlling portion 15 shifts the switching portion 25 to the path 26 (memory 28) to output the display image signal of the previous frame or the subsequent frame between the frames of the input image signal to the liquid crystal display panel for a pixel determined by the movement amount determining portion 14 as having the movement amount between the frames of the input image signal larger than a predetermined value or an area including the pixel.

The memory 28 accumulates the input image signal, from which the image signal of a pixel having the large movement amount between the frames of the input image signal or an area including the pixel is repeatedly read.

For a pixel in which the movement amount between the frames of the input image signal is larger than a predetermined value or an area not including the pixel, the switching portion 25 is shifted to the FRC portion 10 to output the display image signal to which the FRC processing (motion-compensated frame interpolation processing) has been given between the frames of the input image signal to the liquid crystal display panel.

In this manner, when an ordinary moving image is displayed, the moving image quality may be improved by the motion-compensated FRC processing, and the detection errors, the motion compensation errors, etc., of the motion vector due to the large movement amount between the frames are eliminated and the image quality may effectively be prevented from deteriorating due to the motion-compensated FRC processing by making the motion compensation processing ineffective for a pixel in which the movement amount between the frames of the input image signal is larger than a predetermined value or an area including the pixel.

In a fifteenth embodiment of the present invention, the compensation intensity of the motion compensation processing may be varied in the interpolation frame generating portion for a pixel in which the movement amount between the frames of the input image signal is larger than a predetermined value or an area including the pixel. Specifically, the weighted addition rate may be varied for a pixel in which the movement amount between the frames is larger than a predetermined value or an area including the pixel by providing the interpolation frame generating portion that performs weighted addition of the image signal to which the motion compensation processing has been given and the image signal to which the linear interpolation processing has been given at a predetermined rate to generate an interpolation frame.

Figure 28:
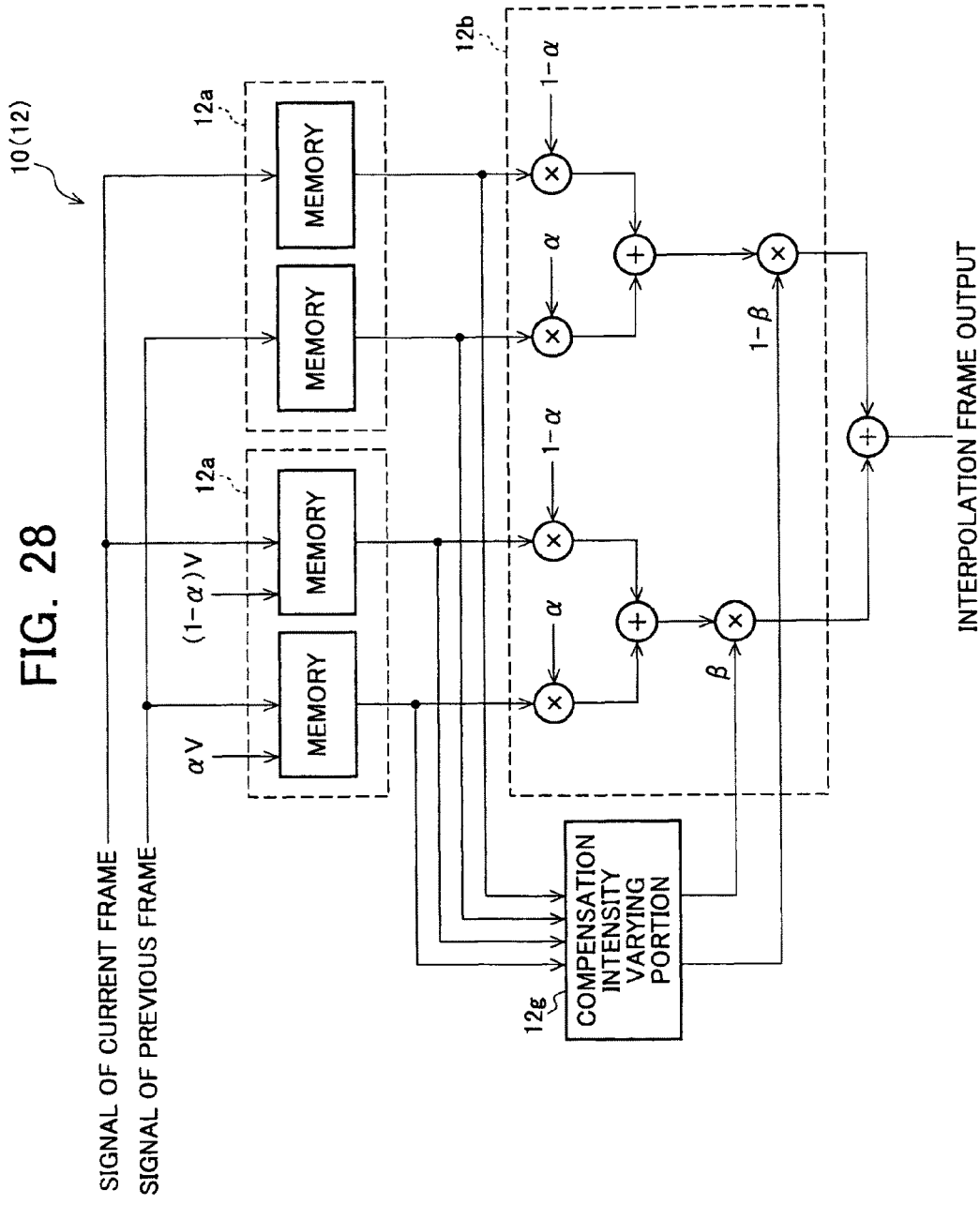
FIG. 28 is a block diagram of an exemplary main configuration of an FRC portion according to a fifteenth embodiment of the present invention.

FIG. 28 is a block diagram of an exemplary main configuration of the FRC portion 10 according to the fifteenth embodiment of the present invention, and the frame generating portion 12 of the FRC portion 10 includes the interpolation frame memory 12$a$, the interpolation frame generating portion 12$b$, and a compensation intensity varying portion 12$g$ that may vary the compensation intensity of the motion compensation processing in the FRC portion 10. In FIG. 28, V denotes an interpolation vector; $\alpha$ denotes a frame interpolation ratio; and $\beta$ denotes interpolation intensity (weighted addition rate).

Generally, for example, the frame interpolation through the linear interpolation between two frames and the frame interpolation using motion vectors (motion-compensated interpolation) are known as methods of the frame interpolation processing. In the former case, an interpolation frame is acquired by the linear interpolation from the signal of the previous frame and the signal of the current frame at a frame interpolation ratio $\alpha$. Therefore, using this linear interpolation may prevent the image quality deterioration due to the motion-compensated FRC processing due to the large movement amount between the frames.

On the other hand, to acquire an interpolation frame from the previous frame and the current frame in the latter case, the interpolation vector V is detected from the motion vectors between the previous frame image and the current frame image, and the interpolation frame is acquired from the weighted addition of a signal of the previous frame image shifted by a degree of $\alpha$V obtained by dividing the value (interpolation vector V) by the frame interpolation ratio $\alpha$ and a signal of the current frame image shifted by (1-$\alpha$) V. Although good image quality may be acquired without deteriorating the resolution since a moving image itself is captured and compensated by using this motion-compensated interpolation, the image quality of a part in which the movement amount between the frames is large due to this processing may be deteriorated due to the detection errors, etc., of the motion vector.

Therefore, in this embodiment, the compensation intensity varying portion 12$g$ is disposed in the frame generating portion 12. The compensation intensity varying portion 12$g$ varies the weighted addition rate $\beta$ of a pixel that is determined by the movement amount determining portion 14 as having the movement amount between the frames of the input image signal larger than a predetermined value or an area including the pixel. The weighted addition rate $\beta$ is a rate for performing the weighted addition of the image signal to which the motion compensation processing has been given and the image signal to which the linear interpolation processing has been given. The interpolation frame generating portion 12$b$ of this embodiment performs the weighted addition of the linear interpolation and the motion-compensated interpolation for a pixel in which the movement amount between the frames of the input image signal is larger than a predetermined value or an area including the pixel in accordance with the weighted addition rate $\beta$ to generate the interpolation frame.

For example, the compensation intensity varying portion 12$g$ sets the weighted addition rate $\beta$=0 for a pixel in which the movement amount between the frames of the input image signal is larger than a predetermined value or an area including the pixel and defines the image signal to which the linear interpolation processing has been given as the interpolation frame to prevent the image quality deterioration for a part having the large movement amount. On the other hand, the weighted addition rate $\beta$=1 is set for a pixel in which the movement amount between the frames of the input image signal is larger than a predetermined value or an area not including the pixel to define the image signal to which the motion compensation processing has been given as the interpolation frame to achieve better image quality for the moving image.

Since the weighted addition rate $\beta$ may arbitrarily and variably be set, the rate may be set to a substantially intermediate value between zero and one. This enables to control the deterioration of the image quality for a part in which the movement amount between the frames of the input image signal is larger than a predetermined value and to perform the motion compensation in the interpolation frame image at the same time, and this may appropriately improve both the image quality deterioration due to the motion blur and the image quality deterioration due to the large movement amount between the frames. The varying processing of the compensation intensity in the FRC portion 10 may be performed with any one of a method in a unit of a pixel and a method in a unit of a block (area).

Since the compensation intensity may be varied (weakened) in the motion compensation processing in the FRC for a pixel in which the movement amount between the frames of the input image signal is large or an area including the pixel, the image quality deterioration due to the motion-compensated FRC processing may effectively be controlled by reducing the effects of the detection errors, the motion compensation errors, etc., of the motion vector due to the large movement amount between the frames.

In each of the above embodiments, a predetermined value for determining whether or not the movement amount is large in the current frame may be varied based on the information on whether or not the determination is made that the movement amount is large in the previous frame to prevent that a pixel determined as having the large movement amount between the frames of the input image signal or an area including the pixel and a pixel determined as having the small movement amount between the frames of the input image signal or an area including the pixel are switched over frequently.

For example, the predetermined value of a pixel determined in the previous frame as having the large movement amount between the frames of the input image signal or an area including the pixel is set to be large, and the predetermined value of a pixel determined in the previous frame as having the small movement amount between the frames of the input image signal or an area including the pixel is set to be small. That is, hysteresis may be applied to the determination of whether or not the movement amount between the frames of the input image signal is large.

In order to prevent that a pixel determined as having the large movement amount between the frames of the input image signal or an area including the pixel and a pixel determined as having the small movement amount between the frames of the input image signal or an area including the pixel are switched over frequently, for a pixel that is once determined that the movement amount between the frames of the input image signal is large or an area including the pixel, the processing may be performed defining as the frames in which the movement amount between the frames of the input image signal is large for a subsequent several-frame period by continuously outputting the result of the determination for a predetermined number of frame periods.

Figure 29:
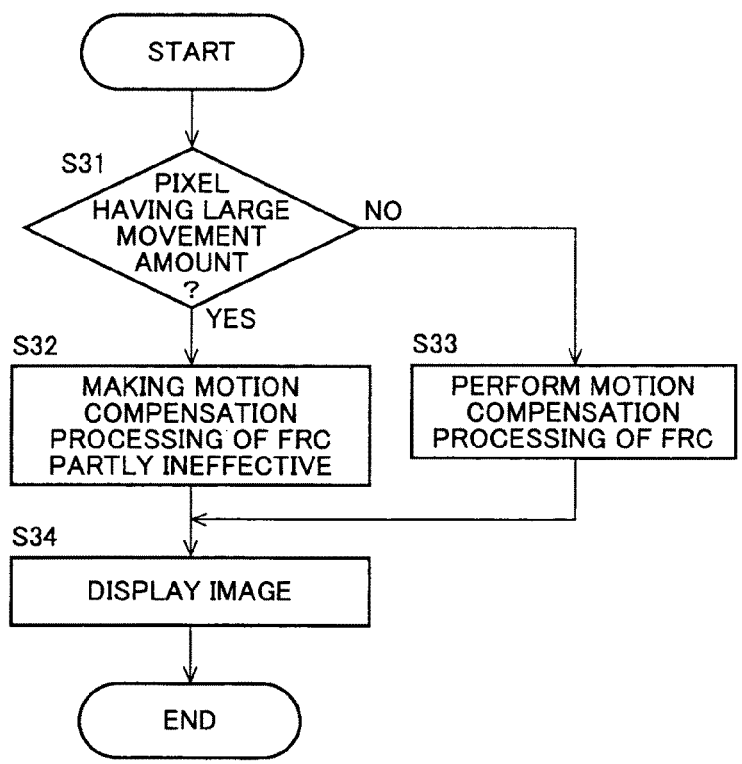
FIG. 29 is a flowchart for explaining another example of the image displaying method by the image displaying device of the present invention.

FIG. 29 is a flowchart for explaining another example of the image displaying method by the image displaying device of the present invention. An example of the image displaying method in the ninth to twelfth embodiments will be described. First, the image displaying device determines whether or not a pixel (or block) has the larger movement amount between the frames of the input image signal than the predetermined value (step S31), and when it is determined as a pixel (or block) in which the movement amount between the frames is larger than the predetermined value (in the case of YES), the interpolation vector of the pixel in which the movement amount between the frames is larger than the predetermined value or the area including the pixel (interpolation block) is set to zero-vector to make the motion compensation processing of the FRC portion 10 partly ineffective (step S32).

When it is determined at step S31 as a pixel (or block) in which the movement amount between the frames is smaller than the predetermined value (in the case of NO), the image signal to which the motion-compensated interpolation processing has been given in the FRC portion 10 is output (step S33). The image signal with the frame frequency converted in this way is displayed and output from the liquid crystal display panel 19 (step S34).

Figure 30:
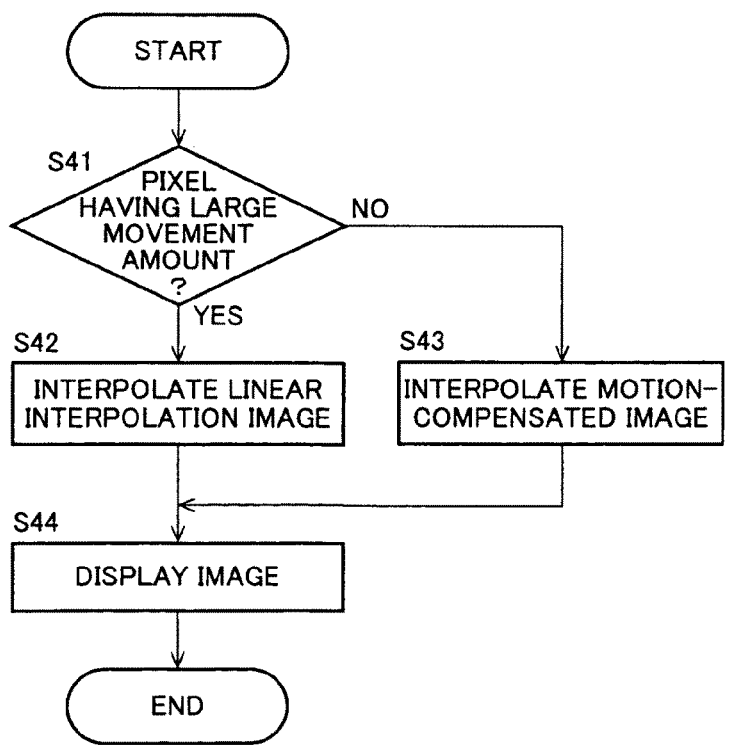
FIG. 30 is a flowchart for explaining another example of the image displaying method by the image displaying device of the present invention.

FIG. 30 is a flowchart for explaining another example of the image displaying method by the image displaying device of the present invention. An example of the image displaying method in the thirteenth embodiment will be described. First, the image displaying device determines whether or not a pixel (or block) has the larger movement amount between the frames of the input image signal than the predetermined value (step S41), and when it is determined as a pixel (or block) in which the movement amount between the frames is larger than the predetermined value (in the case of YES), a part of the motion-compensated frame interpolation processing of the FRC portion 10 is not performed by outputting the image signal in which the linear interpolation image is interpolated for the pixel in which the movement amount between the frames is larger than the predetermined value or the area including the pixel (interpolation block) (step S42).

When it is determined at step S41 as a pixel (or block) in which the movement amount between the frames is smaller than the predetermined value (in the case of NO), the image signal is output that is given the motion-compensated interpolation processing of the FRC portion 10 (step S43). The image signal with the frame frequency converted in this way is displayed and output from the liquid crystal display panel 19 (step S44).

Figure 31:
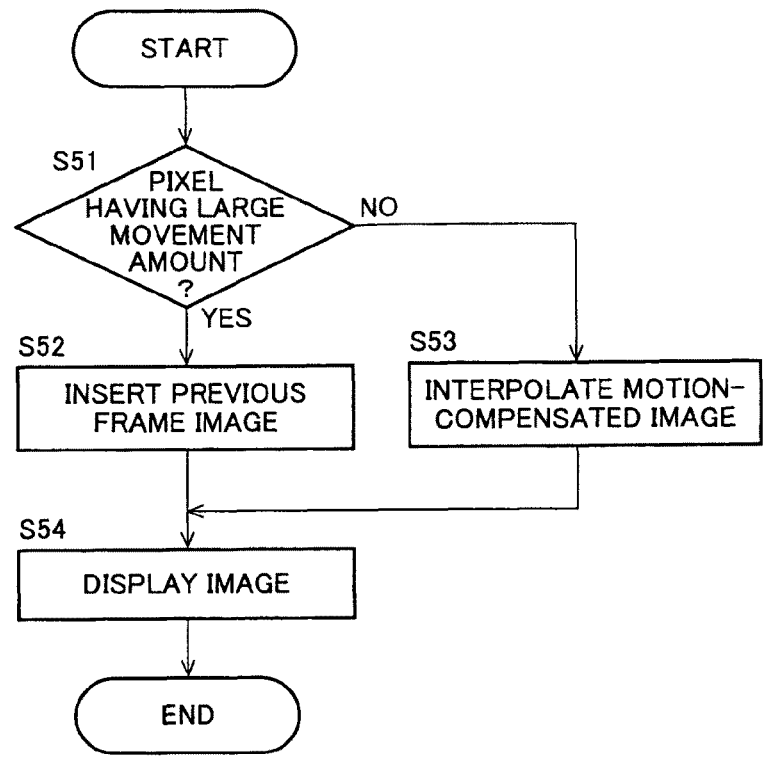
FIG. 31 is a flowchart for explaining another example of the image displaying method by the image displaying device of the present invention.

FIG. 31 is a flowchart for explaining another example of the image displaying method by the image displaying device of the present invention. An example of the image displaying method in the fourteenth embodiment will be described. First, the image displaying device determines whether or not a pixel (or block) has the larger movement amount between the frames of the input image signal than the predetermined value (step S51), and when it is determined as a pixel (or block) in which the movement amount between the frames is larger than the predetermined value (in the case of YES), a part of the motion-compensated frame interpolation processing of the FRC portion 10 is not performed by outputting the image signal in which the previous or subsequent frame image is inserted for the pixel in which the movement amount between the frames signal is larger than the predetermined value or the area including the pixel (interpolation block) (step S52).

When it is determined at step S51 as a pixel (or block) in which the movement amount between the frames is smaller than the predetermined value (in the case of NO), the image signal is output that is given the motion-compensated interpolation processing of the FRC portion 10 (step S53). The image signal with the frame frequency converted in this way is displayed and output from the liquid crystal display panel 19 (step S54).

Figure 32:
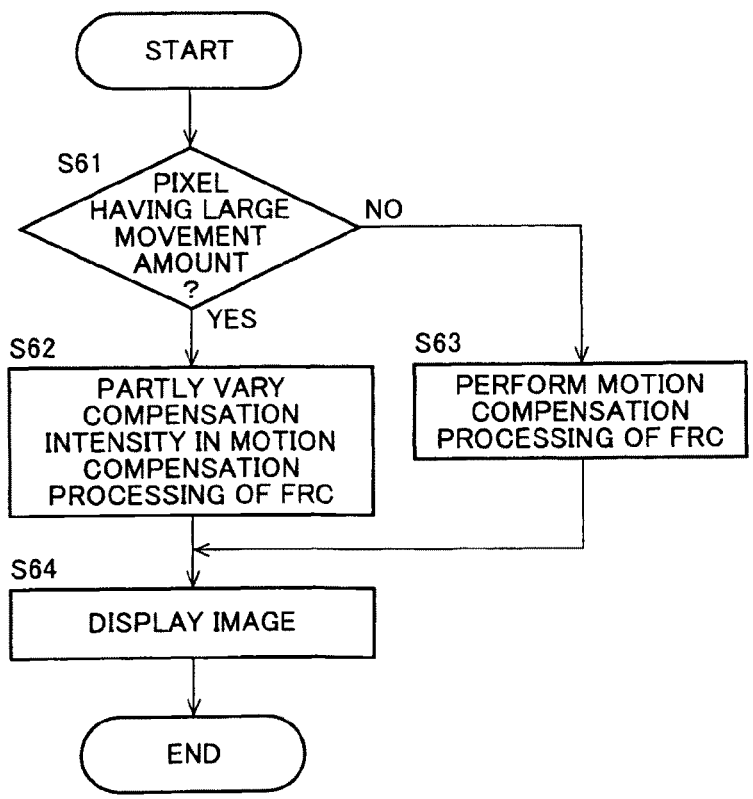
FIG. 32 is a flowchart for explaining another example of the image displaying method by the image displaying device of the present invention.

FIG. 32 is a flowchart for explaining another example of the image displaying method by the image displaying device of the present invention. An example of the image displaying method in the fifteenth embodiment will be described. First, the image displaying device determines whether or not a pixel (or block) has the larger movement amount between the frames of the input image signal than the predetermined value (step S61), and when it is determined as a pixel (or block) in which the movement amount between the frames is larger than the predetermined value (in the case of YES), the compensation intensity is varied (weakened) in the motion compensation processing of the FRC portion 10 for the pixel in which the movement amount between the frames is larger than the predetermined value or the area including the pixel (interpolation block) (step S62).

When it is determined at step S61 as a pixel (or block) in which the movement amount between the frames is smaller than the predetermined value (in the case of NO), the compensation intensity is increased as usual in the motion compensation processing of the FRC portion 10 (step S63). The image signal with the frame frequency converted in this way is displayed and output from the liquid crystal display panel 19 (step S64).

According to the present invention, when a pixel area in which a movement amount between frames of an input image signal is larger than a predetermined value is partly included, display and output may be performed by making the motion compensation processing in the frame rate converting (FRC) portion partly ineffective for the pixel in which the movement amount between the frames is larger than the predetermined value or the area including the pixel, and therefore, the image quality for the image area with the large movement amount due to the motion-compensated interpolation processing may effectively be prevented from deteriorating.

In each of the above embodiments, the method using the OB flag information and the method using the motion vector information included in the input image data are described as an example of the method for determining whether or not a movement amount between frames of an input image signal is larger than a predetermined value. However, various types of methods for determining a movement amount are applicable without limiting to the above.

For example, when a vector calculated during the calculation for the motion vector detection by the motion vector detecting portion 11e exceeds the predetermined vector evaluation calculation range, if being clipped at a maximum value within the vector evaluation calculation range described above with FIG. 4 (B), it may be determined that the movement amount is excessive without using the OB flag information.

When either an X component or a Y component of the motion vector output by the motion vector detecting portion lie is equal to a maximum value within the vector evaluation calculation range, the vector calculated during the calculation for the motion vector detection may be regarded to exceed the predetermined vector evaluation calculation range, and therefore, the image signal having the large movement amount between the frames, or a pixel having the large movement amount between the frames or an area including the pixel may be determined based on the length of the motion vector detected by the motion vector detecting portion 11e.

In the above embodiment, when the vector evaluation calculation range is not limited or when the vector evaluation calculation range is enlarged, errors of the motion vector detection increase as above, and therefore, the image signal having the large movement amount between the frames, or a pixel having the large movement amount between the frames or an area including the pixel may be determined by defining that the movement amount between the frames of the input image signal is larger than a predetermined value when the length of the output motion vector is larger than a predetermined threshold even within the vector evaluation calculation range.

For example, when panning of a camera may be detected and when related data such as camera parameter is added to the input image signal, the image signal having the large movement amount between the frames may be determined using the data.

In the above description, although an example of the embodiments about the image processing device and method of the present invention have been described, the description also facilitates understanding of an image processing program that executes the present image processing method by a computer as a program, and a program recording medium in which the image processing program is recorded on a computer readable recording medium.

In the above embodiment, an embodiment in which the image processing device of the present invention is integrally provided in the image displaying device is described. However, it is obvious that, the image processing device of the present invention may be provided, for example, in a video output device such as various recording media reproducing devices without limiting to the above.

The invention claimed is:

1. An image displaying device, the image displaying device comprising:
    a rate converting portion that interpolates an interpolation image signal between frames or fields of an input image signal to convert the number of frames or fields of the input image signal, and
    a determining portion that determines whether or not a movement amount between frames or fields of the input image signal is larger than a predetermined value for each frame or field, and
    an interpolation image generating portion that applies a motion compensation processing to the input image signal to generate an interpolation image signal based on motion vector information between frames or fields of the input image signal, wherein
    in the motion vector operation process determined by the determining portion between frames or fields of the input image signal, interpolation of the image signal generated by applying the motion compensation process is not performed for an area including all pixels in a frame or field as having the larger number of blocks which are determined to go beyond the computing range than the predetermined value.

2. The image displaying device as defined in claim 1, wherein
    the rate converting portion interpolates an image signal generated by making the motion compensation processing in the interpolation image generating portion ineffective between frames or fields of the input image signal for an area including all pixels in a frame or field determined as having a larger movement amount between frames or fields of the input image signal than the predetermined value.

3. The image displaying device as defined in claim 2, wherein
    the interpolation image generating portion includes a motion vector detecting portion that detects motion vector information between consecutive frames or fields included in the input image signal and
    an interpolation vector allocating portion that allocates an interpolation vector between the frames or the fields based on the detected motion vector information.

4. The image displaying device as defined in claim 3, wherein
    the interpolation image generating portion sets the motion vector detected by the motion vector detecting portion to zero-vector to make the motion compensation processing ineffective for an area including all pixels in a frame or field determined as having a larger movement amount between frames or fields of the input image signal than the predetermined value.

5. The image displaying device as defined in claim 3, wherein
    the interpolation image generating portion sets the interpolation vector allocated by the interpolation vector allocating portion to zero-vector to make the motion compensation processing ineffective for an area including all pixels in a frame or field determined as having a larger movement amount between frames or fields of the input image signal than the predetermined value.

6. The image displaying device as defined in claim 1, wherein
    when the movement amount between frames or fields of the input image signal is larger than the predetermined value, the image displaying device does not insert the interpolation image signal generated by applying the motion compensation processing between frames or fields of the input image signal and does not convert the number of frames or fields of the input image signal.

7. The image displaying device as defined in claim 6, wherein
    a drive frequency of a display panel displaying the image signals is variable and a varying portion varying the drive frequency of the display panel from a frame frequency converted by the rate converting portion to the frame frequency of the input image signal is included or varying the drive frequency of the display panel from a field frequency converted by the rate converting portion to the field frequency of the input image signal when the movement amount between frames or fields of the input image signal is larger than the predetermined value.

8. The image displaying device as defined in claim 1, wherein
the rate converting portion inserts an image signal to which the motion compensation processing has not been given between frames or fields of the input image signal to convert the number of frames or fields of the input image signal for an area including all pixels in a frame or field determined as having a larger movement amount between frames or fields of the input image signal than the predetermined value.

9. The image displaying device as defined in claim 8, wherein
the rate converting portion inserts between frames or fields of the input image signal an image signal of the frames or fields to convert the number of frames or fields of the input image signal.

10. The image displaying device as defined in claim 8, wherein
the rate converting portion interpolates between frames or fields of the input image signal an image signal obtained by applying a linear interpolation processing to an image signal of the frames or fields to convert the number of frames or fields of the input image signal.

11. The image displaying device as defined in claim 8, wherein
the rate converting portion inserts a predetermined monochromatic image signal between frames or fields of the input image signal to convert the number of frames or fields of the input image signal.

12. The image displaying device as defined in claim 1, wherein
the determining portion determines whether or not the movement amount between frames or fields of the input image signal is larger than the predetermined value based on a vector calculated by performing a predetermined calculation for the input image signal.

13. The image displaying device as defined in claim 12, wherein
the determining portion determines whether or not the movement amount between frames or fields of the input image signal is larger than the predetermined value by applying flag information to a block in which the calculated vector exceeds a predetermined range and comparing a counted value for each frame of the flag information and a predetermined threshold.

14. The image displaying device as defined in claim 1, wherein
the determining portion determines whether or not the movement amount between frames or fields of the input image signal is larger than the predetermined value based on motion vector information included in the input image signal.

15. The image displaying device as defined in claim 1, wherein
the determining portion varies a predetermined value for determining whether or not the movement amount between frames or fields of the input image signal is larger than the predetermined value in a current frame or field in accordance with a result of determination of the movement amount between the frames or the fields to prevent that a frame or field determined as having a large movement amount and a frame or field determined as having a small movement amount are switched over frequently.

16. The image displaying device as defined in claim 1, wherein
when the determining portion determines that the movement amount between frames or fields of the input image signal is larger than the predetermined value, the determining portion continuously outputs the result of determination for a subsequent several-frame period.

17. An image displaying method, image displaying method comprising:
interpolating an interpolation image signal between frames or fields of an input image signal to convert the number of frames or fields of the input image signal, wherein
determining whether or not a movement amount between frames or fields of the input image signal is larger than a predetermined value for each frame or field is included, and
applying a motion compensation processing to the input image signal to generate an interpolation image signal based on motion vector information between frames or fields of the input image signal, wherein
in the motion vector operation process determined between frames or fields of the input image signal, interpolation of the image signal generated by applying the motion compensation process is not performed for an area including all pixels in a frame or field as having the larger number of blocks which are determined to go beyond the computing range than the predetermined value.

18. The image displaying method as defined in claim 17, wherein
an image signal generated is interpolated by making the motion compensation processing ineffective between frames or fields of the input image signal for an area including all pixels in a frame or field determined as having a larger movement amount between frames or fields of the input image signal than the predetermined value.

19. The image displaying method as defined in claim 17, wherein
when the movement amount between frames or fields of the input image signal is larger than the predetermined value, varying the drive frequency of a display panel from the frame frequency or the field frequency converted to the frame frequency or the field frequency of the input image signal is included.

20. The image displaying method as defined in claim 17, wherein
for an area including all pixels in a frame or field determined as having a larger movement amount between frames or fields of the input image signal than the predetermined value, inserting an image signal of the frames or fields between frames or fields of the input image signal to convert the number of frames or fields of the input image signal.

21. The image displaying method as defined in claim 17, further comprising:
interpolating an image signal obtained by applying a linear interpolation processing to the input image signal between frames or fields of the input image signal to convert the number of frames or fields of the input image signal for an area including all pixels in a frame or field determined as having a larger movement amount between frames or fields of the input image signal than the predetermined value.

22. The image displaying method as defined in claim 17, further comprising:
inserting a predetermined monochromatic image signal between frames or fields of the input image signal to convert the number of frames or fields of the input image signal for an area including all pixels in a frame or field determined as having a larger movement amount between frames or fields of the input image signal than the predetermined value.

23. An image processing device, the image processing device comprising:
a rate converting portion that interpolates an interpolation image signal between frames or fields of an input image signal to convert the number of frames or fields of the input image signal, wherein
a determining portion that determines whether or not a movement amount between frames or fields of the input image signal is larger than a predetermined value for each frame or field is included in the input image signal, and
an interpolation image generating portion that applies a motion compensation processing to the input image signal to generate an interpolation image signal based on motion vector information between frames or fields of the input image signal, wherein
in the motion vector operation process determined by the determining portion between frames or fields of the input image signal, interpolation of the image signal generated by applying the motion compensation process is not performed for an area including all pixels in a frame or field as having the larger number of blocks which are determined to go beyond the computing range than the predetermined value.

24. The image processing device as defined in claim 23, wherein
the rate converting portion interpolates an image signal generated by making the motion compensation processing in the interpolation image generating portion ineffective between frames or fields of the input image signal for an area including all pixels in a frame or field determined as having a larger movement amount between frames or fields of the input image signal than the predetermined value.

25. The image processing device as defined in claim 23, wherein
the rate converting portion inserts an image signal to which the motion compensation processing has not been given between frames or fields of the input image signal to convert the number of frames or fields of the input image signal for an area including all pixels in a frame or field determined as having a larger movement amount between frames or fields of the input image signal than the predetermined value.

26. The image processing device as defined in claim 25, wherein
the rate converting portion inserts between frames or fields of the input image signal an image signal of the frames or fields to convert the number of frames or fields of the input image signal.

27. The image processing device as defined in claim 25, wherein
the rate converting portion interpolates between frames or fields of the input image signal an image signal obtained by applying a linear interpolation processing to an image signal of the frames or fields to convert the number of frames or fields of the input image signal.

28. The image processing device as defined in claim 25, wherein
the rate converting portion inserts a predetermined monochromatic image signal between frames or fields of the input image signal to convert the number of frames or fields of the input image signal.

29. An image processing method, the image processing method comprising:
interpolating an interpolation image signal between frames or fields of an input image signal to convert the number of frames or fields of the input image signal,
determining whether or not a movement amount between frames or fields of the input image signal is larger than a predetermined value for each frame or field is included in the input image signal, and
applying a motion compensation processing to the input image signal to generate an interpolation image signal based on motion vector information between frames or fields of the input image signal, wherein
in the motion vector operation process determined between frames or fields of the input image signal, interpolation of the image signal generated by applying the motion compensation process is not performed for an area including all pixels in a frame or field as having the larger number of blocks which are determined to go beyond the computing range than the predetermined value.

30. The image processing method as defined in claim 29, wherein
an image signal generated is interpolated by making the motion compensation processing ineffective between frames or fields of the input image signal for an area including all pixels in a frame or field determined as having a larger movement amount between frames or fields of the input image signal than the predetermined value.

31. The image processing method as defined in claim 29, wherein
for an area including all pixels in a frame or field determined as having a larger movement amount between frames or fields of the input image signal than the predetermined value, inserting an image signal of the frames or fields between frames or fields of the input image signal to convert the number of frames or fields of the input image signal.

32. The image processing method as defined in claim 29, further comprising:
interpolating an image signal obtained by applying a linear interpolation processing to the input image signal between frames or fields of the input image signal to convert the number of frames or fields of the input image signal for an area including all pixels in a frame or field determined as having a larger movement amount between frames or fields of the input image signal than the predetermined value.

33. The image processing method as defined in claim 29, further comprising:
inserting a predetermined monochromatic image signal between frames or fields of the input image signal to convert the number of frames or fields of the input image signal for an area including all pixels in a frame or field determined as having a larger movement amount between frames or fields of the input image signal than the predetermined value.

* * * * *